United States Patent [19]
Kavanagh et al.

[11] Patent Number: 5,835,910
[45] Date of Patent: Nov. 10, 1998

[54] METHOD AND SYSTEM FOR COMPARING ATTRIBUTES IN AN OBJECT-ORIENTED MANAGEMENT SYSTEM

[75] Inventors: Thomas S. Kavanagh; Christopher W. Beall, both of Boulder; William C. Heiny, Arvada; John D. Motycka, Evergreen; Samuel S. Pendleton, Louisville; Brooke E. Terpening, Golden; Kenneth A. Traut, Boulder, all of Colo.

[73] Assignee: Cadis, Inc., Boulder, Colo.

[21] Appl. No.: 526,555

[22] Filed: Sep. 12, 1995

Related U.S. Application Data

[63] Continuation-in-part of Ser. No. 339,481, Nov. 10, 1994.

[51] Int. Cl.$^6$ ..................................................... G06F 17/30
[52] U.S. Cl. .......................... 707/103; 707/104; 707/203; 364/468.04
[58] Field of Search ..................... 395/614, 615, 395/619; 364/424.034, 468.04; 707/103, 104, 203

[56] References Cited

U.S. PATENT DOCUMENTS

| | | | |
|---|---|---|---|
| 3,343,133 | 9/1967 | Dirks | 340/172.5 |
| 4,318,184 | 3/1982 | Millet et al. | 364/900 |
| 4,887,206 | 12/1989 | Natarajan | 364/401 |
| 4,930,071 | 5/1990 | Tou et al. | 364/300 |
| 4,984,155 | 1/1991 | Geier et al. | 364/401 |
| 5,021,992 | 6/1991 | Kondo | 364/900 |
| 5,109,337 | 4/1992 | Ferriter et al. | 364/401 |
| 5,133,075 | 7/1992 | Rissch | 395/800 |
| 5,146,404 | 9/1992 | Calloway et al. | 364/401 |
| 5,191,534 | 3/1993 | Orr et al. | 364/468 |
| 5,210,868 | 5/1993 | Shimada et al. | 395/600 |
| 5,257,365 | 10/1993 | Powers et al. | 395/600 |
| 5,260,866 | 11/1993 | Lisinski et al. | 364/401 |
| 5,283,865 | 2/1994 | Johnson | 395/161 |

OTHER PUBLICATIONS

PCT International Search Report, dated Apr. 22, 1996, International Appl. No. PCT/US95/15028 for CADISD, Inc., 4 pages.

*Primary Examiner*—Wayne Amsbury
*Assistant Examiner*—Diane D. Mizrahi
*Attorney, Agent, or Firm*—Burns, Doane, Swecker & Mathis, L.L.P.

[57] ABSTRACT

The present invention is an improvement upon an object oriented database management system and provides a method and apparatus for a user to visually compare attribute values of instances retrieved in a search in a way that highlights attribute values that do not match or are not equal. The present invention provides a method and apparatus for determining which of the attributes are not equal or do not match, and which attribute values are the same for all of the instances that are retrieved by a search. A method and apparatus is provided for visually indicating such determinations in a way that is immediately understandable by a user.

27 Claims, 69 Drawing Sheets

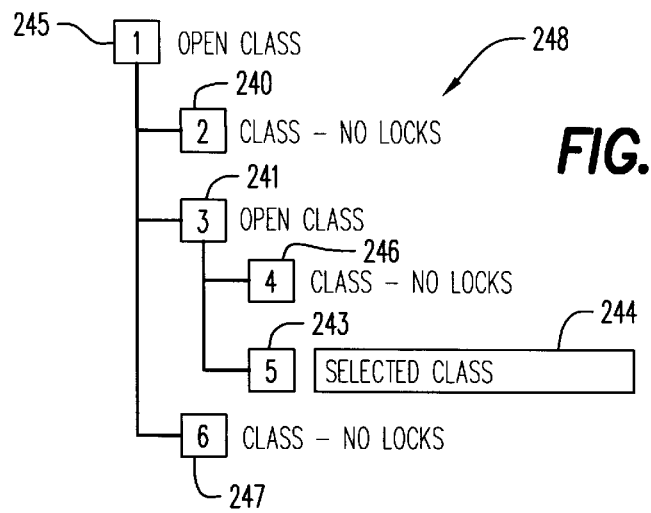
FIG. 14
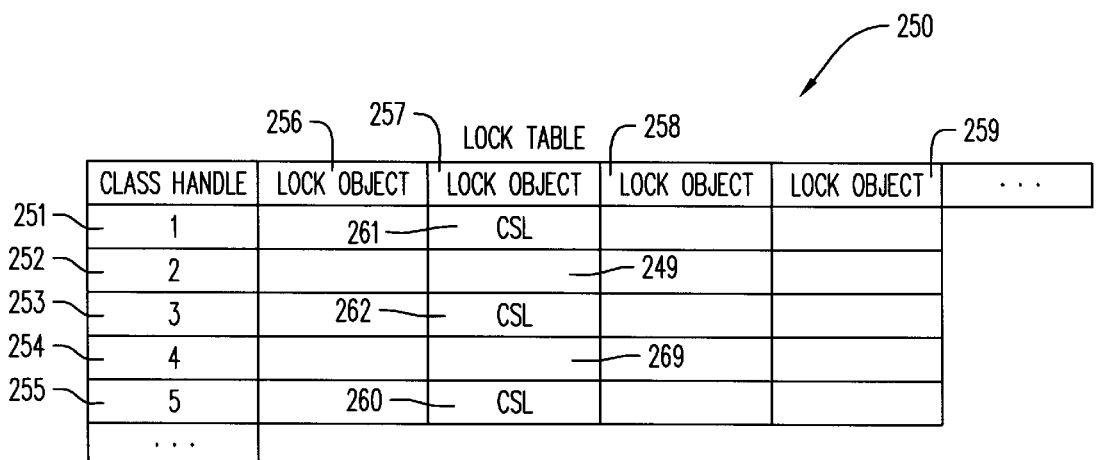
FIG. 15
FIG. 16

| | CLASS HANDLE | LOCK OBJECT | LOCK OBJECT | LOCK OBJECT | LOCK OBJECT | |
|---|---|---|---|---|---|---|
| | | 256 | 257 LOCK TABLE | 258 | 259 | |
| 251 | 1 | 261 — CSL | | | | |
| 252 | 2 | | — 249 | | | |
| 253 | 3 | 262 — CSL | | | | |
| 254 | 4 | | — 269 | | | |
| 255 | 5 | 260 — CSL, TUL | | | | |
| | ... | | | | | |

LOCK OBJECT 260

| LOCK TYPE | COUNT | |
|---|---|---|
| TXL – TREE EXCLUSIVE LOCK | 0 | 264 |
| TUL – TREE UPDATE LOCK | 1 | 265 |
| TSL – TREE SHARE LOCK | 0 | 266 |
| CSL – CLASS SHARE LOCK | 1 | 263 |
| USER ID | 100 | 268 |
| LOCK HOLDER HANDLE | 1 | 267 |

| | LOCK TABLE | | | | |
|---|---|---|---|---|---|
| CLASS HANDLE | LOCK OBJECT | LOCK OBJECT | LOCK OBJECT | LOCK OBJECT | ... |
| 1 | 261 — CSL, CSL | | | | |
| 2 | | | 249 | | |
| 3 | 262 — CSL, CSL | | | | |
| 4 | | | 269 | | |
| 5 | 260 — CSL, CSL | | | | |
| ... | | | | | |

LOCK OBJECT

| LOCK TYPE | COUNT | |
|---|---|---|
| TXL - TREE EXCLUSIVE LOCK | 0 | 264 |
| TUL - TREE UPDATE LOCK | 0 | 265 |
| TSL - TREE SHARE LOCK | 0 | 266 |
| CSL - CLASS SHARE LOCK | 2 | 263 |
| USER ID | 100 | 268 |
| LOCK HOLDER HANDLE | 1 | 267 |

Part Attribute Comparison

| Attribute Title | Part 1 | Part 2 | Part 3 | Part 4 |
|---|---|---|---|---|
| Part Number | 2131034370 | 21309939A | 2131084370 | 21374939A |
| Basic Part Name | SCR-ASSEM WSHR | SCREW, MACHINE | SCREW, MACHINE | SCR ASSEM WSHR |
| Associated File Name | c:/pmx/ms200732.dwg | c:/pmx/ms200731.dwg | c:/pmx/ms200732.dwg | c:/pmx/ms200733.dwg |
| Cost | | | | |
| Finish | Cadmium Plate | Zinc Plate | Cadmium Plate | Nylon |
| Major Material | Steel | Steel | Steel | |
| Attached Washer | | | | |
| Drilled | | | | |
| Head Recess | Hex | Hex | Torx | |
| Head Style | | | Pan | |
| Left Hand Thread | | | | |
| Self Locking | | | | |
| Shank Type | | | | |
| Length | .5625 Inches | 2.5 Inches | .375 Inches | 1 Inches |
| SAE-Grade | | | | |

Compare To Selected Part    Clear Comparisons    Close

Part Attribute Comparison

| | Attribute Title | Part 1 | Part 2 | Part 3 | Part 4 |
|---|---|---|---|---|---|
| ◇ | Part Number | 2131034370 | 21309939A | 2131084370 | 214574939A |
| ◇ | Basic Part Name | SCR ASSEM WSHR | SCREW MACHINE | SCREW MACHINE | SCR ASSEM WSHR |
| = | Associated File Name | c:/pmx/ms200732.dwg | c:/pmx/ms200731.dwg | c:/pmx/ms200732.dwg | c:/pmx/ms200733.dwg |
| | Cost | | | | |
| ◇ | Finish | Cadmium Plate 648 | Zinc Plate | Cadmium Plate 646 | |
| ◇ | Major Material | Steel | Steel | Steel | Nylon 647 |
| = | Attached Washer | | 645 | | |
| | Drilled | | | | |
| ◇ | Head Recess | | | Torx | |
| ◇ | Head Style | Hex | Hex | Pan | |
| = | Left Hand Thread | | | | |
| = | Self Locking | | | | |
| ◇ | Shank Type | | | | |
| = | Length | .5625 Inches | 2.5 Inches | .375 Inches | 1 Inches |
| = | SAE-Grade | | | | |

Legend: Match / No Match

[ Compare To Selected Part ]   [ Clear Comparisons ]   [ Close ]

FIG. 60

000
METHOD AND SYSTEM FOR COMPARING ATTRIBUTES IN AN OBJECT-ORIENTED MANAGEMENT SYSTEM

CROSS-REFERENCE TO RELATED APPLICATIONS

This application is a continuation-in-part of application Ser. No. 08/339,481, filed Nov. 10, 1994, by Thomas S. Kavanagh, et al., for OBJECT ORIENTED DATABASE MANAGEMENT SYSTEM, now pending the entire disclosure of which is incorporated herein by reference.

BACKGROUND OF THE INVENTION

In the object oriented database management system described in application Ser. No. 08/339,481, filed Nov. 10, 1994, now pending, search results may be displayed that match a user's specification. However, there was no convenient mechanism for a user to visually compare attribute values in a way that highlighted attribute values that were not equal. In many applications, it is desirable to determine which of the attributes were the same for all of the instances that were retrieved by the query. Typically, only about four instances could be conveniently displayed on a conventional display screen in a readable fashion, and a scroll bar would be used to view additional instances that were off of the screen. There was no mechanism that quickly indicated which attributes were the same for all of the parts on a display of search results. It would be difficult to try to scroll through the search results for each attribute to see if the value was the same for all instances retrieved in the search. In many applications, those attributes will not be of particular interest, and it is desirable to compare and more closely examine the attributes that are unequal.

Although an object oriented database management system developed by the present applicants generally provided good results in practice, room for improvement still existed. The present invention represents an improvement on that system.

The present invention provides a convenient mechanism for a user to visually compare attribute values in a way that highlights attribute values that are not equal. The present invention provides a mechanism to determine which of the attributes are the same for all of the instances that are retrieved by a search, and visually indicate that in a way that is immediately understandable by a user.

SUMMARY OF THE INVENTION

The present invention provides a method for determining whether attribute values for instances retrieved by a search of an object oriented database, and displaying the results of that comparison in an easily perceived manner.

BRIEF DESCRIPTION OF THE DRAWINGS

FIG. 14 is a diagram of a schema illustrating an example of internal lock states of classes in the schema corresponding to the display of FIG. 13.

FIG. 15 illustrates a lock table maintained by the lock manager as correlated with the schema depicted in FIG. 14.

FIG. 16 is a diagram that illustrates the contents of one of the lock objects in the lock table shown in FIG. 15.

FIG. 59A shows an example of a display of a search results window.

FIG. 59B shows an example of a display of a compare parts dialog box.

FIG. 60 shows an example of a display of a compare parts dialog box after a compare to selected part command has been invoked.

DETAILED DESCRIPTION OF A PREFERRED EMBODIMENT

I. Overall Architecture

Figure 1:
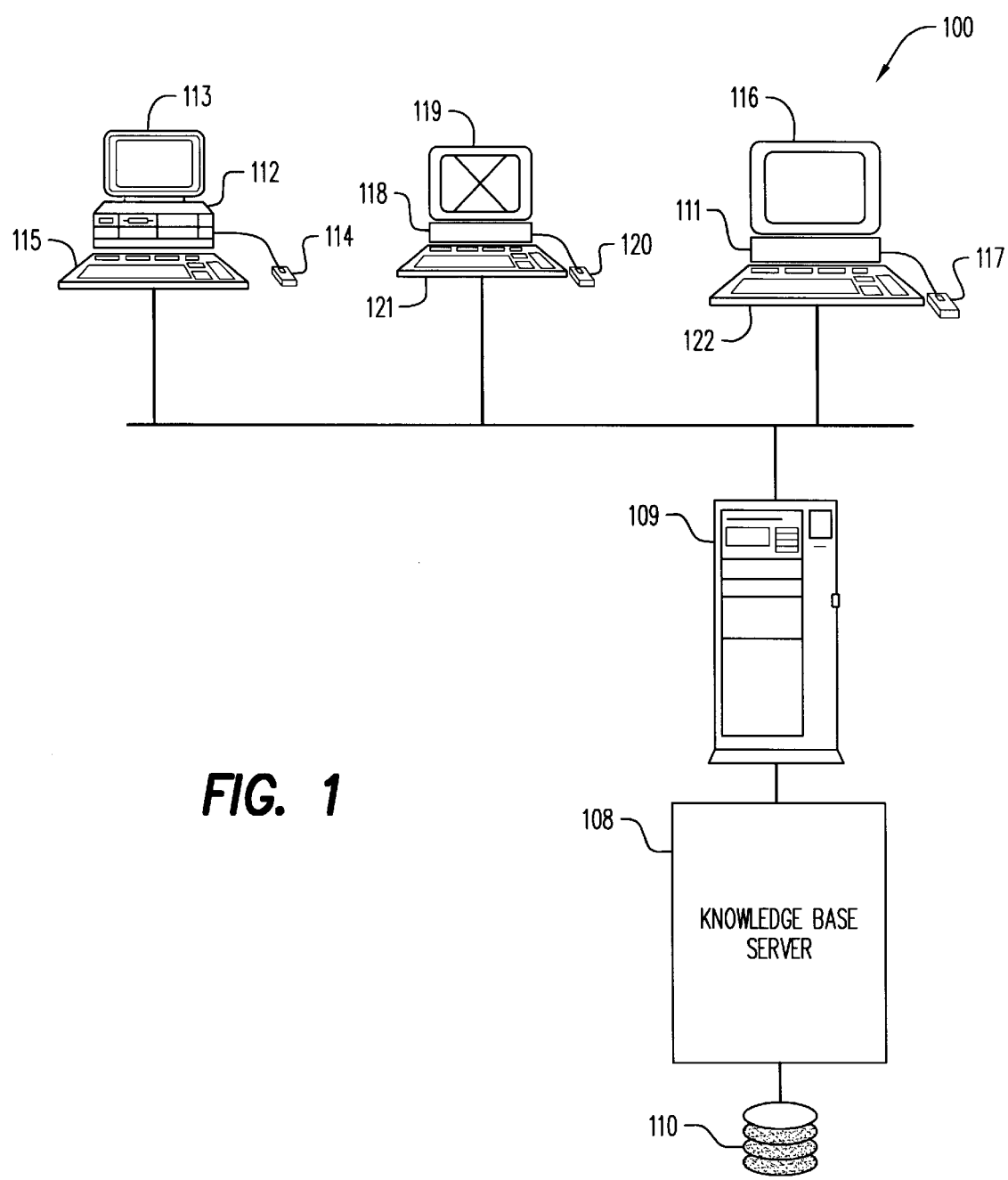
FIG. 1 is a diagram of a network environment that is suitable for a preferred embodiment of the present invention.

A presently preferred embodiment of the present invention is shown in FIG. 1, and employs a network 100 having a client/server architecture comprising one or more knowledge base clients 112, 118 and 111, and a knowledge base server 108. In the preferred embodiment shown in FIG. 2, the knowledge base server 108 includes an object oriented lock manager 125, a dynamic class manager 134, a connection manager 135, a query manager 136, a handle manager 137, a units manager 138, a database manager 139, and a file manager 140. A server host 109 may be designated to run the knowledge base server 108, with the software and knowledge base 123 preferably residing on a local disk drive 110. A knowledge base client 131 interacts with the knowledge server 132 over a network 100 in the illustrated embodiment. A preferred system includes a registry server 141 and a license manager 142 to control unauthorized access to the system. A legacy client 133 and a legacy manager 145 are preferably included to facilitate organization of an existing legacy database into schema for use in connection with an object oriented database management system. An application programming interface or API 143 is also shown in the illustrated embodiment. A schema editor 144 is provided for modifying and changing the schema or database 123. The structure and operation of the schema editor 144, the dynamic class manager 134, the retriever 130, the connection manager 135, the query manager 136, the handle manager 137, the units manager 138, the database manager 139, the file manager 140, the registry server 141, the license manager 142, the API 143, the legacy manager 145, and the knowledge base client 131 are described in more detail in application Ser. No. 08/339,481, filed Nov. 10, 1994, by Thomas S. Kavanagh, et al., for OBJECT ORIENTED DATABASE MANAGEMENT SYSTEM, now pending the entire disclosure of which is incorporated herein by reference.

In the example illustrated in FIG. 1, a plurality of users or clients 111, 112, and 118 are shown connected to the network 100. A first client 111 runs on a Sun Microsystems SPARCstation 111, which is shown having a display 116, a mouse 117, and a keyboard 122. A second client 112 runs on an IBM compatible computer 112, shown having a display 113, a mouse 114, and a keyboard 1 15. A third X Windows client 118 is illustrated having a computer 118, a display 119, a mouse 120, and a keyboard 122.

II. Comparing Instances By Their Attribute Values

Figure 59A:
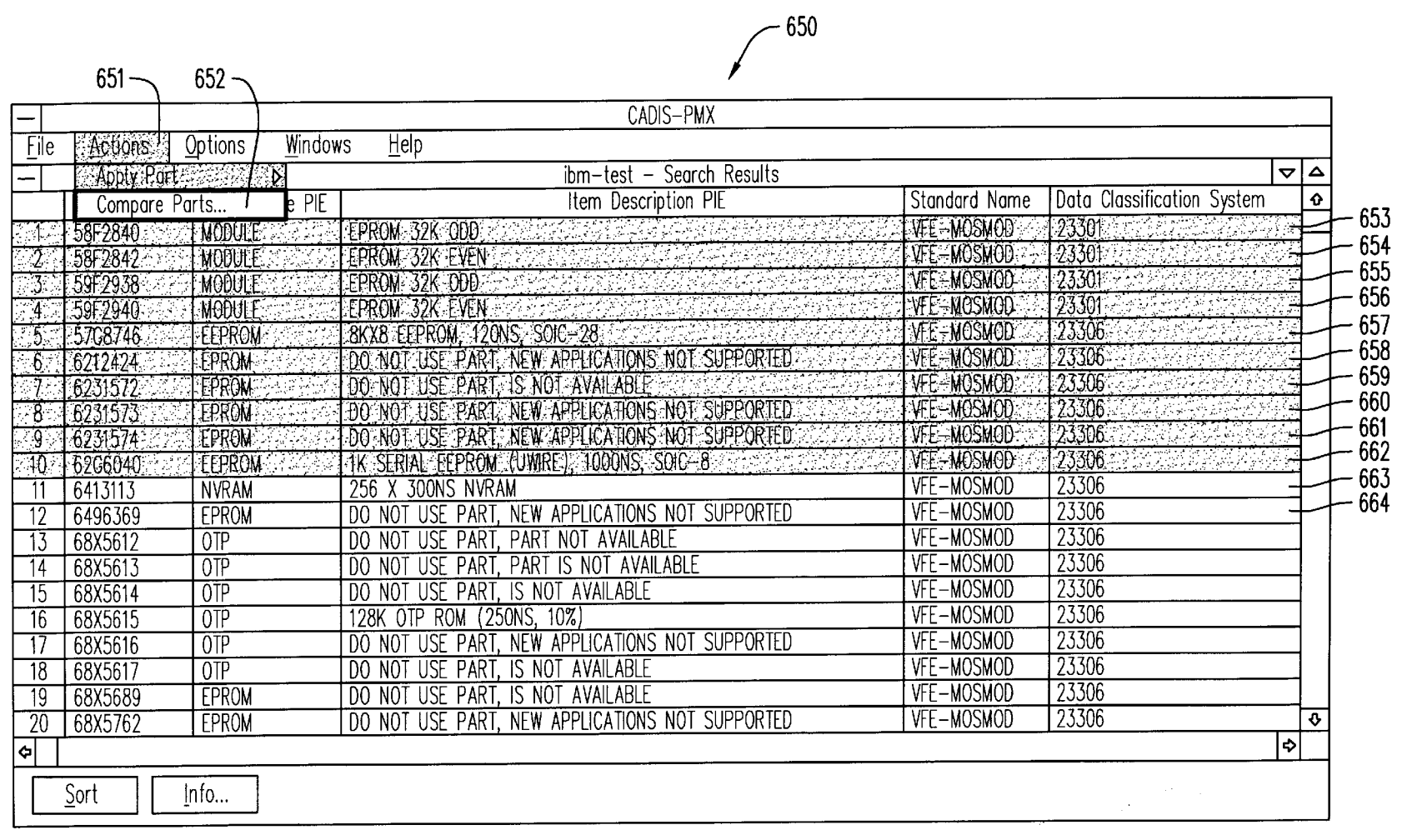

A preferred method and apparatus for performing a search or query is described in more detail in application Ser. No. 08/339,481, filed Nov. 10, 1994, now pending. When the results of a search are obtained, the instances (in the illustrated example the instances are parts) may be displayed as shown in FIG. 59A. The parts may then be compared by their attribute values. The parts that the user wishes to compare are selected by clicking on them. When selected, the display of the selected part is shaded or highlighted, as shown in FIG. 59A by the shaded part displays indicated by reference numerals 653–662. The parts 663, 664, and subsequent parts are not highlighted because they have not been selected in the illustrated example.

After displaying the list of parts that match the search specification (see FIG. 59A), a user will often want to compare those parts in relation to their shared attribute values. This can be done by using the compare parts option 652 from the actions menu 651. This command 652 accesses the part attribute comparison dialog box 630 shown in FIG. 59B and FIG. 60, where a user can compare the attribute values among all selected parts 633, 634, 635, and 636. In a preferred embodiment, a user must select at least two parts in the search results window 650 before invoking the compare parts command 652. An example of comparing a selected part's attribute values to all other values is shown in the part attribute comparison dialog box 630 shown in FIG. 59B.

In a preferred embodiment, before the part attribute comparison dialog box 630 first appears on the user's display as shown in FIG. 59B, all attribute values for the selected parts are evaluated as to whether or not they have the same value. When the part attribute comparison dialog box 630 appears on the user's display screen, the results of this comparison are indicated in the first column 637 of the dialog box 630. In the illustrated example, an equal operator (=) 632 is displayed in the first column 637 where all of the attributes in that row 643 are equal for all of the parts 633, 634, 635, and 636 selected for the compare parts operation. A not equal (<>) operator 631 is displayed in the first column 637 where all of the attributes in that row 642 are not equal for all of the parts selected for the compare parts operation. The second column 638 of the dialog lists the attribute titles, and the remaining columns 633, 634, 635, and 636 are each allocated to a single part; that is, one for each part that the user previously selected from the search results window. Each part column 633, 634, 635, and 636 lists its attribute values in the same order as the other columns.

An example part attribute comparison dialog box 630 is shown in FIG. 59B. Table I describes the regions of the part attribute comparison dialog box 630:

TABLE I

| Region | Description |
| --- | --- |
| Initial Evaluation 637 | Displays either an equal operator (=) or a not equal (<>) operator, when the part attribute comparison dialog box 630 first appears. An equal operator 632 indicates that all the values for that specific attribute are the same for all the selected parts. A not equal operator 631 indicates that at least one value, for all the same attributes, for all the selected parts, is not the same. |
| Attribute Title 638 | Displays the name of each attribute in a separate row. |
| Part 633, 634, 635 and 636 | Displays the values for each attribute for a particular part. Each attribute value is an element in a separate row for the column corresponding to that part. A part (column) number is at the top of the column corresponding to each part. |

Referring to FIG. 59B and FIG. 60, certain command buttons 639, 640 and 641 are provided in the illustrated embodiment. A "compare to selected part" command button 639 causes the system to compares all the attribute values of the other parts 633, 634, and 636 shown in the dialog box 630 to those belonging to a single part 635 a user has selected (see FIG. 60). The user must select the part 635 by clicking on its column number 635 (labeled "part 3" in FIG. 60) before choosing this command 639. A "clear comparisons" command button 640 causes the system, once a comparison has been conducted using the "compare to selected part" command 639, clears the comparison results (at which point the display will return to a display similar to that shown in FIG. 59B). A "close" command button 641 will cause the system to close the part attribute comparison dialog box or window 630 and return to the display window that was active before the compare parts dialog box 630 was opened. Table II describes the command buttons 639, 640 and 641 in the part attribute comparison dialog box 630.

TABLE II

| Command | Description |
| --- | --- |
| Compare to Selected Part, 639 | Compares all the attribute values shown in the dialog box to those belonging to a single part a user has selected. The user must select the part (that is, its column number) before choosing this command. |
| Clear Comparisons 640 | Once a comparison has been conducted using the Compare to Selected Part command, clears the comparison results. |
| Close 641 | Closes the dialog box. |

Referring to FIG. 60, when the compare to selected part command is issued, the attribute display changes to indicate the results of the comparison in a way that makes equal and unequal comparisons immediately apparent to a user in a very convenient manner. When all of the attribute values for the non-selected parts 633, 634, and 636 are compared to those for the baseline part 635, the cells 644 and 645 for attribute values that match are not shaded, and the cells 647 for attribute values that do not match are shaded. For example, the selected or baseline part 635 has a value for the attribute "major material" 648 indicating that the part is made of "steel" 646. The attribute value "steel" 646 for the selected part 635 is compared to the values of the other parts for the attribute "major material" 648. The first part 633 has a value of "steel" 644 for this attribute 648. Because it is the same value 644 as the attribute value 646 for the selected part 635, it is displayed unshaded, as shown in FIG. 60. Similarly, the second part 634 also has a value of "steel" 645 for this attribute 648. Because it is the same value 645 as the attribute value 646 for the selected part 635, it is also displayed unshaded, as shown in FIG. 60. The fourth part 636 has a value of "nylon" 647 for this attribute 648. Because it is not the same as or equal to the attribute value 646 for the selected part 635, it is displayed as a shaded cell 647, as shown in FIG. 60.

A procedure for comparing part attributes may include the following steps:

1. From the search results window, a user selects two or more parts that the user wants to compare.
2. From the actions menu, the user chooses compare parts.

The part attribute comparison dialog box 630 appears, showing which attribute values for a single attribute are the same (=) 632, or if any attribute values for a single attribute are different (<>) 631, in the first column 637.

3. Referring to FIG. 60, to compare the attribute values for all parts 633, 634, and 636 displayed in the dialog box 630 with those for a baseline part 635, the user clicks the baseline part column number 635 and chooses the compare to selected part command button 639.

All the attribute values for the non-selected parts 633, 634, and 636 are compared to those for the baseline part 635. The cells 644 and 645 for attribute values that match are not shaded; the cells 647 for attribute values that do not match are shaded.

4. To clear the color comparisons, the user chooses the clear comparisons command button 640.
5. To compare the attribute values for all parts displayed in the dialog to those for a different part, repeat step 3.

Figure 57:
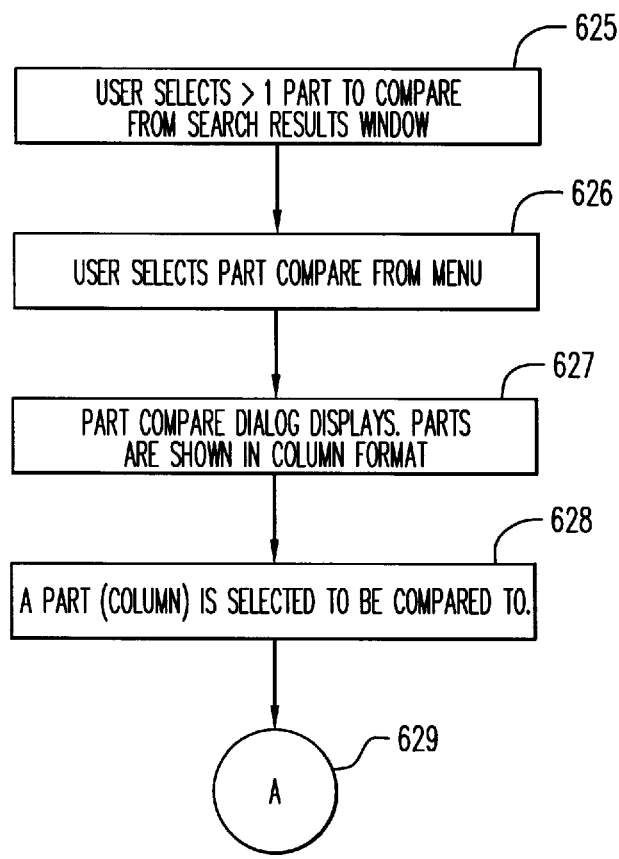
FIG. 57 and FIG. 58 depict flow charts for the process of comparing part attributes.
Figure 58:
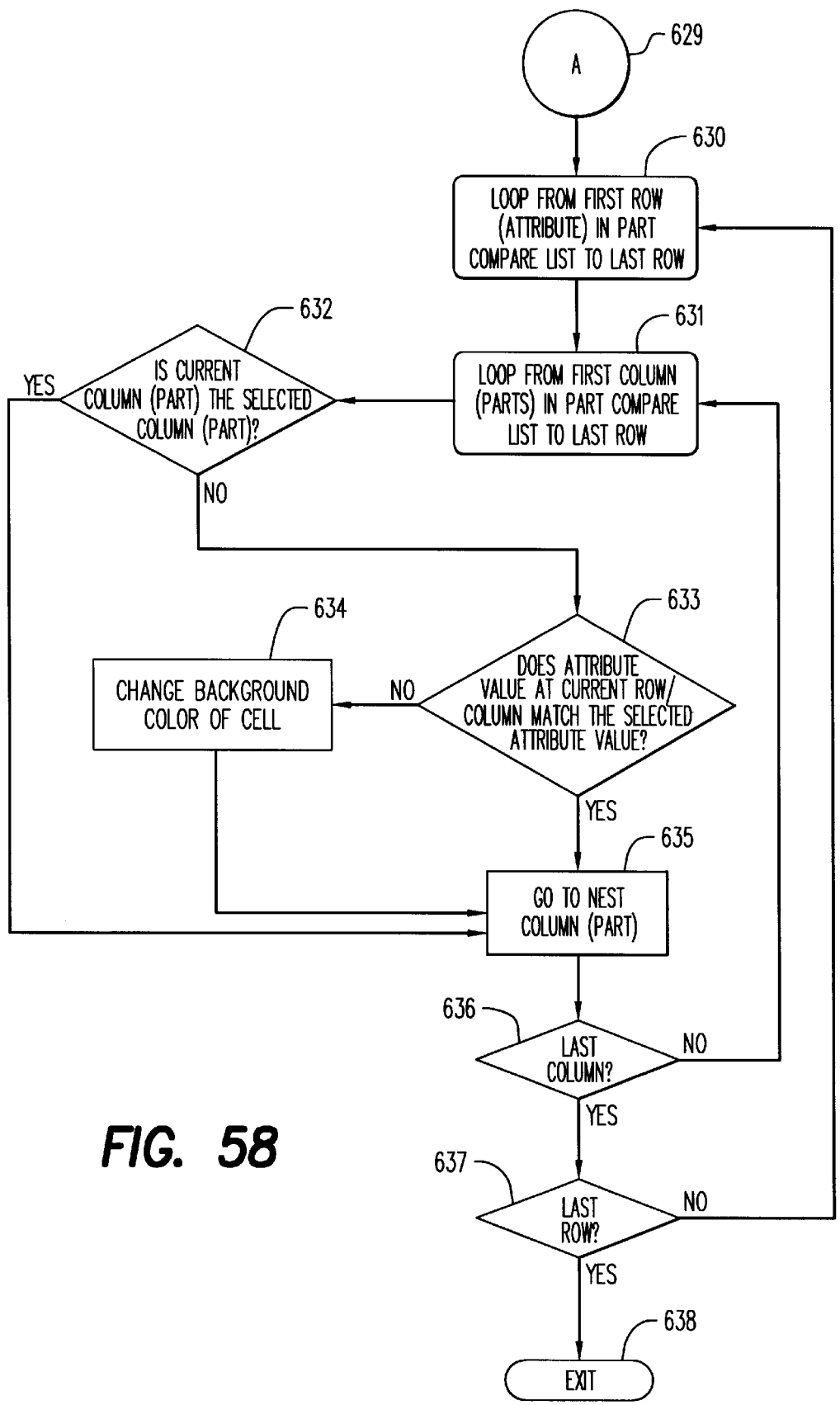

FIG. 57 and FIG. 58 depict flow charts for the process of comparing part attributes. In step 625, the user selects a number of parts greater than one for comparison. Of course, the user must select more than one part, because there would be nothing to compare with the baseline part if only one part was selected. In step 626, the user invokes a compare parts command 652 from an action menu 651.

In step 627, a window or dialog box is opened and the parts selected for comparison are displayed. In FIG. 59A, the part attributes are preferably displayed in rows. In a preferred embodiment, the part attributes are preferably displayed in columns as shown in FIG. 59B. The user then selects in step 628 a part 635 to compare. Point A identified with reference numeral 629 is a common point in the flow charts of FIGS. 57 and 58.

Step 630 is an entry point into an outer program loop, and step 631 is an entry point into an inner program loop. In step 632, the system checks to determine whether the current instance is the selected baseline instance 635. If it is, the method jumps to step 635 and goes to the next instance or column. If it is not, the method proceeds to step 633 where the method determines whether the corresponding attribute values are the same (or match) for the current instance and the selected instance 635. If the attribute values are equal, the display of that cell 644 of the attribute row 648 is unchanged, and the flow proceeds to step 635, where the procedure goes to the next instance. If the attribute values are not equal, the method goes to step 634, and the display of that cell 647 of the attribute row 648 is changed, for example to highlight it, or the background color is changed, or it is shaded. The flow then proceeds to step 635 and goes to the next instance, or column. In step 636, a check is made to determine whether this is the last instance for this attribute, i.e., whether it is the last column. If not, the process loops to step 631. If it is the last instance for this attribute, i.e., it is the last column, the procedure goes on to conduct a comparison of the next attribute, i.e., it goes to the next row. In step 637, the method checks to see if this is the last row. If not, the process loops back to step 630. If it is the last row, the comparison has been completed for all rows and columns, i.e., each attribute has been compared for every instance. The system then exits at step 638.

III. Concurrency Control

The present system supports interactive editing by one or more users connected through respective clients 131. For example, users are able to use a schema editor 144 to change the schema by adding and deleting attributes, to add whole sections to the schema, to reposition whole sections of the schema within the schema hierarchy, and to modify, add and delete instances. These interactive editing operations may be performed while other users are simultaneously using retrievers 130 to access the database 123. The management of these simultaneous operations, including the ability of a plurality of users to access the database 123 while a plurality of users are at the same time making changes to the database 123, is referred to as concurrency control.

In the disclosed embodiment, the object oriented lock manager 125 provides a concurrency control mechanism which allows users to query and view class objects without disruption of their view while modifications are being made by other users. These modifications include additions, deletions, and edits of classes, attributes, instances, and parameters.

In a preferred embodiment, the lock manager 125 is a subsystem of the class manager 134.

The disclosed embodiment optimizes performance of the concurrency control system by using lock inheritance based on class objects. The lock manager 125 implements a mechanism for locks to be placed on a class without subclass inheritance of the lock. This mechanism is referred to as a "class lock." The lock manager 125 also provides an inheritance mechanism for locks. The inheritance mechanism is referred to as a "tree lock." Tree locking a class will effectively result in a "lock" on all descendants of that class by inheritance without physically requiring the placement of class locks on the descendant classes.

Figure 3A:
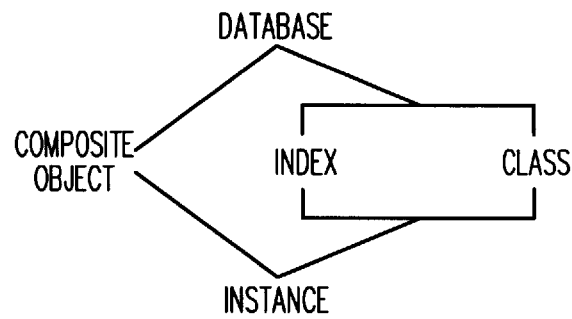
FIG. 3A is a schematic diagram which depicts an extended database granularity hierarchy proposed in the past.
Figure 3B:
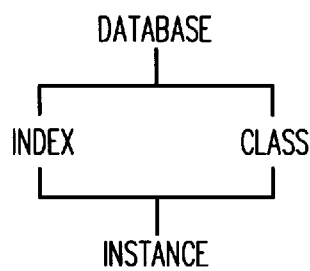
FIG. 3B is a schematic diagram that depicts another example of a hierarchy of lock granules proposed in the past.
Figure 3C:
FIG. 3C is a schematic diagram that depicts a hierarchy of lock granules in accordance with the present invention.
Figure 4A:
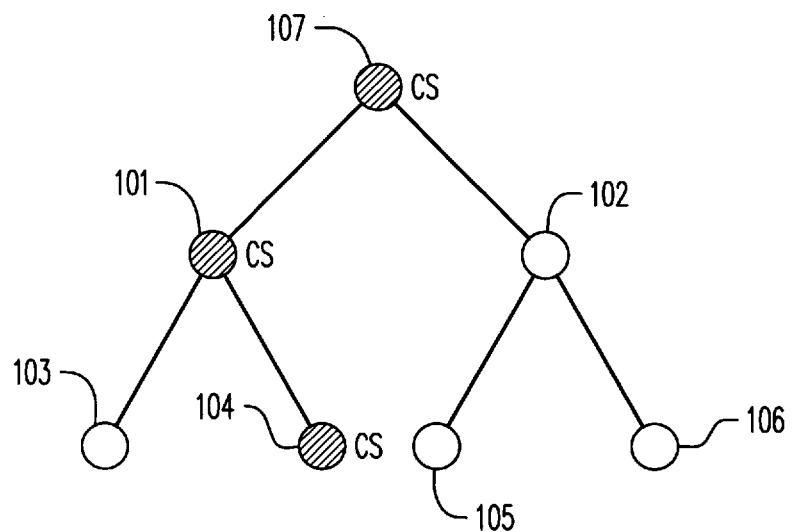
FIG. 4A is a schematic diagram that depicts a hierarchy in which a class share lock has been applied to three classes.
Figure 4B:
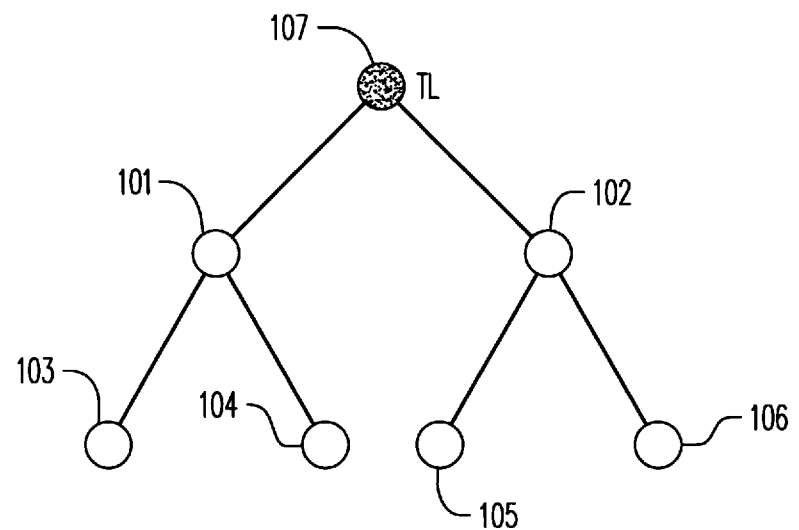
FIG. 4B is a schematic diagram that depicts a hierarchy in which a tree lock has been applied to a class, and in conjunction with FIG. 4A, demonstrates an example of lock subsuming.

The disclosed embodiment simplifies the number of objects that need to be locked by using class level lock granularity. This optimizes performance. The granularity or scope of a class lock is the class itself, the attributes defined by the class, and the instances associated with that class. FIG. 3C is a schematic diagram that depicts a hierarchy of lock granules in accordance with the disclosed embodiment. A significant feature of the disclosed embodiment is that it does not allow an instance to be locked independently of the class to which it belongs. This is in contrast to the approaches shown in FIG. 3A and FIG. 3B. In the disclosed embodiment, classes are locked, either individually (class locks), or in groups (tree locks), but instances are not locked as such. Concurrency is controlled, not by determining whether a instance in question is itself locked, but rather by determining whether the class to which it belongs is locked. The composite object is a class.

The disclosed embodiment can implement concurrency control in an object oriented database using only three types of lock modes, although four types are preferably employed. The three types of lock modes used in the disclosed embodiment are: class share lock ("CSL"), tree update lock ("TUL"), and tree exclusive lock ("TXL"). The fourth type of lock mode that may be used is a tree share lock ("TSL"), which may be considered to be in effect a group of class share locks. Therefore, in a preferred embodiment, the knowledge base server 132 actually supports four lock types: exclusive, update, and two flavors of share locks.

The "class share lock," which is also referred to as a "CSL," locks a single class node for sharing.

The "tree share lock," which is also referred to as a "TSL," locks the subtree rooted at the class for sharing. This lock behaves exactly like placing a CSL on each class in the subtree.

The "tree update lock," which is also referred to as a "TUL," locks the subtree rooted at the class for instance editing. This is sometimes called simply an 'update lock' or U-lock.

The "tree exclusive lock," which is also referred to as a "TXL," or sometimes simply as an X-lock, locks the subtree rooted at the class for exclusive use.

Some actions which change the knowledge base 123 can be performed without requiring an exclusive type of write lock. Another type of write lock, referred to herein as an "update" lock, is used for certain actions including modifying parameter values, adding, and moving instances. An update lock is a hybrid of the share and exclusive locks. An object may be update locked by at most one application, but simultaneously the object can be share locked by one or more applications. This means that the one application with the update lock can make changes to the object at the same time as it is being examined by the other applications. These changes to the knowledge base that can occur when an object is both update and share locked are considered easy enough for an application to recognize and manage.

An update lock is a "weaker" type of a write lock than an exclusive lock. Any change to the knowledge base 123 requires that a write lock has been requested and acquired. Some of the updating actions require an exclusive lock, and other updating actions require an update lock. But, the ones that require an update lock require "at least" an update lock. An exclusive lock is always sufficient for making a change to the knowledge base 123, but an update lock is a more friendly, more concurrent lock for making a selected set of changes.

The knowledge base client 131 uses the object oriented lock mechanisms provided by the lock manager 125 to place locks of appropriate granularity and inheritance to provide the maximum availability, stability, and performance of a tool using these mechanisms. The example described herein is optimized for a read oriented database system. It is particularly advantageous in a knowledge base schema that is used for parts management.

Locks serve two purposes. First, locks are used by the application or knowledge base client 131 to announce or make the statement that an object is being examined. Since it is harmless for multiple applications to examine the same object simultaneously, the type of lock used for this purpose is a share lock. Several applications can share an object by concurrently share locking it. Typically, applications use share locks as they navigate through the schema, perform queries, and examine instances.

The second use of locks by an application is to announce that it wishes to change an object. The application should insure that no other application is attempting to change the same object. This type of lock is called an write lock. Other applications are prevented from changing an object that is write locked. Typically, applications use write locks when adding or deleting instances, modifying parameter values, or editing the schema. As noted above, the knowledge base server 132 supports two types of write locks: exclusive locks and update locks. Exclusive locks are used to prevent applications from interacting in ways that could cause problems. For example, when an instance is to be deleted, or when the schema is edited, an exclusive lock is used. Where an object can be changed in ways that do not cause problems, a weaker update lock is preferably used to provide maximum concurrency.

It will be appreciated that most of the locks used in the disclosed embodiment are 'tree' locks. In the above discussion, references were made to locking an object (actually a class). What is really meant is that a class is under the influence of a lock. When the ancestor class of a given class is exclusive locked, then that class is also effectively exclusive locked because it is in the subtree which is rooted by an exclusive locked class.

An application establishes a lock by requesting it. If the request succeeds, then the application has acquired the lock. The application must release the lock when the object no longer needs to be locked. The request will fail if the lock conflicts with other locks that have already been requested by other applications. A conflict will occur if the request is for a write lock and the object is already write locked or if the request is for a share lock and the object is already exclusive locked.

The objects that can be locked are always classes. Instances are never locked. The preferred system uses a subtree as an alias for an instance. In this approach, fewer locks are applied, which results in a less complex and faster system. For an application to change some object which is not a class, a write lock on the class associated with that object is required. In other words, to add an instance a write lock must be requested for the class to which the instance is to be added. A parameter value can only be changed when the application requests a write lock on the class that owns in instance. For example, the schema developer or editor 144 requests exclusive locks on a class for making changes to attributes which are defined by that class.

The lock manager 125 and the knowledge base server 132 require an application to become a lock holder before it can request a lock. It becomes a lock holder by using the pmx_startLockHolder( ) function, and thus starting a lock holder. The pmx_startLockHolder( ) function is described more fully in the software functions section. The combination of the application's connection to the knowledge base server 132 and the lock holder are what distinguish one application from another for resolving conflicts between locks. An application can start multiple lock holders and thus cause conflicts for lock requests within the application. This is useful for subroutines within the application that need to be isolated. The application stops being a lock holder by ending the lock holder.

Figure 2:
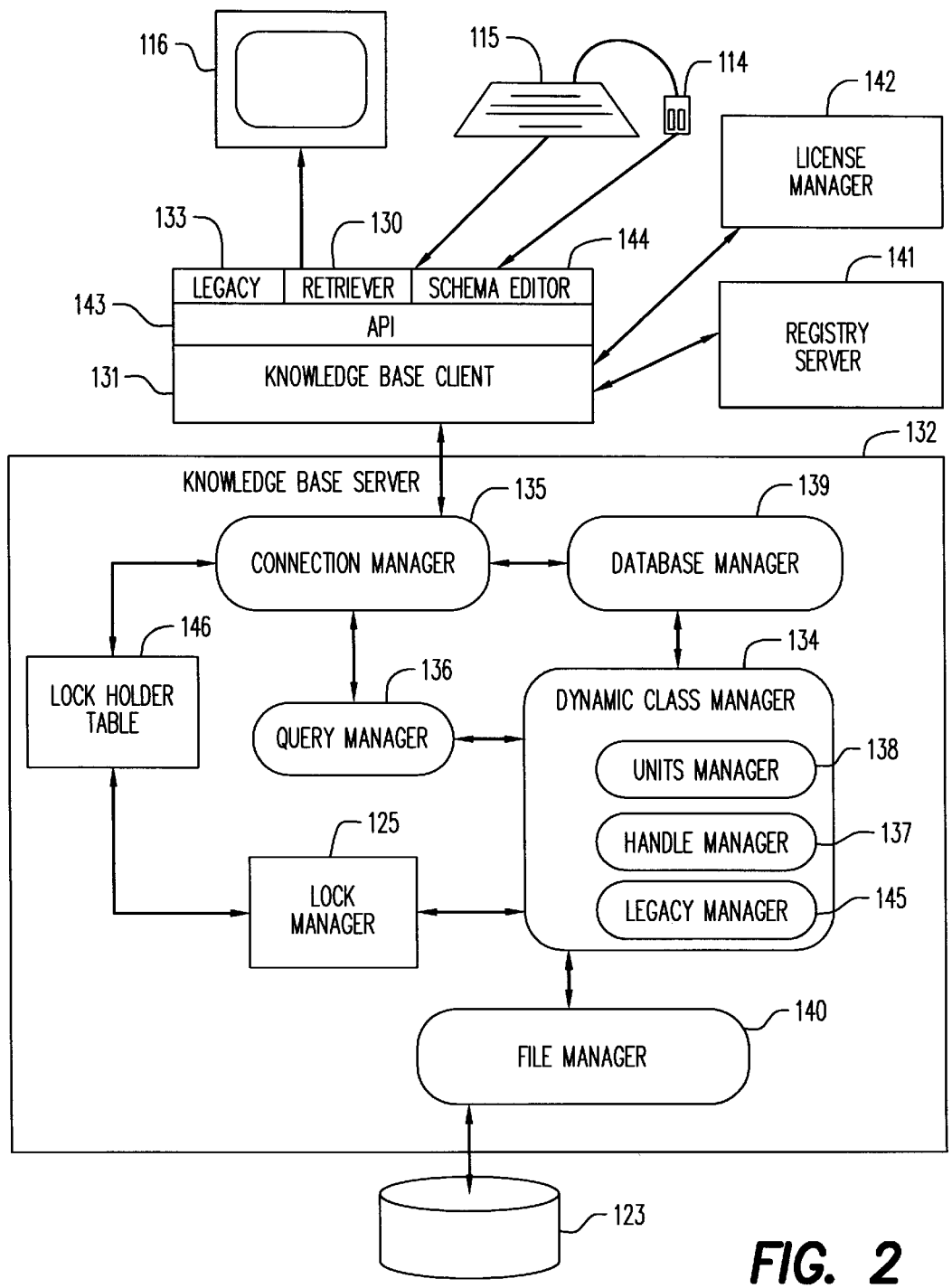
FIG. 2 is a block diagram depicting an overall architecture for a system employing a preferred embodiment of the present invention.

Each application connection to the knowledge base server has a unique lock holder table 146 as shown in FIG. 2. The lock holder table 146 is used by the lock manager 125 to manage the existing lock holders for each connection.

Figure 52:
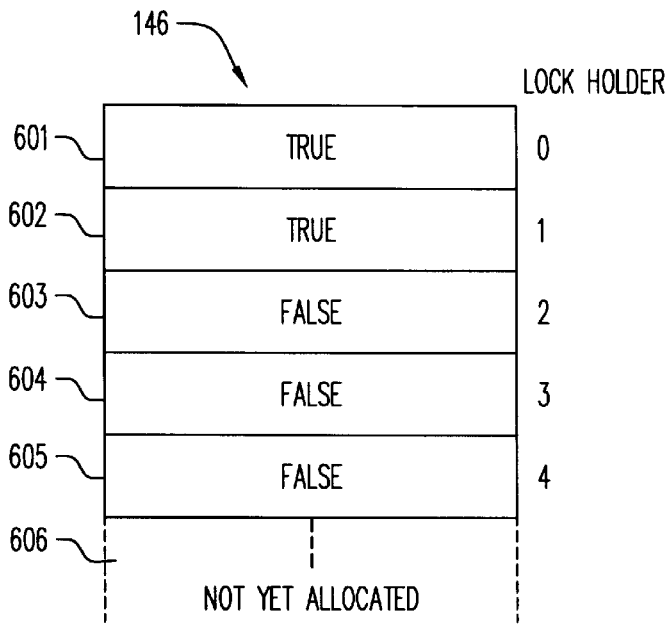
FIG. 52 shows the data structure for the lock holder table.

FIG. 52 shows the data structure for the lock holder table 146. In a preferred embodiment the lock holder table 146 is a dynamic list of Boolean values.

A TRUE value in the lock holder table 146 represents a lock holder that has been started. A FALSE value in the lock holder table 146 is a lock holder that has been ended or one that has never been used. The index into the lock holder table 146 is the lock holder handle 267 itself. Thus, in the example shown in FIG. 52, the TRUE value 601 is lock holder handle zero, and it has been started. The lock holder handle one 267 corresponds to the table 146 entry identified by reference numeral 602, and it has a TRUE value indicating that it has been started. The lock holder handle 2 with value FALSE 603 has been ended.

Figure 53:
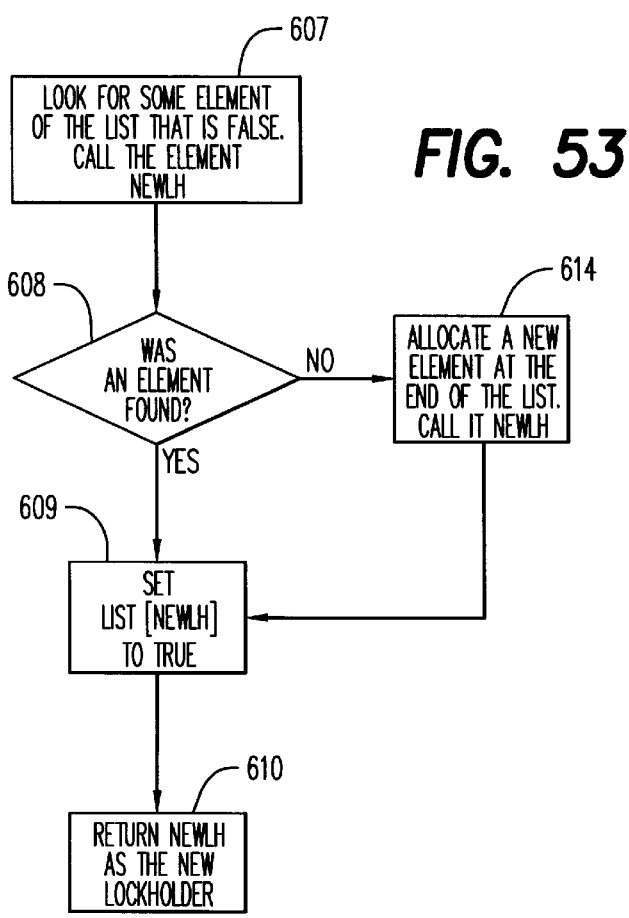
FIG. 53 is a flow chart showing the operation of starting a lock holder.

The operation of starting a lock holder is shown in the flow chart in FIG. 53. In step 607, the lock holder table 146 is searched for a value of FALSE, representing a lock holder that is not in use and can be allocated. If a FALSE element is found, then the table index is assigned to "newLH.". In step 608, if a FALSE element was found control proceeds to step 609 where the the lock holder table 146 element at index "newLH" is set to TRUE to indicate that the lock holder is being allocated. If a FALSE element was not found in step 608, control continues at step 611 where a new element 606 is allocated at the end of the lock holder table 146 and the index of this new element 606 is assigned to "newLH". Control continues at step 609. At step 610, the index "newLH" is returned as the newly started lock holder handle.

Figure 54:
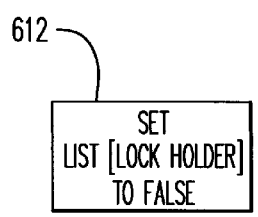
FIG. 54 is a flow chart for the operation of ending a lock holder.

FIG. 54 is a flow chart for the operation of ending a lock holder. The process can be performed very quickly in one step 612 in the disclosed embodiment. In step 612, the lock holder table 146 element indexed by the lock holder handle to be ended is set to FALSE.

Figures 5, 6:
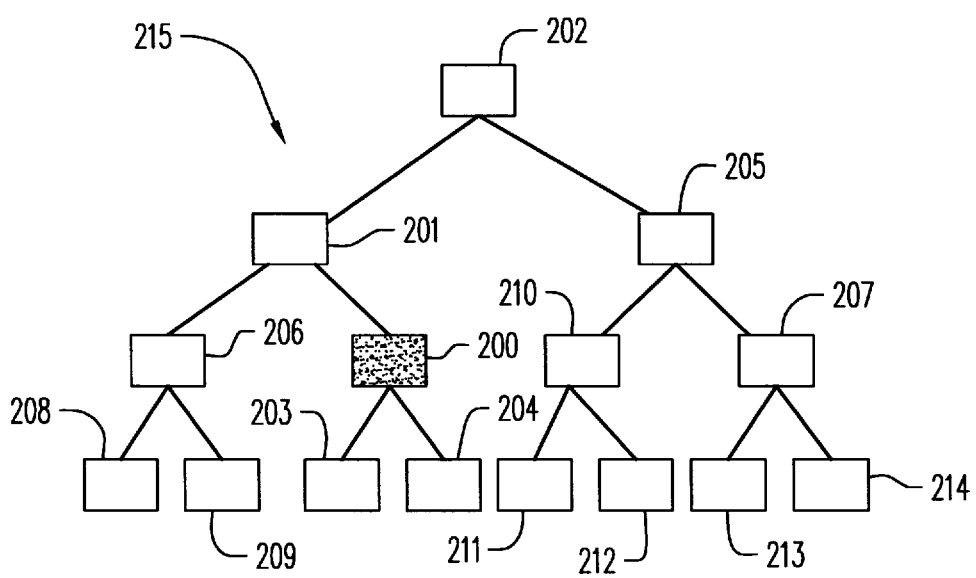
FIG. 5 is a diagram representing lock conflicts for the lock types and granularities employed by the present invention.
FIG. 6 is a diagram illustrating a hierarchy during a step in a process of granting a lock request.

FIG. 5 is a diagram representing the lock conflicts for the lock types and granularities provided in the disclosed embodiment. The first column 220 represents locks held by a first user, who will be referred to as lock holder 1. The top row 219 represents the lock requested by a second user, who will be referred to as lock holder 2. The conflict states are shown in the intersecting cells. The cells indicate whether the lock requested by lock holder 2 conflicts with the lock held by lock holder 1. For example, if lock holder 1 has a TUL on a class, represented by the location in column 220 indicated by reference numeral 216, and lock holder 2 requests a CSL, represented by the location in row 219 indicated by reference numeral 217, then the intersecting cell 221 shows that there is no lock conflict and lock holder 2 gets the CSL on the class.

Table III lists the available lock types used by the disclosed embodiment, lock granularities and their mnemonics. The most restrictive locking mechanism is the exclusive lock which only allows one lock holder. The most permissive lock type is a share lock which allows multiple lock holders of non-conflicting types. An intermediate level of concurrency is provided by the update lock. Although an object oriented lock manager may provide class exclusive locks or class update locks, the tree granularity for the lock types used in the preferred embodiment of the disclosed embodiment are sufficient to provide view stability. Share locks are preferably provided at both the class and tree granularity, but that is not required by the disclosed embodiment.

TABLE III

| | |
|---|---|
| TXL | Tree Exclusive Lock |
| TUL | Tree Update Lock |
| TSL | Tree Share Lock |
| CSL | Class Share Lock |

In a preferred embodiment, concurrency control primarily occurs at the application level, and not at the DBM (database management) level. The client application 130, 144 or 133 of the API 143 must explicitly request a lock when the application attempts a function. Although the description herein sometimes refers to a user or lock holder "requesting" a lock, in a preferred embodiment, the GUI programs may be written so that a user does not need to explicitly perform such a request in the sense that the GUI programs hide this operation from the user and the user may not actually be aware that the client application 130, 144, or 133 of the API 143 is requesting a lock. The client application may perform a background request to the lock manager 125 when the user attempts to navigate the hierarchy or edit parts, for example using the retriever 130 or the schema editor 144. If a conflict is detected or the request fails, the user is then informed through an appropriate dialog box or message that access to the portion of the schema that the user attempted to navigate or edit cannot be obtained. In a preferred system, the client applications 130, 144 and 133 are well behaved and cooperate to achieve concurrency control. In other words, concurrency is mediated by cooperating applications 130, 133, and 144.

A given application and lock holder combination can request multiple locks of the same type for the same class without conflict. For example, in the above description with reference to FIG. 5, the same user could be both lock holder 1 and lock holder 2. This may occur, for example, when the same user opens a second window. A count for each type of lock acquired by the application is maintained by the lock manager 125 of the knowledge base server 132. The locks must be released as many times as they are requested. However, in a preferred embodiment, locks can be released en masse in five ways. The knowledge base server supports two API functions for releasing multiple locks. All locks that have been acquired by a lock holder are released when the lock holder is ended. And, all locks that have been acquired by an application are released when the application closes the knowledge base 123 or when the application logs out.

The share locks supported by the lock manager 125 of the knowledge base server 132 are advisory. This means that the share lock is a means of announcing to other applications (ones that might want to edit instances or the schema) that a part of the schema is being navigated. Share locks are not required for navigating the schema or for querying and examining instances, but they are preferred. Acquiring a share lock prevents other applications from acquiring write locks, which are enforced. The lock manager 125 and the knowledge base server 132 will not allow any schema or instances to be edited without appropriate write locks. Therefore, if clients of the API 143, such as the retriever 130, schema editor 144, legacy 133, or user written API program, requests share locks whenever one of them navigates into a part of the schema, it will be insulated from any changes that might occur to the schema while it is navigating.

The client application 130, 144, and 133 of the API 143 should request a class share lock for a class whenever it gets a class descriptor or attribute descriptor for that class. This method insures that the data in the descriptor is valid and remains valid. The client application 130, 144, and 133 should also use a class tree lock at a class for which it does a query. This may be used to prevent another application from, for example, deleting instances in the subtree where the query is applied.

In the disclosed embodiment, locks are not subsumed. An object may have multiple locks of the same type. Lock requests and releases are paired. In the illustrated embodiment, a function to perform a release of a class share lock will only release one class share lock on an object.

Figure 7:
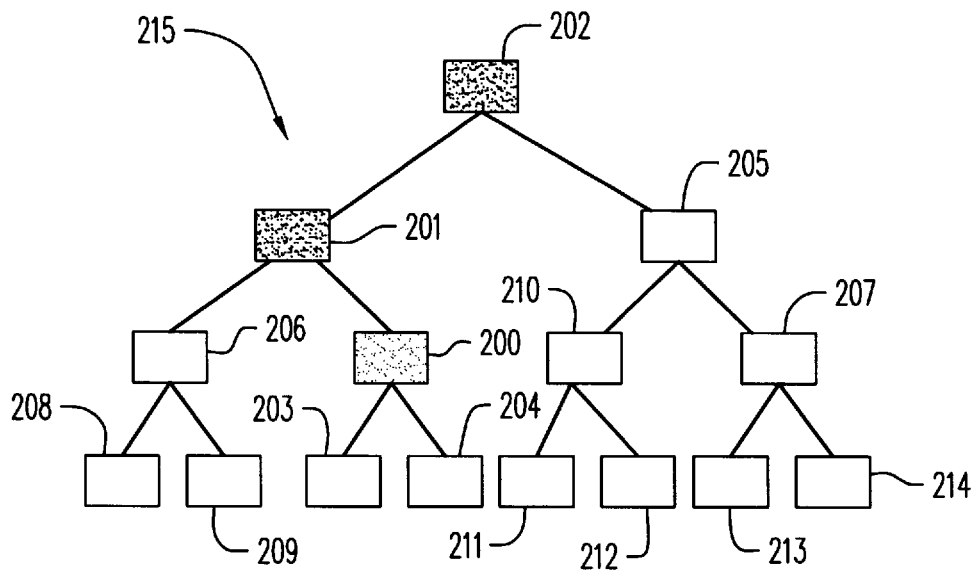
FIG. 7 is a diagram illustrating the hierarchy during a subsequent step in the process of granting a lock request.
Figure 8:
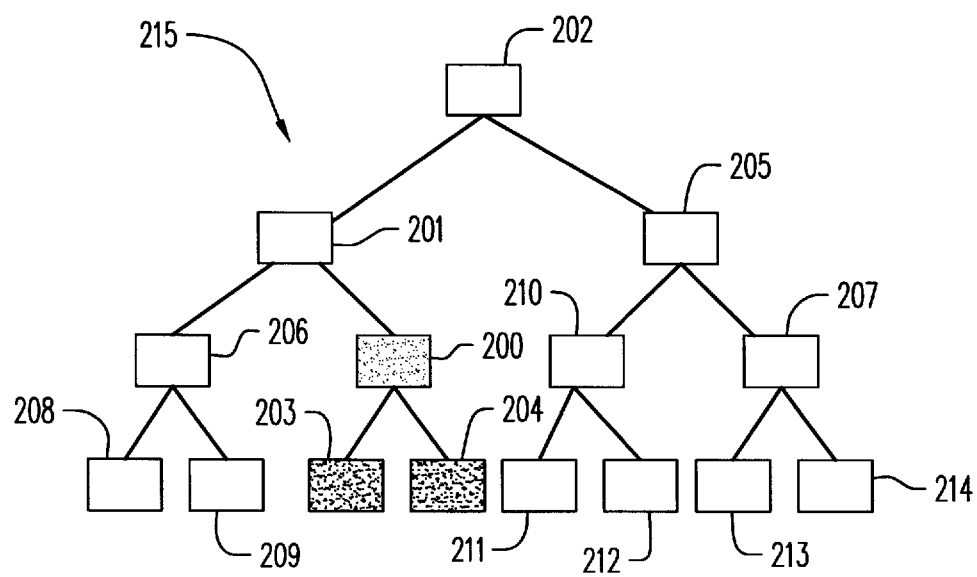
FIG. 8 is a diagram illustrating the hierarchy during a subsequent step in the process of granting a tree lock request on a class where the steps depicted in FIG. 6 and FIG. 7 are successful.

The operation of the lock manager 125 may be better understood with reference to FIGS. 6–8. FIG. 6 is a schematic diagram of a class hierarchy 215 representing an example of a portion of an object oriented database. In this example, class 202 is an ancestor for all of the other classes which are depicted. If FIG. 6 depicted the entire database, then class 202 would be the root class. Class 202 is the parent of class 201 and class 205. Class 201 has two children shown as class 206 and class 200. Class 205 is the parent of class 210 and class 207. Class 200 has two descendants: class 203 and class 204. Class 206 has two children shown as class 208 and class 209. Similarly, class 210 and class 207 each are shown with two children: classes 211 and 212, and classes 213 and 214, respectively.

If a lock is requested for class 200, the first step is checking whether the requested lock conflicts with any other lock at this class 200. This is represented in FIG. 6, where class 200 is shown as a black square to represent the step of examining the class 200 for conflicting locks at this point in the hierarchy 215. The determination of conflicts is performed in accordance with the matrix represented in FIG. 5. If the requested lock for class 200 is a class share lock CSL, and the class 200 is already subject to a class share lock CSL, a tree share lock TSL, or a tree update lock TUL, then there is no conflict, and the answer "No" (i.e., no conflict) would be returned. This is represented in FIG. 5 as a "No" at the intersection of the CSL column with the CSL, TSL, and TUL rows. If the requested lock for class 200 is a class share lock CSL, and the class 200 is already subject to a tree exclusive lock TXL, then there is a conflict and the answer "Yes" (i.e., yes there is a conflict) would be returned. This is represented in FIG. 5 as a "Yes" at the intersection of the CSL column with the TXL row. If there is a conflict, the requested lock is not granted.

The lock request procedure would then continue in this particular example with the step of checking whether the requested lock conflicts with any other lock at the ancestors 201 and 202 of the class 200. This is represented in FIG. 7, where class 201 and class 202 are shown as a black squares to represent the step of examining the ancestor classes 201 and 202 for conflicting locks at these points in the hierarchy 215. The determination of conflicts is performed in accordance with the matrix represented in FIG. 5. The class 200 is represented in FIG. 7 as a shaded square to indicate that the class 200 is the class for which the lock is requested. After the check in FIG. 6 is completed successfully, the ancestor classes 201 and 202 of class 200 are checked for conflicts. In this example, the request for a lock on class 200 could be for either a class or tree lock. If a conflict is indicated, the requested lock is not granted. If no conflict is detected, the answer "No" is returned. In such a case, the requested lock may be granted if the requested lock is a class share lock. If the requested lock is a tree exclusive lock, a tree share lock, or a tree update lock, the procedure continues to the step described in connection with FIG. 8.

FIG. 8 is a diagram illustrating a hierarchy during a subsequent step in the process of granting a tree lock request on class 200, if the checks in FIG. 6 and FIG. 7 are successful. The descendent classes 203 and 204 are checked for conflicts. The class 203 and the class 204 are each shown as a black square to represent the step of examining the descendent classes 203 and 204 for conflicting locks at these points in the hierarchy 215. The determination of conflicts is performed in accordance with the matrix represented in FIG. 5. The class 200 is represented in FIG. 8 as a shaded square to indicate that the class 200 is the class for which the lock is requested. If a conflict is indicated, the answer "Yes" is returned and the requested lock is not granted. If no conflict is detected, the answer "No" is returned and the requested lock is granted.

The operation of the lock manager 125 may be best understood with reference to FIGS. 44–51. During operation, the lock manager 125 maintains a dynamic lock table 400 shown in FIG. 51. The lock table 400 interacts with the schema. For example, if a class is physically added or deleted from the schema, the lock table 400 is changed accordingly. Locks are evaluated by the system based upon the inheritance pattern reflected by the schema. The lock table 400 is maintained in the illustrated example by the knowledge base server 132.

Figure 51:
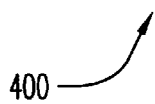
FIG. 51 is a diagram of a lock table that is used by the lock manager.

The lock table 400 shown in FIG. 51 is organized in the preferred embodiment so that each row corresponds to a class in the schema. Each column corresponds to a lock holder using the system. Each cell of the lock table 400 has been numbered for purposes of reference during the discussion that follows. For example, the intersection of the row corresponding to class handle 3 and the column corresponding to lock holder 2 is indicated by reference numeral 410. If the a class share lock is placed on the class corresponding to class handle 5 by the user corresponding to lock holder 3, then the lock manager 125 would place a CSL indication in element 419 of the lock table 400. It will be appreciated by those skilled in the art that there is no provision in the concurrency control system according to the disclosed embodiment for locking an instance; the lock table 400 only makes provision for classes.

If lock holder 6 attempted to place some type of lock on the class corresponding to class handle 4, the lock manager 125 would have to check element 404 of the lock table 400 to determine whether lock holder 1 had a conflicting lock on that class. The determination of what lock type conflicts with the type of lock that the lock holder 6 was attempting to place on the class would be determined in accordance with the lock conflict table of FIG. 5. If no conflicting lock was found at cell 404, then the lock manager 125 would proceed to check cell 411 to determine whether lock holder 2 had a conflicting lock on the class corresponding to class handle 4. If not, the lock manager 125 would proceed to check cell 418 to determine whether lock holder 3 had a conflicting lock on the class. The lock manager 125 would continue until all corresponding cells 425, 432 and 446 for the remaining lock holders 4, 5, and 7, respectively, were checked. This is essentially the procedure corresponding to the process represented in FIG. 6.

In order to perform checks of ancestor classes, for example checking class 201 shown in FIG. 7, the lock manager 125 must have a mechanism to supply the lock manager 125 with information as to what class handle corresponds to the class 201. The dynamic class manager 134 performs this function. Thus, in order to implement the ancestor check depicted in FIG. 7, the dynamic class manager 134 will supply the lock manager 125 with the class handle for the ancestor class 201. If the corresponding class handle is class handle 2, then the lock manager 125 can perform a check of the cells 402, 409, 416, 423, 430, and 444 in the row corresponding to the class handle 2 in the manner described above with reference to the row for class handle 4.

Similarly, in order to perform a check of descendent classes 203 and 204 shown in FIG. 8, the dynamic class manager 134 will supply the lock manager with the class handles corresponding to these classes, and the lock manager may check the corresponding rows of the lock table 400 to determine if there is a conflicting lock. When an operation involves an instance, the dynamic class manager 134 supplies the lock manager 125 with the owning class for that instance, and the system checks for lock conflicts with that class.

When a lock is requested, the lock manager uses both the connection and the lock holder handle 267 for identifying lock conflicts. When a schema or instance edit is attempted, the dynamic class manager 134 first asks for authorization to perform the operation from the lock manager 125. In one embodiment, only the connection is used to check for authorization. In this example, the lock holder that asked for the edit operation is not taken into account when checking for the existence of the appropriate lock. This optimization was done in this particular example to prevent requiring a lock holder handle as an input argument to each of the API editing functions.

Figure 44:
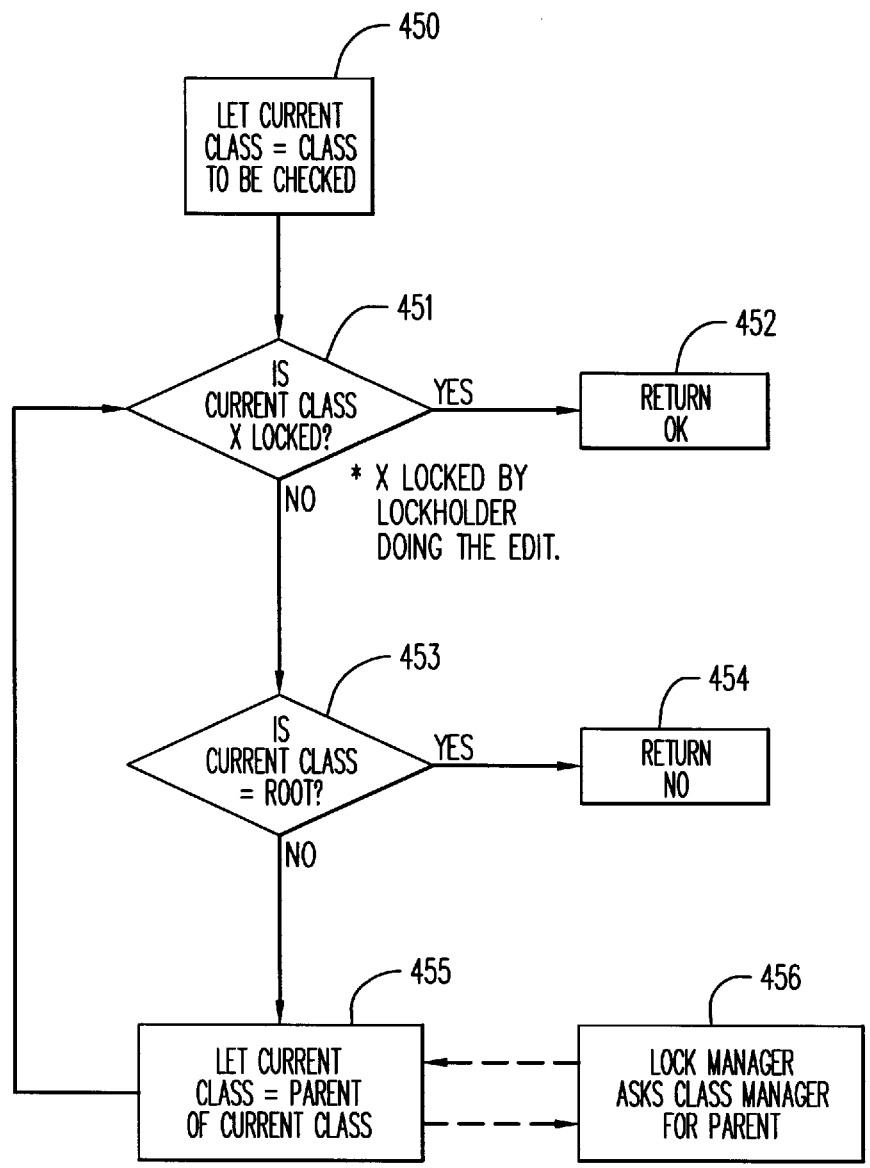
FIG. 44 is a flow chart depicting the steps for requesting authorization to do a schema edit.

FIG. 44 is a flow chart depicting the steps for requesting authorization to do a schema edit. An exclusive lock is required by the lock holder in order to do the desired schema edit. In step 450, the current class is set equal to the class to be checked. In step 451, the "current class" is checked to see if it is exclusive locked, (i.e., whether it has a tree exclusive lock TXL). Referring to FIG. 51, if the requesting lock holder is lock holder 3, and the current class is class handle 3, this step in effect checks the intersection cell 417 for an exclusive lock. If it is exclusive locked, then it means in this example that it is exclusive locked by the lock holder that is attempting to do the edit. In that event, the lock manager 125 returns an "OK" indication in step 452 to the client 131 corresponding to the requesting lock holder 3. If it is not exclusive locked, the flow proceeds to step 453 where the lock manager 125 checks to determine whether the "current class" is the root class. If it is the root class, the lock manager 125 returns a "no" in step 454. If it is not, the flow proceeds to step 455, where the "current class" is set equal to the parent class of the class that was the "current class." The lock manager 125 asks the dynamic class manager 134 who the parent is, and that information is supplied to the lock manager 125 by the class manager 134. The procedure then loops back to step 451, as shown in FIG. 44. In effect, the lock manager 125 will check the ancestors using this procedure.

Figure 45:
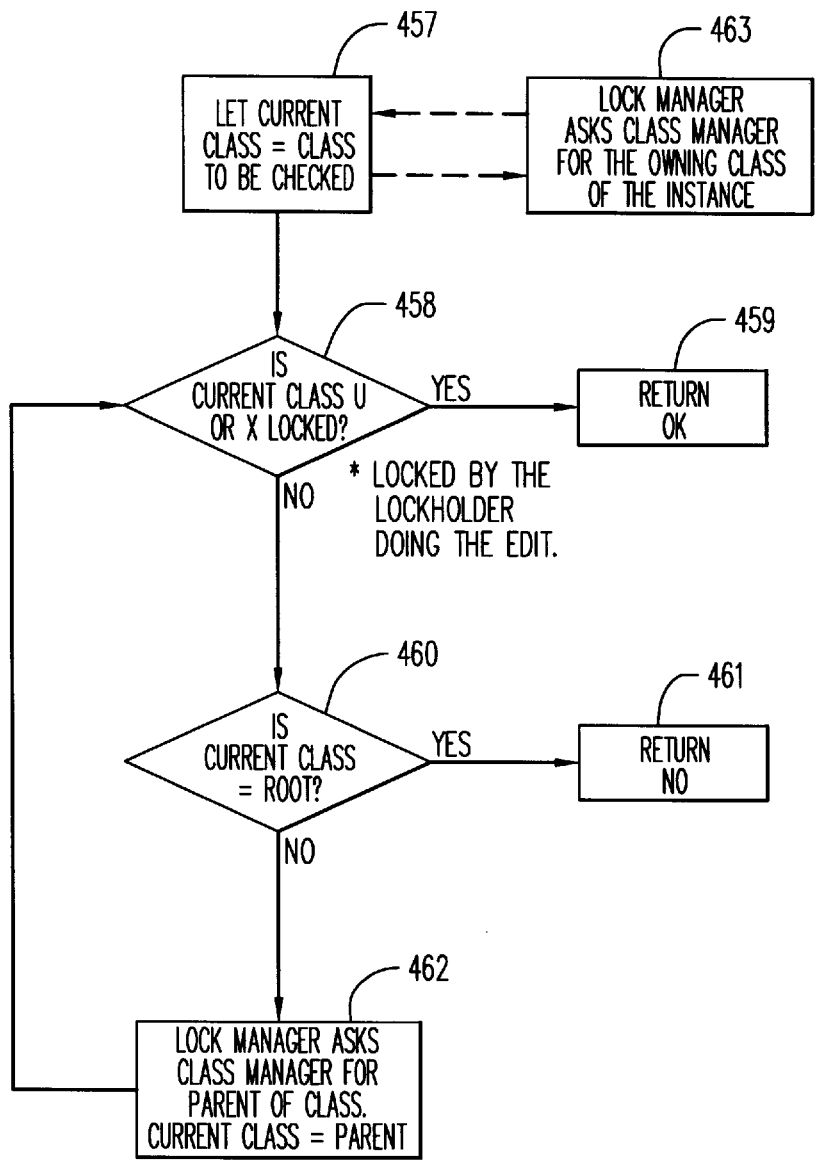
FIG. 45 is a flow chart depicting the steps for requesting authorization to do an instance edit.

FIG. 45 is a flow chart depicting the steps for requesting authorization to do an instance edit. In order to perform an edit of an instance, an exclusive lock or an update lock is required. The lock manager 125 must first ask the class manager 134 to tell the lock manager 125 who is the owning class for the instance, and this information is provided by the dynamic class manager 134. In step 457, the current class is set equal to the class to be checked. In step 458, the "current class" is checked to see if it is exclusive locked or update locked, (i.e., whether it has a tree exclusive lock TXL or a tree update lock TUL). If it is exclusive or update locked, then it means in this example that it is so locked by the lock holder that is doing the edit. In that event, the lock manager 125 returns an "OK" indication in step 459 to the client 131 corresponding to the requesting lock holder. If it is not exclusive locked, the flow proceeds to step 460 where the lock manager 125 checks to determine whether the "current class" is the root class. If it is the root class, the lock manager 125 returns a "no" in step 461. If it is not, the flow proceeds to step 462, where the "current class" is set equal to the parent class of the class that was the "current class." The lock manager 125 asks the dynamic class manager 134 who the parent is, and that information is supplied to the lock manager 125 by the class manager 134. The procedure then loops back to step 458, as shown in FIG. 45.

Figure 46:
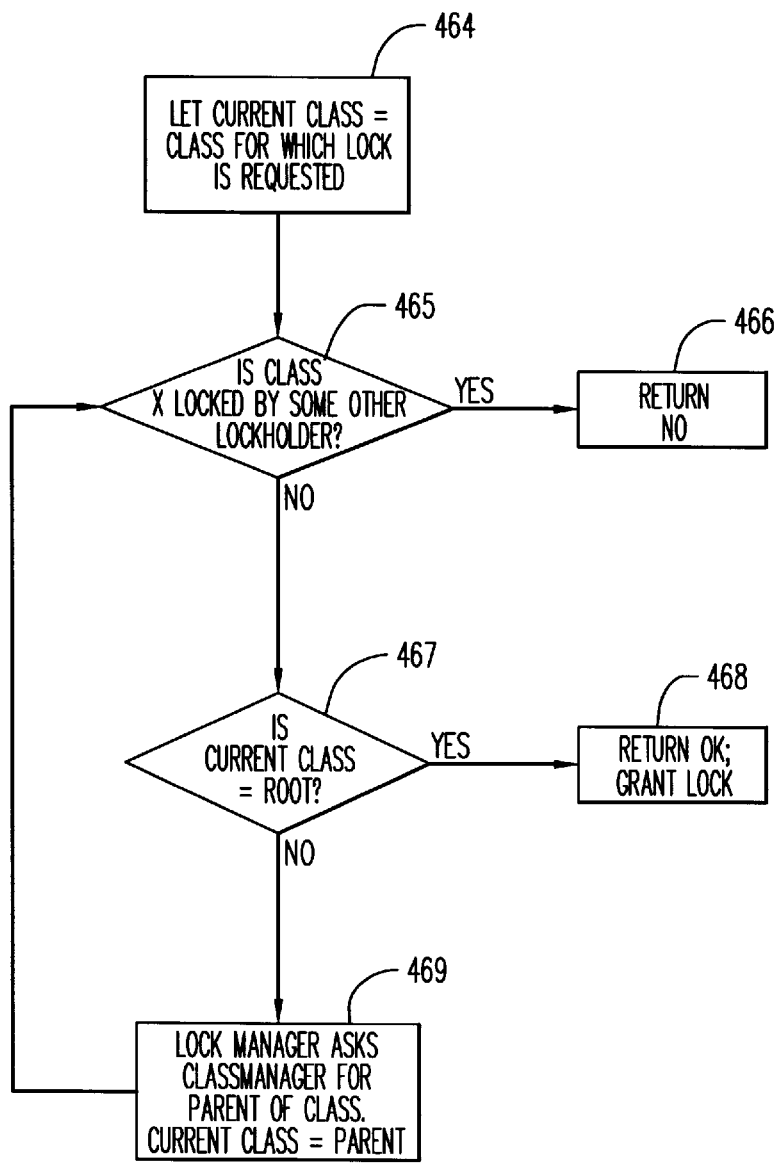
FIG. 46 is a flow chart depicting the steps for requesting a class share lock.

FIG. 46 is a flow chart depicting the steps for requesting a class share lock. In step 464, the "current class" is set equal to the class for which the lock is requested. In step 465, the class is checked to determine whether it is exclusive locked by some other lock holder. If it is, the lock manager 125 returns a "no" in step 466. If it is not, the lock manager 125 proceeds to step 467, where the lock manager 125 checks to determine whether the "current class" is the root class. If it is, the lock manager 125 returns a "yes" and grants the requested CSL in step 468. If it is not, the lock manager 125 proceeds to step 469, where the lock manager 125 asks the class manager who the parent class is. When that information is supplied to the lock manager 125, the "current class" is set equal to the parent class, and the flow loops back to step 465.

Figure 47:
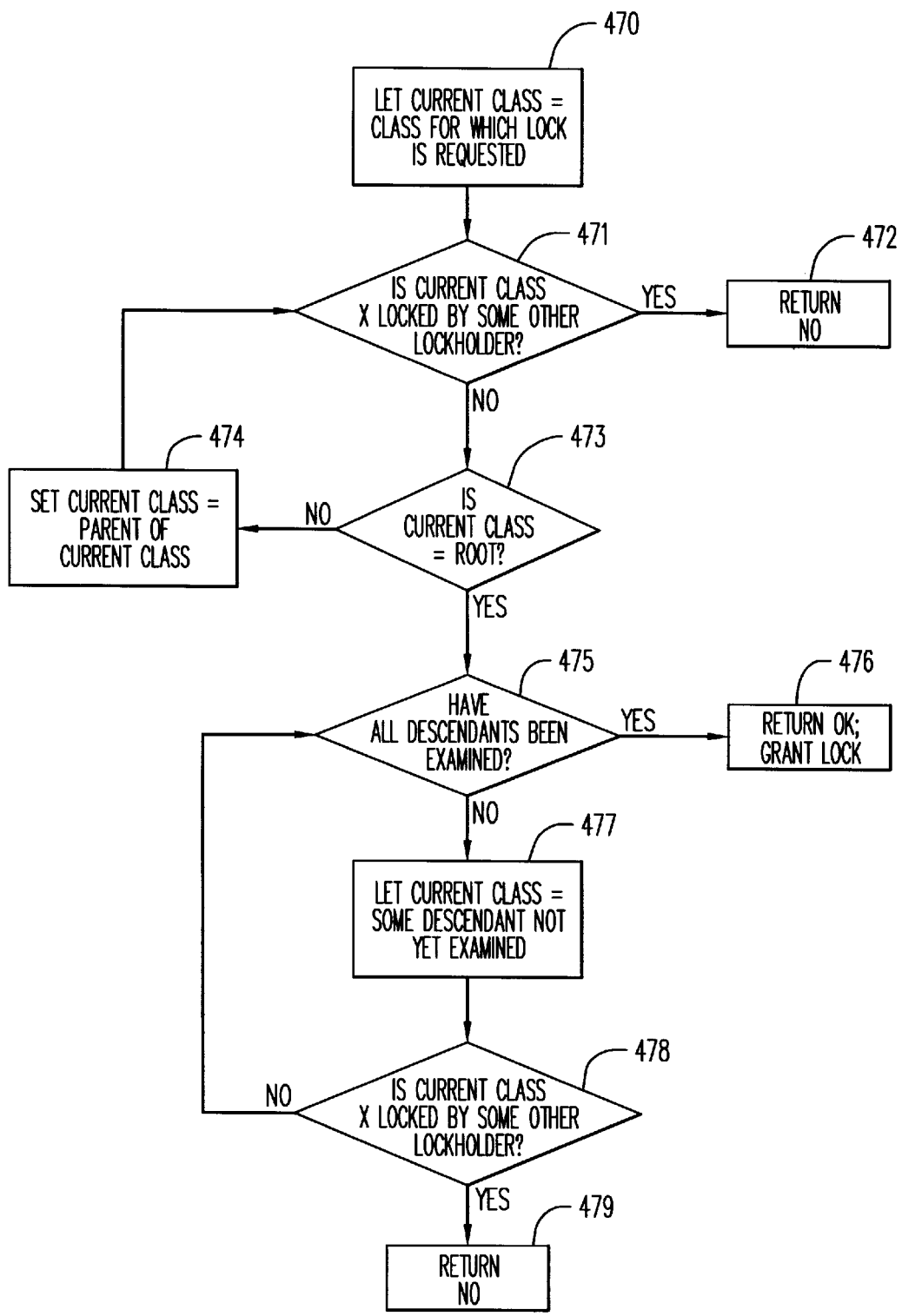
FIG. 47 is a flow chart depicting the steps for requesting a tree share lock.

FIG. 47 is a flow chart depicting the steps for requesting a tree share lock. In step 470, the "current class" is set equal to the class at which the tree lock is requested. In step 471, the "current class" is checked to determine whether it is exclusive locked by some other lock holder. This checks the row in the lock table 400 corresponding to the "current class" at every cell except the cell in the column corresponding to the requesting lock holder. If it is, the lock manager 125 returns a "no" in step 472. If it is not, the lock manager 125 proceeds to step 473, where the lock manager 125 checks to determine whether the "current class" is the root class. If it is not, the lock manager 125 proceeds to step 474, where the lock manager 125 sets the "current class" equal to the parent class (the lock manager 125 must obtain the identification of the parent class from the class manager 134). The procedure then loops back to step 471. This effectively results in checking the ancestors. If it is found to be the root class in step 473, the lock manager 125 checks to see if all of the descendent classes have been checked in step 475. If they have, then the lock manager 125 returns a "yes" and grants the requested TSL in step 476. If not, in step 477 the lock manager 125 sets the "current class" equal to some descendent that has not yet been examined.

In step 478, the lock manager 125 then checks to determine whether the new "current class" is exclusive locked by some other lock holder. This effectively results in checking the corresponding row in the lock table 400 at every cell except the cell in the column corresponding to the requesting lock holder. If the new "current class" is not exclusive locked by some other lock holder, the flow loops back to step 475. This loop effectively results in checking all of the descendants. If the new "current class" is exclusive locked by some other lock holder, then the lock manager 125 returns a "no" in step 479.

Figure 48:
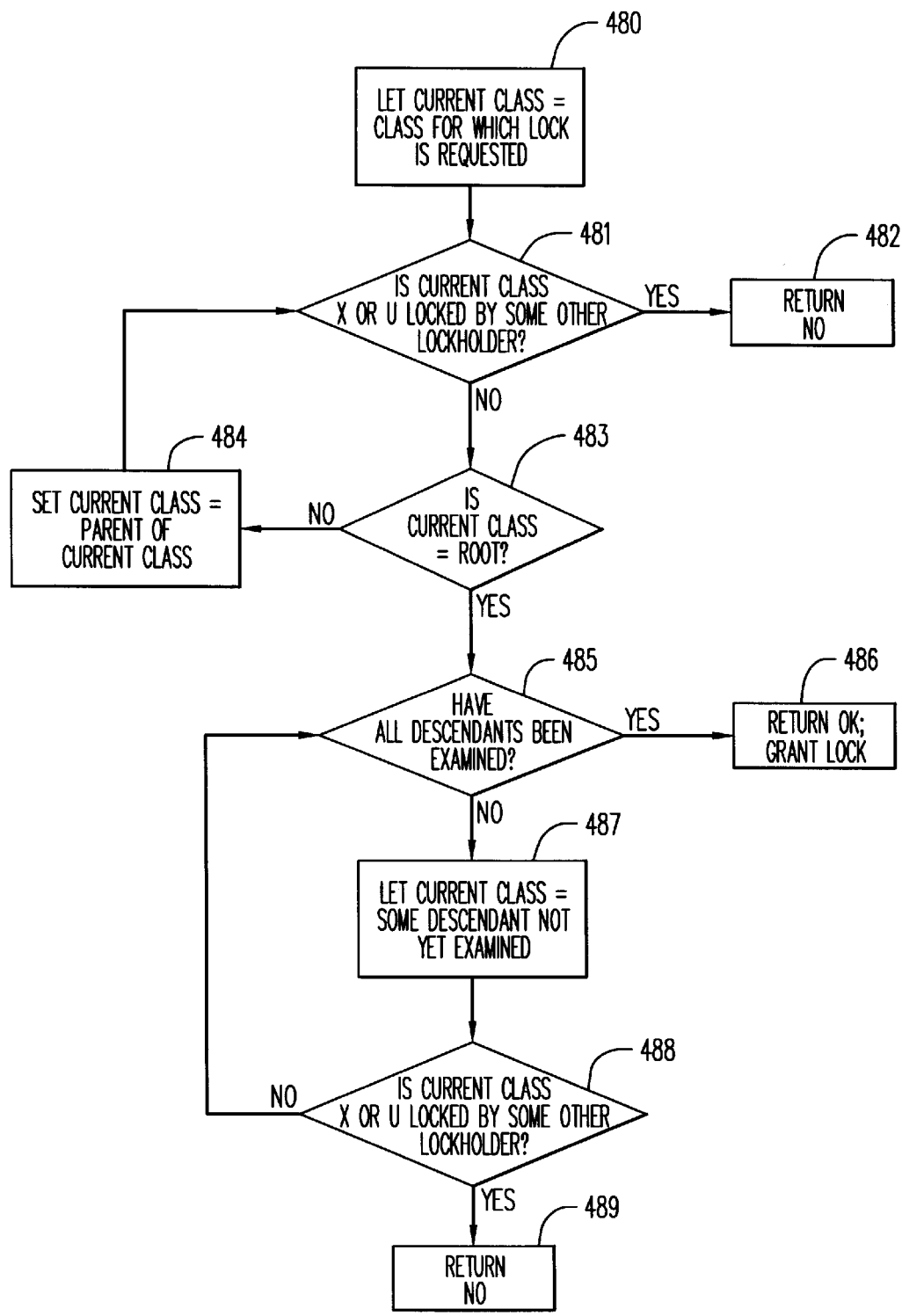
FIG. 48 is a flow chart depicting the steps for requesting a tree update lock.

FIG. 48 is a flow chart depicting the steps for requesting a tree update lock. In step 480, the "current class" is set equal to the class at which the tree lock is requested. In step 481, the "current class" is checked to determine whether it is exclusive locked or update locked by some other lock holder. This checks the row in the lock table 400 corresponding to the "current class" at every cell except the cell in the column corresponding to the requesting lock holder. If it is, the lock manager 125 returns a "no" in step 482. If it is not, the lock manager 125 proceeds to step 483, where the lock manager 125 checks to determine whether the "current class" is the root class. If it is not, the lock manager 125 proceeds to step 484, where the lock manager 125 sets the "current class" equal to the parent class (the lock manager 125 must obtain the identification of the parent class from the class manager 134). The procedure then loops back to step 481. This effectively results in checking the ancestors. If it is found to be the root class in step 483, the lock manager 125 checks to see if all of the descendent classes have been checked in step 485. If they have, then the lock manager 125 returns a "yes" and grants the requested TUL in step 486. If not, in step 487 the lock manager 125 sets the "current class" equal to some descendent that has not yet been examined.

The lock manager 125 then checks in step 488 to determine whether the new "current class" is exclusive locked or update locked by some other lock holder. This effectively results in checking the corresponding row in the lock table 400 for the new "current class" at every cell except the cell in the column corresponding to the requesting lock holder. If the new "current class" is not exclusive locked by some other lock holder, the flow loops back to step 485. This loop effectively results in checking all of the descendants. If the new "current class" is exclusive locked or update locked by some other lock holder, then the lock manager 125 returns a "no" in step 489.

Figure 49:
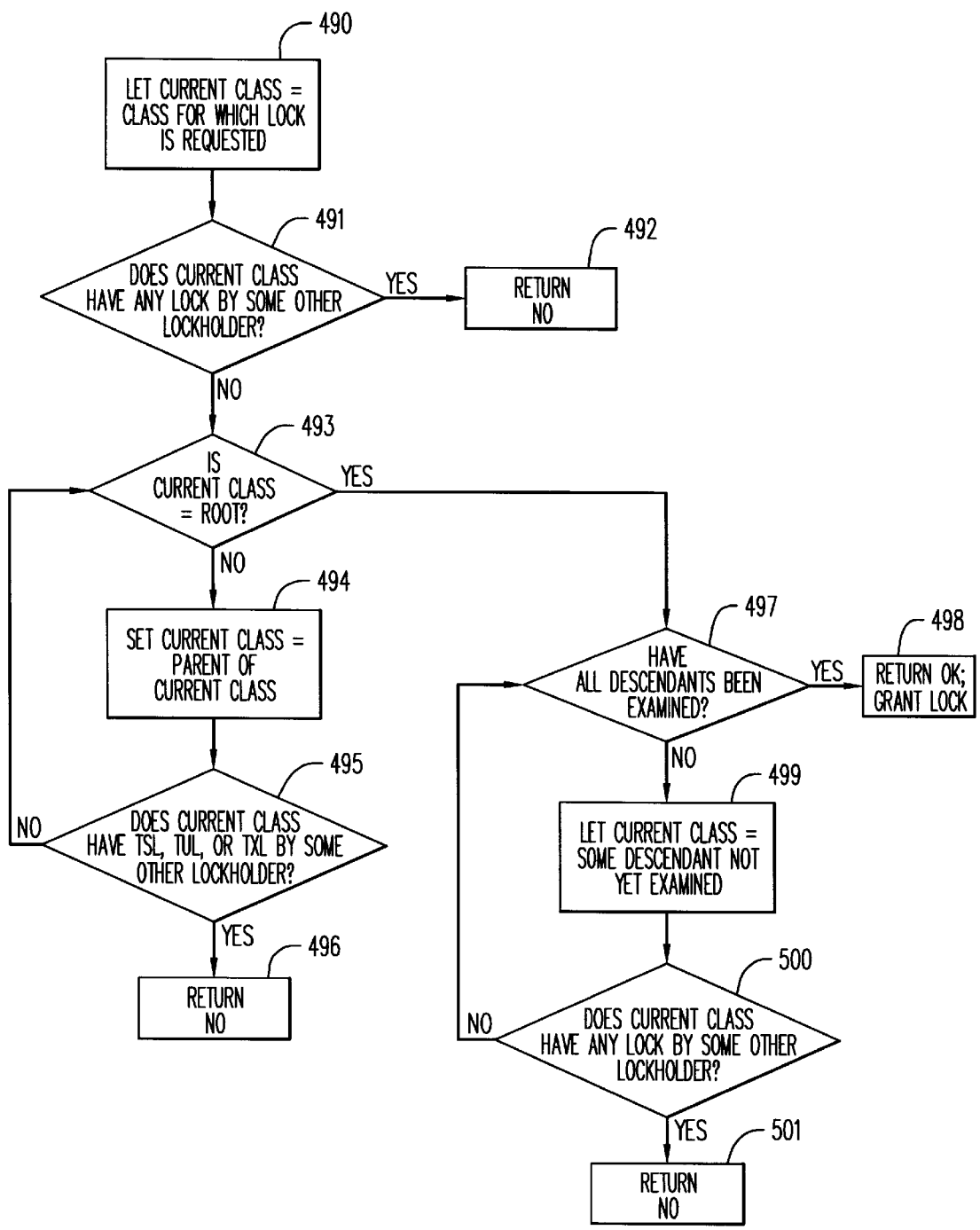
FIG. 49 is a flow chart depicting the steps for requesting a tree exclusive lock.

FIG. 49 is a flow chart depicting the steps for requesting a tree exclusive lock. In step 490, the "current class" is set equal to the class at which the tree lock is requested. In step 491, the "current class" is checked to determine whether it has any lock by some other lock holder. This checks the row in the lock table 400 corresponding to the "current class" at every cell except the cell in the column corresponding to the requesting lock holder. If any other lock holder has any type of lock on the "current class," the lock manager 125 returns a "no" in step 492. If it is not, the lock manager 125 proceeds to step 493, where the lock manager 125 checks to determine whether the "current class" is the root class. If it is not, the lock manager 125 proceeds to step 494, where the lock manager 125 sets the "current class" equal to the parent class (the lock manager 125 must obtain the identification of the parent class from the class manager 134). The procedure then proceeds to step 495, where the lock manager 125 checks to determine whether the new "current class" has a TSL, TUL or TXL by any other lock holder. If it does, the lock manager 125 returns a "no" in step 496. If it does not, the flow loops back to step 493. In step 493, if the "current class" is found to be the root class, the lock manager 125 checks in step 497 to see if all of the descendent classes have been checked. If they have, then the lock manager 125 returns a "yes" and grants the requested TXL in step 498. If not, in step 499 the lock manager 125 sets the "current class" equal to some descendent that has not yet been examined.

The lock manager 125 then checks in step 500 to determine whether the new "current class" is has any type of lock by some other lock holder. This effectively results in checking the corresponding row in the lock table 400 for the new "current class" at every cell except the cell in the column corresponding to the requesting lock holder. If the new "current class" does not have any type of lock by some other lock holder, the flow loops back to step 497. This loop effectively results in checking all of the descendants. If the new "current class" has any type of lock by some other lock holder, then the lock manager 125 returns a "no" in step 501.

Figure 9:
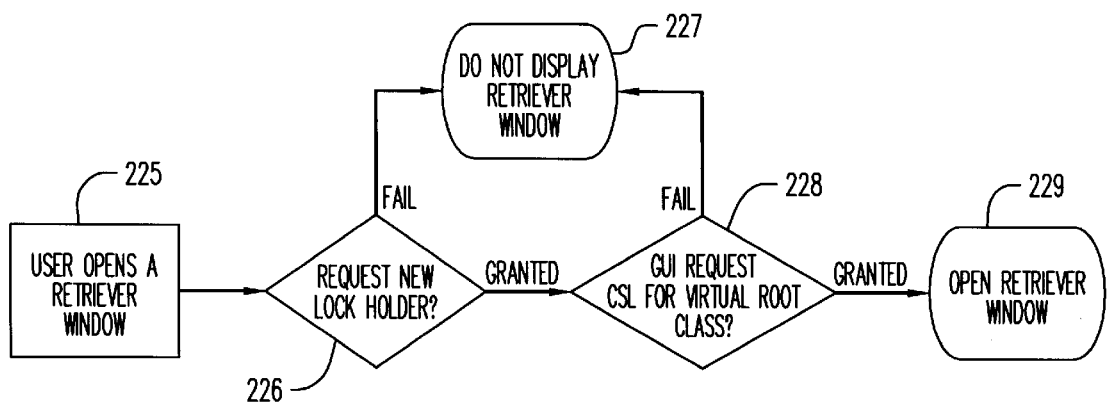
FIG. 9 is a flow diagram representing the locking process performed when a retriever window is opened.

When a client 131 invokes a retriever 130, the concurrency system will perform the procedure depicted in FIG. 9 to open a retriever window 290. FIG. 9 is a flow diagram representing the locking process performed when the retriever window 290 is opened. In step 225, the user attempts to open a retriever window 290. A new lock holder is requested in step 226. If the request for a new lock holder in step 226 fails, then the flow proceeds to step 227, and the client 131 will not display a retriever window. If the request for a new lock holder is granted, the flow proceeds to step 228.

The new lock holder is associated with that user. In many cases there may be a one-to-one correspondence between users and lock holders. However, a single user can be more than one lock holder, so the following discussion will refer to lock holders. In the procedure depicted in FIG. 9, the new lock holder then requests a CSL for the root class in step 228. In the illustrated example, a GUI associated with the client 131 will request the class share lock for the root class. If the requested CSL is not granted, the flow proceeds to step 227, and the retriever window will not be displayed. Preferably, a message to the user is generated by the system in step 227. If the CSL requested in step 228 is granted, the flow proceeds to step 229, and a retriever window is opened for the lock holder and displayed on the user's display 116.

Figure 10:
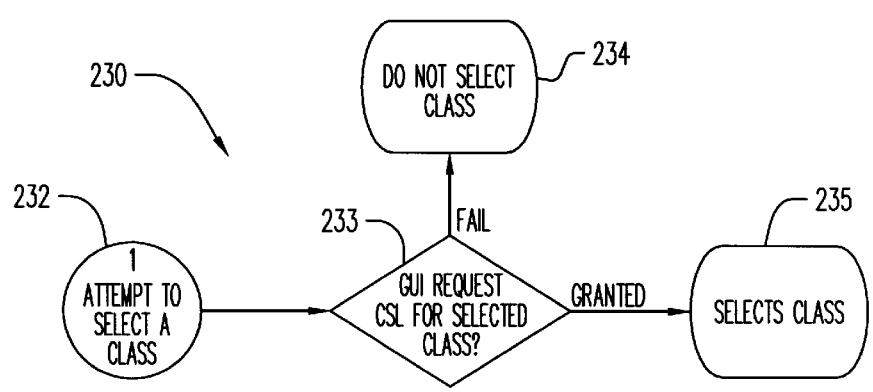
FIG. 10 illustrates the process that occurs when a class is selected in the class hierarchy.

FIG. 10 depicts a process 230 that is performed by the system when a class is selected in the class hierarchy. When the user attempts to select the class in step 232, a request for a CSL is issued in step 233 by the GUI associated with that user's knowledge base client 131. If the request fails, the flow proceeds to step 234; the class is not selected. If the CSL is granted, the flow method proceeds to step 235, where the class becomes the selected class, becomes highlighted, and associated attributes are displayed.

Figure 13:
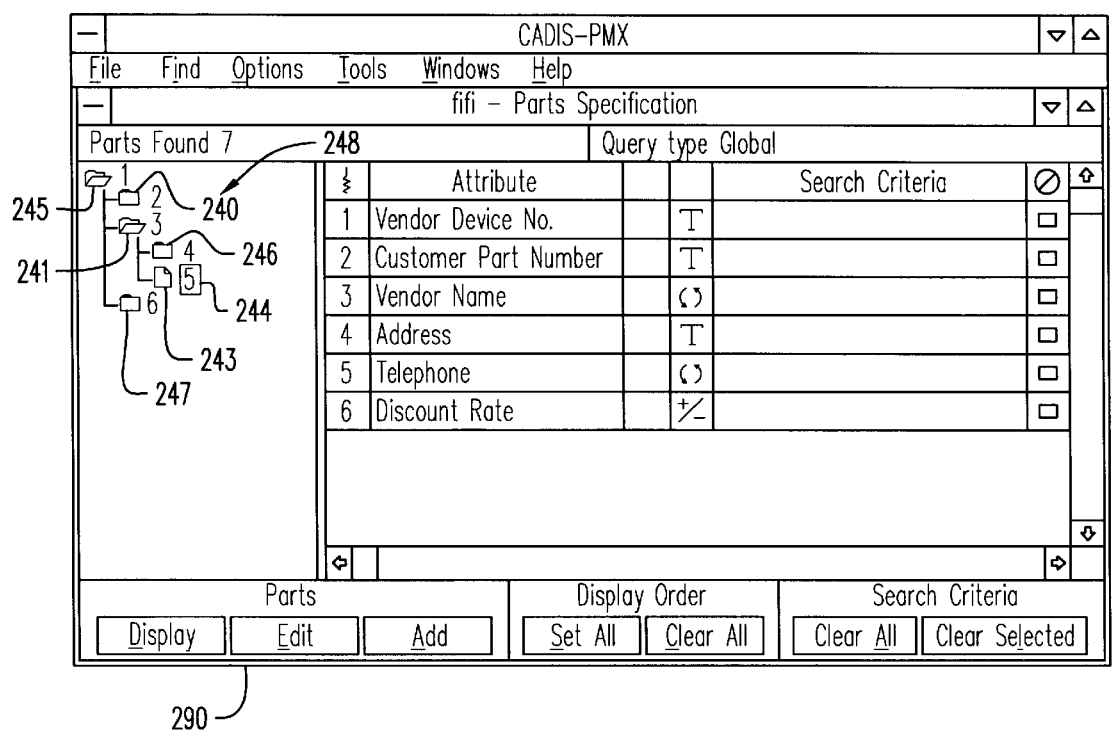
FIG. 13 depicts an example of a screen display when navigating the schema by opening and selecting classes.

FIG. 13 shows an example of a screen that may be displayed on the user's display 116 when the user is navigating the class tree 248. A root class 245 is designated class 1 in the display. Class 240 is a descendent of the root class 245, and is designated class 2 in the display. Class 241 is also a descendent of the root class 245, and is designated class 3 in the display. In addition, class 247 is a descendent of the root class 245, and is designated class 6 in the display. Class 241 has two descendants: class 246 and class 243. Class 246 is designated class 4 in the display shown in FIG. 13. And class 243 is designated class 5 in the display. In the illustrated example, the user selected class 243. If the CSL is granted in the method 230 depicted in FIG. 10, the class 243 becomes the selected class, becomes highlighted 244, and associated attributes 242 are displayed.

Figure 11:
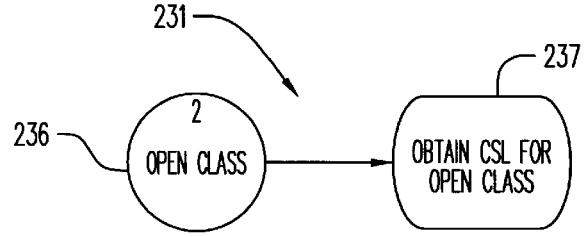
FIG. 11 is a flow diagram that represents the process of opening a class to view subclasses.

FIG. 11 is a flow diagram that represents a process 231 of opening a class to view subclasses. Referring to FIG. 13, in this example, the user double clicks on the class 241 to be opened, and a request for a CSL is issued in step 236 of FIG. 11. If the CSL is granted, the method proceeds to step 237, and the display of the class 241 changes from a closed folder (such as is shown in FIG. 13 for class 240) to an open folder 241, and all subclasses 246 and 243 are displayed. The step 237 of obtaining a CSL for the open class 241 is illustrated in the method shown in FIG. 11 as a single step, it being understood that step 237 comprises multiple steps similar to steps 233, 234 and 235 shown in FIG. 10.

Figure 12:
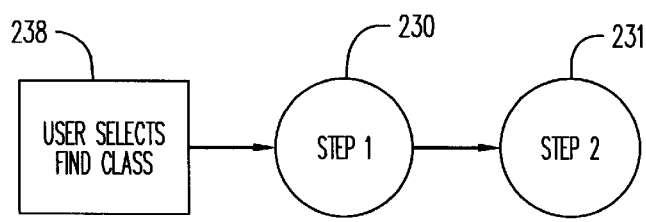
FIG. 12 is a flow diagram representing a process that occurs when a user selects a "find class" activity.

FIG. 12 is a flow diagram representing the steps of a process that occurs when a user selects the "find class" activity in step 238. (The find class activity is a class search through the class hierarchy or schema). A class matching a search pattern is first selected using the process 230 depicted in FIG. 10. If the process 230 depicted in FIG. 10 is successful, then the class is opened using the process 231 depicted in FIG. 11. It will be understood by those skilled in the art that the steps 230 and 231 shown in FIG. 12 correspond to multiple step procedures shown in FIGS. 10 and 11, respectively.

The lock manager 125 maintains a lock table for each class in the schema, and for each lock holder. This may be better understood with reference to FIGS. 14–16.

FIG. 14 is a diagram of a schema 248 corresponding to the display of FIG. 13, and it illustrates corresponding internal lock states of the classes 245, 240, 241, 246, 243, and 247 in the schema 248. FIG. 15 illustrates a lock table 250 maintained by the lock manager 125 and corresponds to the schema 248 depicted in FIG. 14 and displayed in FIG. 13. FIG. 16 is a diagram that illustrates the contents of a lock object 260 for class 243 in the lock table 250 shown in FIG. 15.

The schema 248 that is displayed in FIG. 13 can be diagrammed as shown in FIG. 14 to show the internal lock states of the classes 245, 240, 241, 246, 243, and 247 that are maintained by the lock manager 125. The processes described in FIG. 11 and FIG. 12 for opening and selecting classes have been performed on the schema 248 shown in FIG. 14. Class 245 and class 241 have been opened. Class 243 has been selected.

Lock states are kept in the lock table 250 by the lock manager 125. The rows identified by reference numerals 251, 252, 253, 254, and 255 of the lock table 250 each corresponds to a class 245, 240, 241, 246, 243, and 247, respectively, in the schema 248. Each lock holder has a corresponding column, which are shown in FIG. 15 as lock objects 256, 257, 258, and 259. The lock table elements correlate the class handles 251, 252, 253, 254, and 255 of the classes 245, 240, 241, 246, 243, and 247 in the schema 248 with the lock objects 256, 257, 258, and 259. Class handle 251 in the lock table 250 has a CSL lock object 261 associated with lock holder 257 because the class 245 in the schema 248 is open on the display 1 16 of the user who is lock holder 257. The class 241 in the schema 248 has a CSL 262 because the user who is lock holder 257 also has it open. Class 243 in the schema 248 has a CSL lock object 260 because it is the selected class. Of course, the lock object 269 corresponding to the class handle 254 for this lock holder 257 is empty in FIG. 15, because the corresponding class 246 shown in FIG. 14 has no locks. Similarly, the lock object 249 is blank or empty in FIG. 15, because the corresponding class 240 shown in FIG. 14 has no lock applied to it.

An example of an element 260 of the lock table 250 corresponding to the selected class 243 is shown in FIG. 16. The contents of the lock object 260 for class 243 include means for indicating whether any lock types are applied to the corresponding class 243. In the illustrated embodiment, a CSL count 263 indicates that one class share lock exists for this class 243. A lock holder handle 267 is used by the lock manager 125 to identify each lock holder. When a request for a new lock holder 226 is granted, (see FIG. 9), a lock holder handle 267 is assigned to the new lock holder. Thus, the procedure for granting a request for a new lock holder includes the step of assigning a lock holder handle to the new lock holder. In the illustrated example, each user has a unique user identifier or user ID. The lock object 260 includes a record of the user ID 268 of the user who corresponds to the lock holder handle 267. Because a single user may be a multiple lock holder, the user ID 268 for other lock holders 256, 258 or 259 may be the same as the user ID 268 for the lock object 260.

In the example shown in FIG. 16, the lock holder 267 has a class lock on class 243, but does not have any tree locks (TSL, TUL, or TXL) on the class 243. Thus a count for TXL locks 264 is zero. Similarly, a count for TUL locks 265 and a count for TSL locks 266 are both zero in this example.

Figure 17:
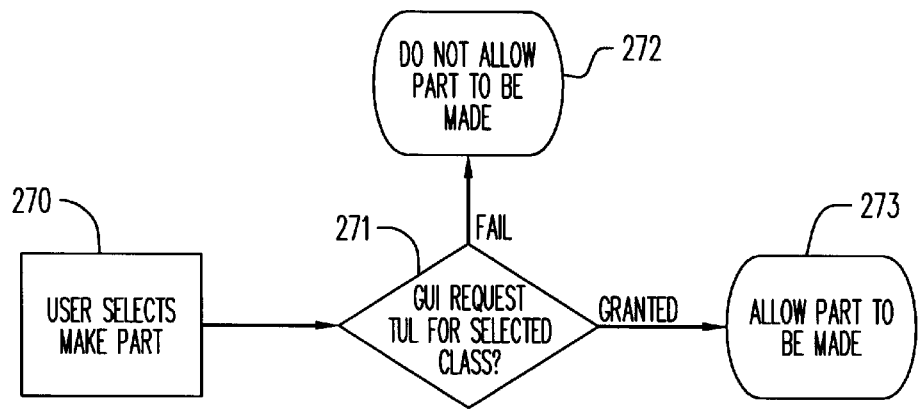
FIG. 17 diagrams the process that occurs when a user adds a part to a class in the knowledge base.

FIG. 17 diagrams the process that occurs when the user discussed above with reference to FIGS. 13-16 adds a part to a class 243 in the knowledge base 123. When the user selects the 'make part" function in step 270 using the retriever 130 to add an instance to the database 123, the client 131 requests a tree update lock in step 271 for the selected class 243. If the request for a TUL is successful, the flow proceeds to step 273 and the user is given access to add the part. The TUL is then released by the lock manager 125 when the add part operation is completed. If the request for a TUL is not granted, the flow proceeds to step 272, and the user is denied access for the purpose of making a part. In a preferred embodiment, the user is given a message when access is not permitted to inform him or her of such event in step 272.

Figures 18, 19, 20:
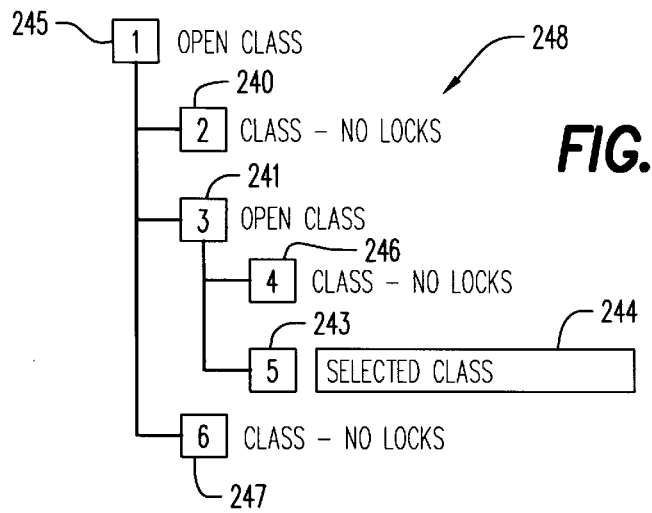
FIG. 18 shows a schema having a class to which a part is being added.
FIG. 19 depicts the lock table states for the process of adding a part as described in FIG. 17.
FIG. 20 shows a lock object corresponding to the class for the add part operation corresponding to FIGS. 18–19.
Figure 21:
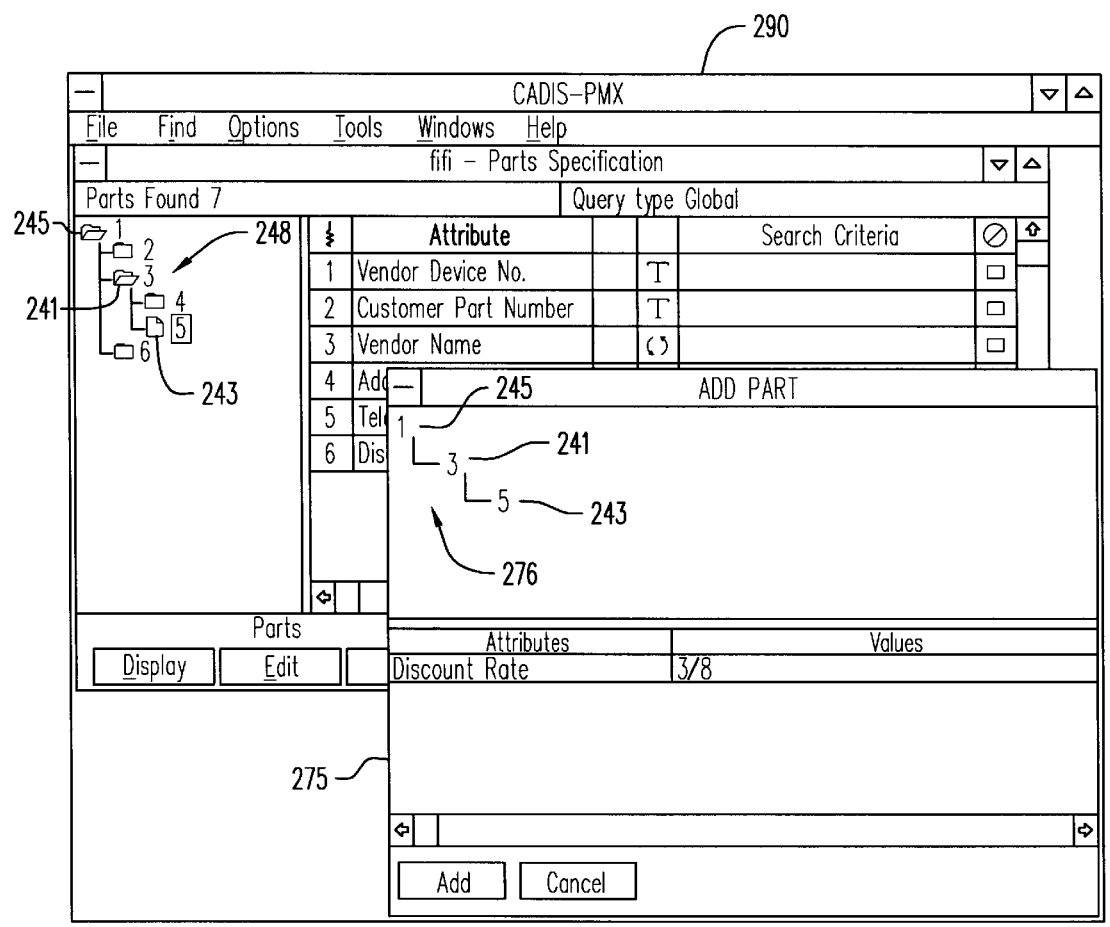
FIG. 21 depicts an example of a screen display when adding a part to the schema.

FIG. 19 depicts the states of the lock table 250 for the process of adding a part as described in FIG. 17. FIG. 18 diagrams the schema 248 to which the part is being added. A part is being added to class 243 in the schema 248 shown in FIG. 18. FIG. 21 shows the screen display during the process of adding a part under these circumstances. In order to perform the function of adding a part, a tree update lock is required. If it is granted, the lock object 260 for class 243 will have a TUL for the add part operation, and will also have a CSL as shown in FIG. 19, since the class 243 in the schema 248 is also the selected class. Of course, the lock object 269 corresponding to the class handle 254 for this lock holder 257 is empty in FIG. 19, because the corresponding class 246 shown in FIG. 18 has no locks. Similarly, the lock object 249 is blank or empty in FIG. 19, because the corresponding class 240 shown in FIG. 18 has no lock applied to it.

FIG. 20 shows the lock object 260 in this example. The count 265 for the tree update lock type is one in this example, because a TUL has been granted to this lock holder for this class 243. As noted above, the lock holder also has a CSL for the class 243, and the count 263 for the class share lock type is also one in this example. Like reference numerals in FIGS. 14–16 and FIGS. 18–20 refer to like elements, and the description in connection with FIGS. 14–16 will not be repeated.

When step 273 in FIG. 17 is performed in a preferred embodiment, the step of opening an "add part window" 275 (shown in FIG. 21) is also performed. The tree 276 under the influence of the tree update lock is represented in the add part window 275 by a diagram 276 representing class 245, class 241, and class 243.

Figure 22:
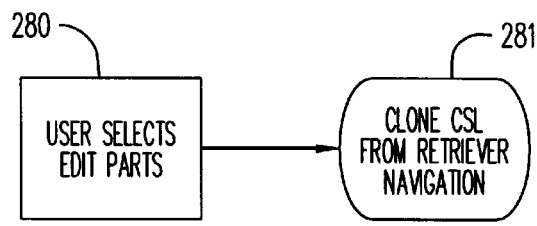
FIG. 22 illustrates a flow chart for an example where a user has selected the edit parts function.
Figure 24:
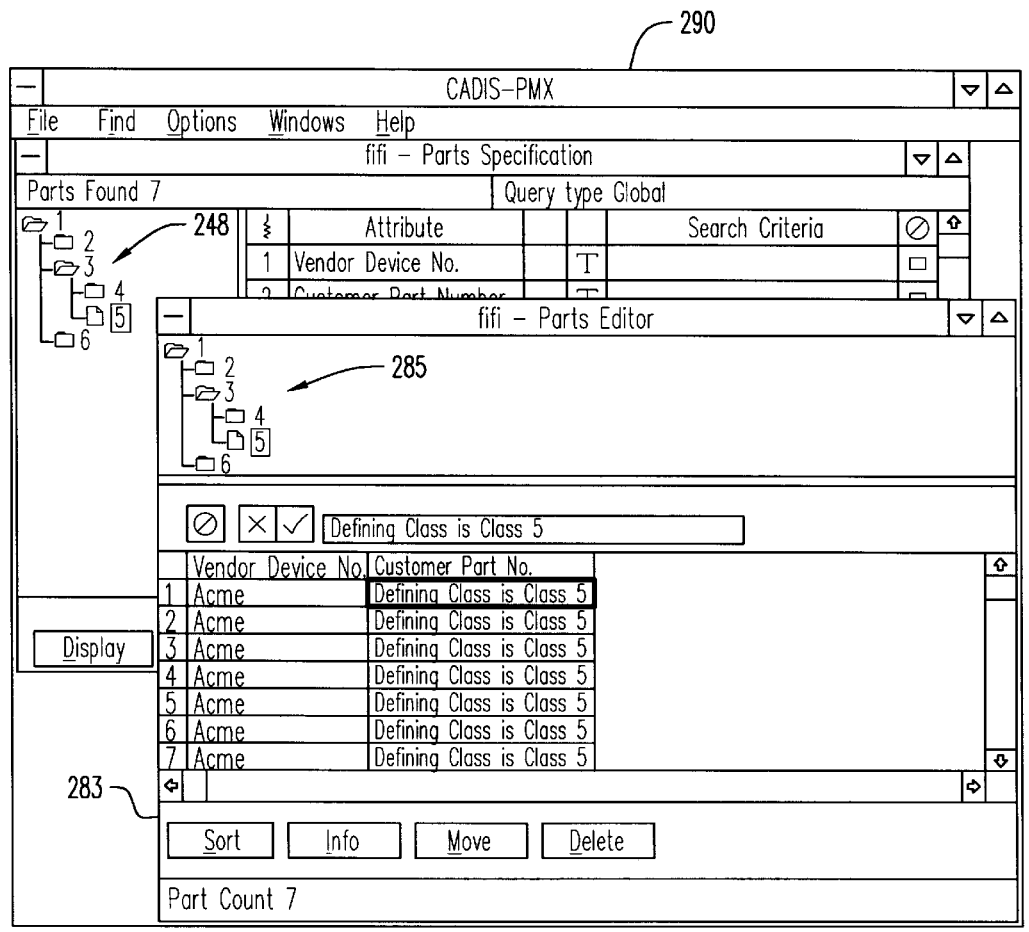
FIG. 24 depicts an example of a screen display when editing a part.

Referring to FIG. 22, when the user selects the edit parts function in step 280, the system clones the existing class share locks in step 281 for the corresponding portion of the hierarchy 248 currently displayed as a result of navigation to that point using the retriever 130. Referring to FIG. 24, the edit parts function creates a new window 283 which contains a view of the class tree 285 corresponding to the schema 248. To present that additional view 283 of the class hierarchy tree 285, new share locks must be obtained for the presented classes 245, 241, and 243. This insures a consistent view 285 for the parts that are going to be displayed or edited in this window 283. The system will reissue identical navigation locks for the parts editor tree 285.

Figure 23:
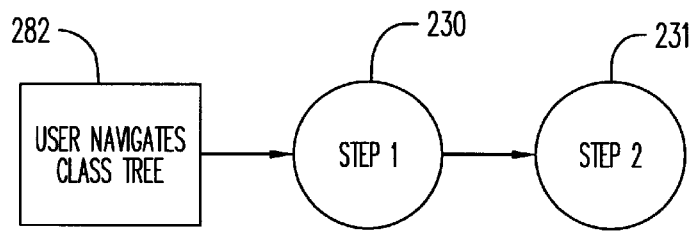
FIG. 23 illustrates a flow chart for an example where a user, while in the edit parts window, navigates to different locations in the class hierarchy tree.
Figures 25, 26, 27:
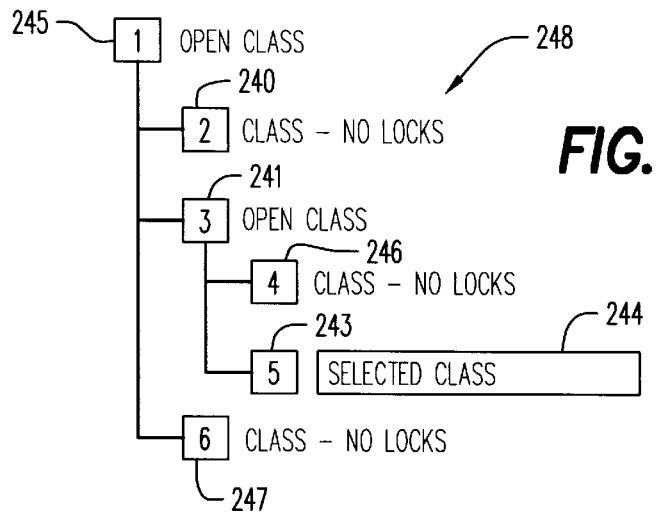
FIG. 25 shows a schema corresponding to the schema being edited in FIG. 24.
FIG. 26 shows a lock holder table after completion of the creation of an edit parts window.
FIG. 27 shows a lock object corresponding to the example shown in FIGS. 24–26.

While in the edit parts window 283, the user may navigate (see step 282 in FIG. 23) through the schema 248 shown in FIG. 25 to different locations in the class hierarchy tree 285. This navigation uses the same navigation steps 230 and 231 described above, as shown in FIG. 23.

In FIG. 26, the lock holder table 250 for this user is shown after the completion of the creation of the edit parts window 283. Note that the lock holder 257 contains two CSL (class share locks) 261, 262, and 260 for each class 245, 241 and 243 which has been opened to get to the class 243 identified by class handle 255. There is one CSL for each class 245, 241 and 243 opened for the original retriever window 290, and one CSL for each class 245, 241 and 243 opened for the edit parts window 283. When the user continues to navigate down the tree 285, CSL's will be obtained for each class through which the user navigates.

FIG. 27 shows the lock object 260 for this example in more detail. The class share lock count 263 is two, because two class share locks are contained in the element 260 shown in FIG. 26 at the intersection of the row corresponding to the class handle 255 and the column corresponding to the lock object 257.

Like reference numerals in FIGS. 25–27 refer to like elements in FIGS. 14–16 and FIGS. 18–20. Therefore, the description in connection with FIGS. 14–16 and FIGS. 18–20 will not be repeated.

Figure 28:
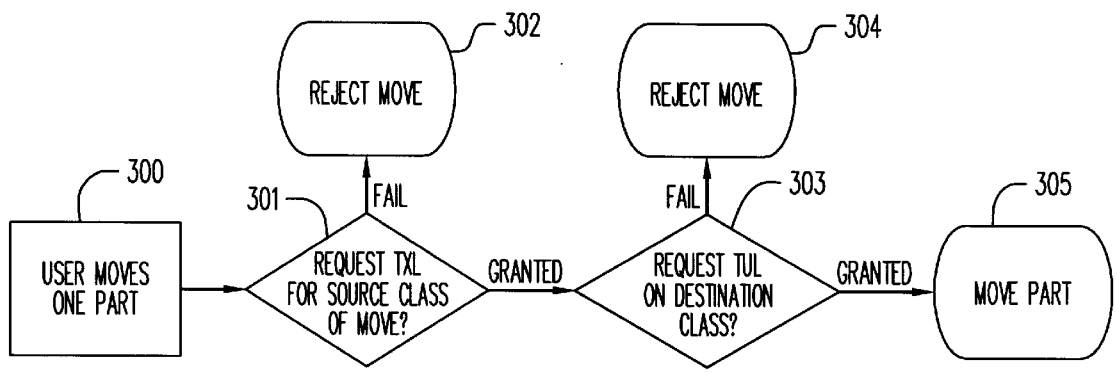
FIG. 28 shows a flow chart for an example of moving a single part from one class in a subtree to another class within a given subtree.
Figure 29:
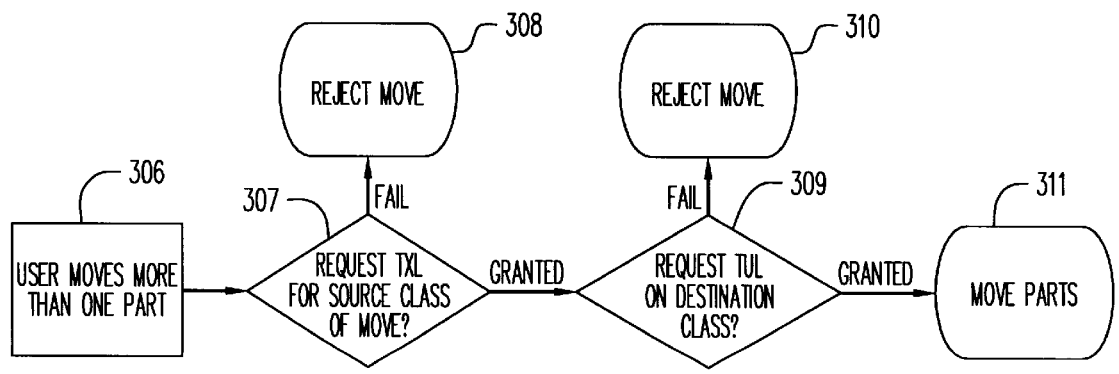
FIG. 29 shows a flow chart for an example of a general case of moving any number of parts from one class in a subtree to another class within that subtree.

FIG. 28 depicts a flow chart for the method used when a user is attempting to move a selected part 330 from one class 243 to another class 241 within a given subtree 248. FIG. 29 shows a flow chart for the method used in the general case of moving any number of parts from one class 243 in a subtree 248 to another class 241 within that subtree 248. The difference between these two figures is determined by the number of parts to be moved. In the special case of one part to be moved, an optimization can be made in the method shown in FIG. 28 that makes it more likely that the operation can be completed because the locks are applied to a smaller set of composite objects.

In FIG. 29, the general case of moving any number of parts from one class 243 in a subtree 248 to another class 241 within that subtree 248 is shown. In a preferred embodiment, this method is used to move more than one part, and the method depicted in FIG. 28 is used to move a single part. In FIG. 29, the operation begins by attempting to get a TXL (tree exclusive lock) for the subtree 243 that was selected when the edit parts operation was started (FIG. 22). If the lock is denied, then the operation is rejected. If the lock is granted, then a TUL (tree update lock) is requested for the destination class 241. If the TUL is granted, then the all of the necessary locks are held, and the parts are moved from the source class 243 to the destination class 241.

FIG. 28 shows the special case where only one part 330 is to be moved. The only thing that is different here is where the TXL is requested. Although the previous case (FIG. 29) is known to work, it will be less likely to succeed because it requires a broader lock on the subtree 285 in which parts are being moved. To increase the likelihood of moving the part 330, the TXL is applied to the class 243 which owns the instance 330 being moved. This applies the lock to the smallest possible portion of the tree 285, thereby locking the fewest number of instances. When the lock is granted, the operation proceeds in the same manner as the general case shown in FIG. 29.

Referring more specifically to FIG. 28, the user initiates the process in step 300. Although this step is labeled "user moves one part," it should be understood that the first step is more accurately an attempt by the user to perform the indicated function (if the necessary locks are available). The concurrency control system then proceeds to step 301, in which the system requests a TXL for the class 243 that owns the part that is to be moved. Although FIG. 28 refers to the "defining class of part," those skilled in the art will appreciate that it is more accurately referred to as the owning class for that part. If the TXL cannot be obtained, (because the lock manager 125 detects a conflicting lock present in the lock table 250), the system proceeds to step 302. The GUI preferably informs the user that the requested move cannot be performed, for example, with a message that access is denied because the information is in use. If the requested TXL is granted by the lock manager 125, the system proceeds to step 303. The system requests a TUL on the destination class 241. If the requested tree update lock cannot be granted, (because the lock manager 125 detects a conflicting lock present in the lock table 250), the system proceeds to step 304 and preferably informs the user that the requested move cannot be performed. If the requested TUL does not conflict with an existing lock in the lock table 250, the lock manager 125 grants the requested TUL and proceeds to step 305. The part can then be moved.

The dynamic class manager 134 will, of course, perform operations on the objects in the knowledge base 123 which are described more fully in application Ser. No. 08/339,481, filed Nov. 10, 1994, by Thomas S. Kavanagh, et al., for OBJECT ORIENTED DATABASE MANAGEMENT SYSTEM, now pending, the entire disclosure of which is incorporated herein by reference.

Figures 30, 31:
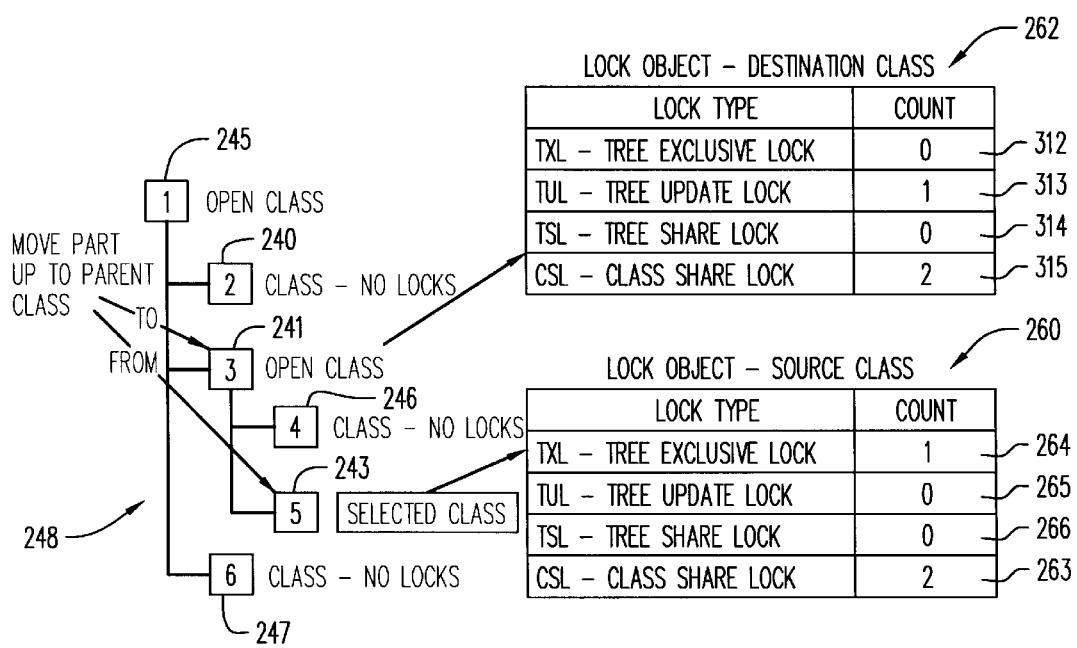
FIG. 30 shows a lock holder table during the process for the general case of moving any number of parts from one class in a subtree to another class within that subtree.
FIG. 31 shows details of the lock objects for the source and destination classes, and the associated actions for the general case of moving parts shown in FIG. 29.

FIG. 30 shows the lock table 250 for the general case of moving parts described in FIG. 29. The table 250 of lock holders may have multiple locks on many portions of the tree 285. The illustrated lock table 250 identifies the locks that are held by this lock holder 257 (the locks held by the retriever 290, the locks held by the parts editor 283, and the locks held for the move parts operation). The classes 245, 241, and 243 identified by class handles 251, 253, and 255, respectively, each have a CSL (class share lock) for the retriever, and a CSL for the parts editor. In addition, the class 241 identified by class handle 253 has a TUL (tree update lock) to add the part that is about to be moved to the class 241. Also, the class 243 identified by class handle 255 has a TXL for removing the part from the class 243.

In the illustrated example, in order to have the TXL granted to the class 243 represented by class handle 255, there may be no other TSL (tree share locks), TUL, TXL, or CSL's held by other lock holders 256, 258 or 259 which are currently operating. The fact that there are CSL's held by this lock holder 257 is considered a self conflicting condition. This condition is permitted, and the TXL granted, due to the fact that the CSL locks are held by the requester 257 of the TXL. In general, in circumstances like this, broader locks are granted if and only if the only conflicts that can be identified are with the lock holder 257 that is making the request.

Figure 32:
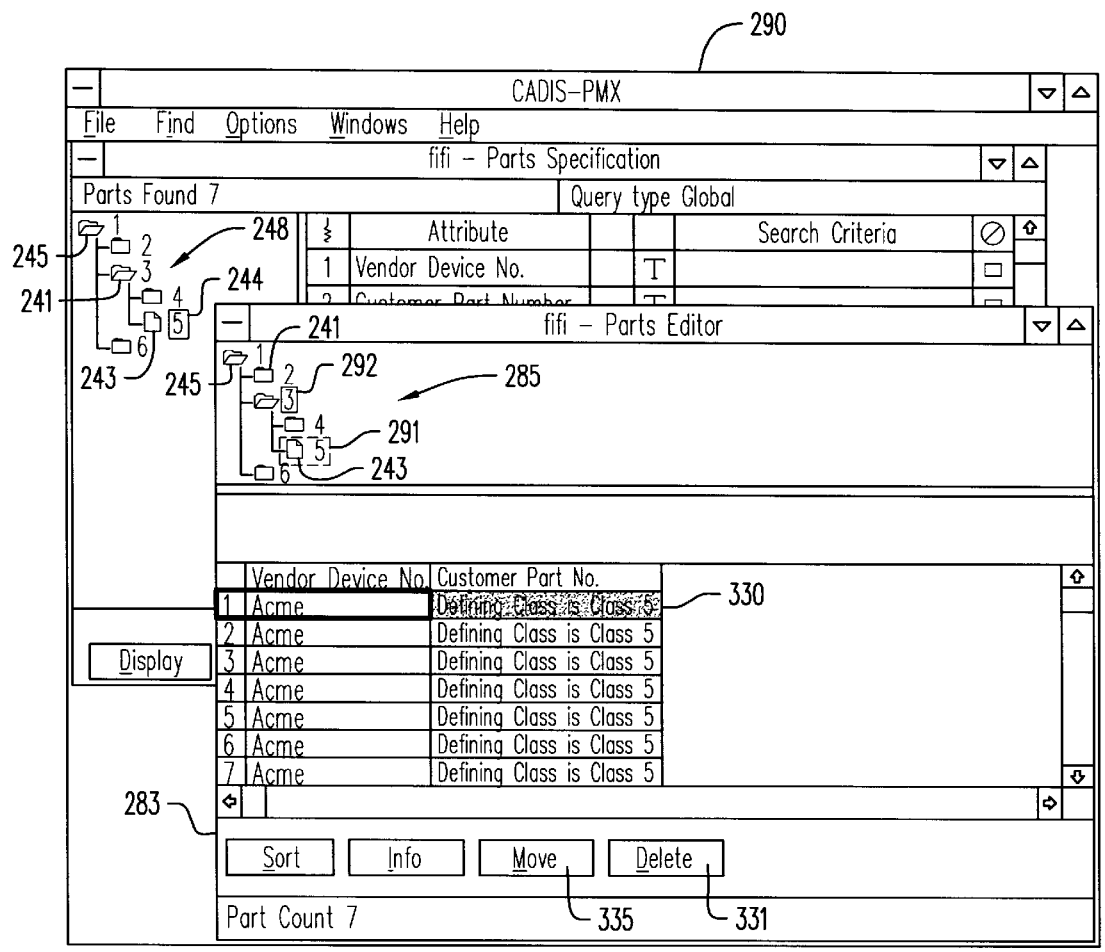
FIG. 32 shows a preferred display associated with a move parts operation.

A preferred display for moving a selected part 330 is shown in FIG. 32. In the preferred embodiment, the display of the parts editor window 283 shown in FIG. 32 should visually indicate the source class 243 in the tree 285 with a dotted rectangle 291, highlighting, color code, or some other distinguishing feature. The destination class 241 should be visually indicated by highlighting 292, or some other distinguishing feature. The user accomplishes the move function by clicking on the move command button 335.

Figure 33:
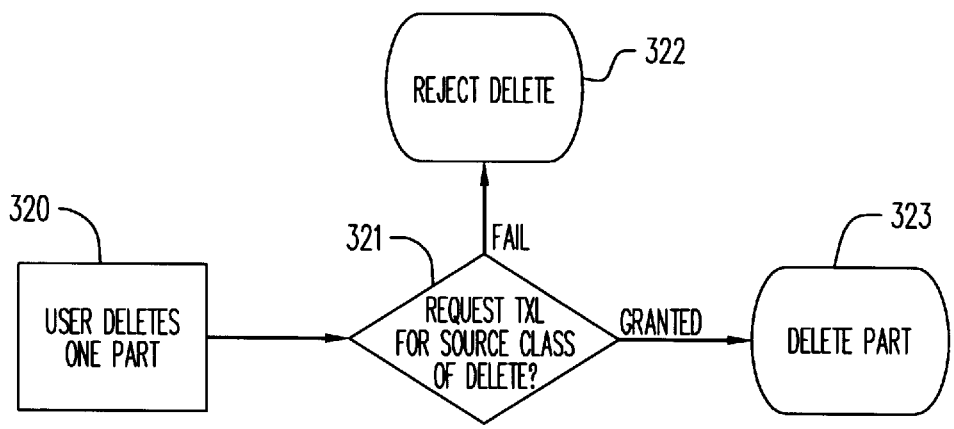
FIG. 33 is a flow chart illustrating the process for an optimized case where one part is to be removed from the knowledge base.

FIG. 33 depicts a flow chart for the optimized case where one part 328 is to be removed from the knowledge base 123. The process is started at step 320. In step 321, a TXL is requested for the class 243 that owns the instance 328 that is to be removed. Although FIG. 33 refers to the class 243 as the "defining class of part," those skilled in the art will appreciate that the class 243 is more accurately referred to as the owning class. If the TXL cannot be obtained, then the operation is denied in step 322. If the operation succeeds, the TXL is granted in step 323, and the part 328 is deleted.

Figure 35:
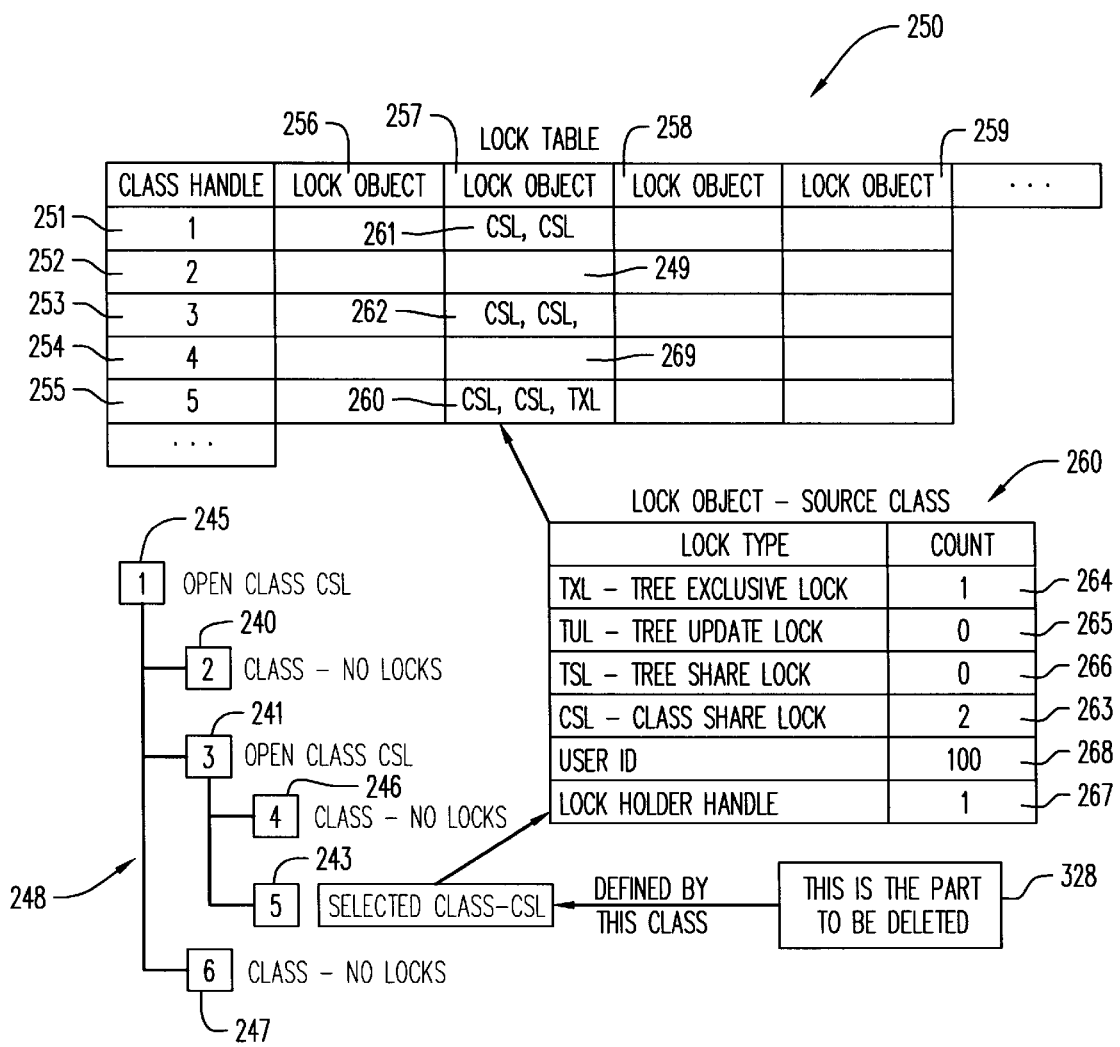
FIG. 35 shows the locks that must be held by a lock holder that wishes to remove an instance from a class.

FIG. 35 shows the locks 260 that must be held by a lock holder 257 that wishes to remove an instance 328 from a class 243. This condition is essentially the same as a portion of the move operation (see FIG. 30) wherein the part must be removed from a class 243. The lock conditions are the same for the classes 245 and 243 represented by class handles 251 and 255, respectively. The class 241 represented by class handle 253 holds a CSL for the retriever, and a CSL for the parts editor. To delete a part 328, a TXL must be held for the class 243 from which the instance 328 or set of instances is to be removed.

Figure 34:
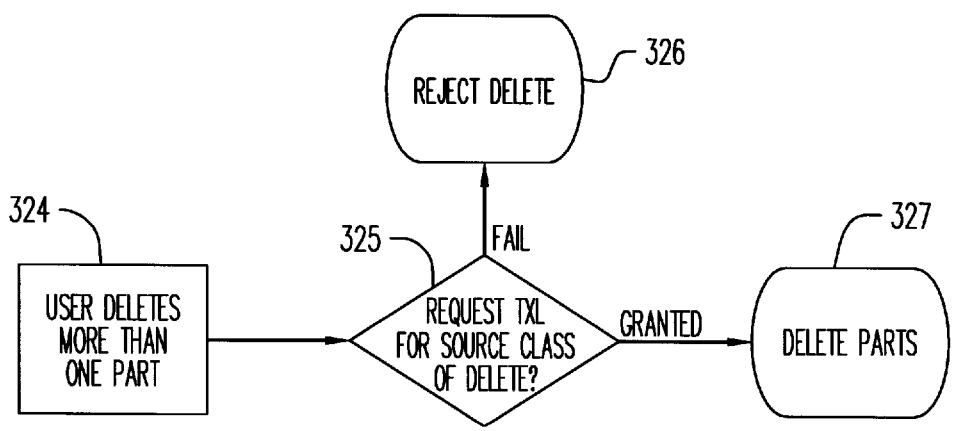
FIG. 34 is a flow chart illustrating the process for a general case of deleting one or more parts from a subtree.

FIG. 34 depicts a flow chart for the general case of deleting more than one part from the subtree 248, which begins with step 324. The TXL is requested in step 325 from the class 245 that was identified when the part editor was invoked. This is the class 245 that defines the subtree 285 wherein work will be done. After successfully obtaining the TXL, instances are deleted from their owning classes 245, 240, 241, 246, 243, or 247. If the TXL is denied, then the operation is rejected, and no parts are deleted.

Figure 36:
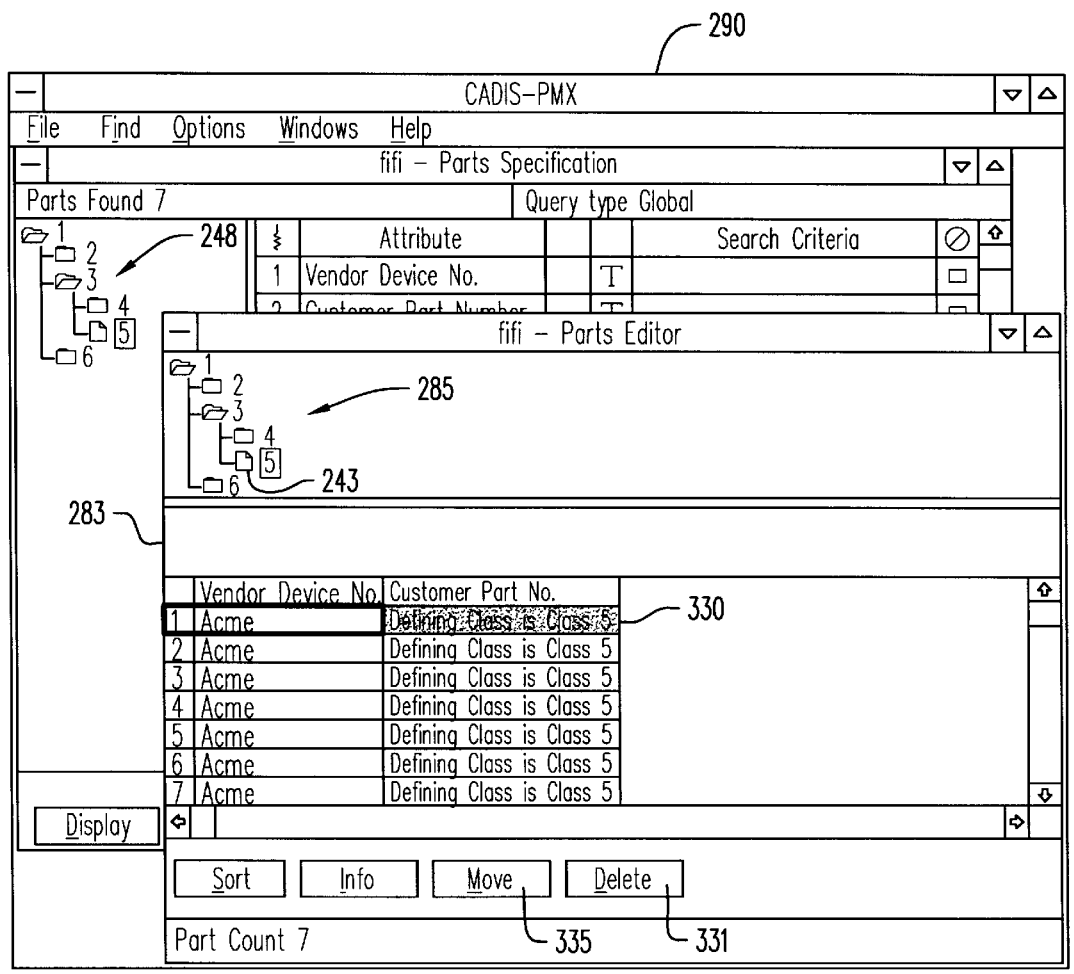
FIGS. 36 and 37 show preferred displays associated with a delete parts operation.
Figure 37:
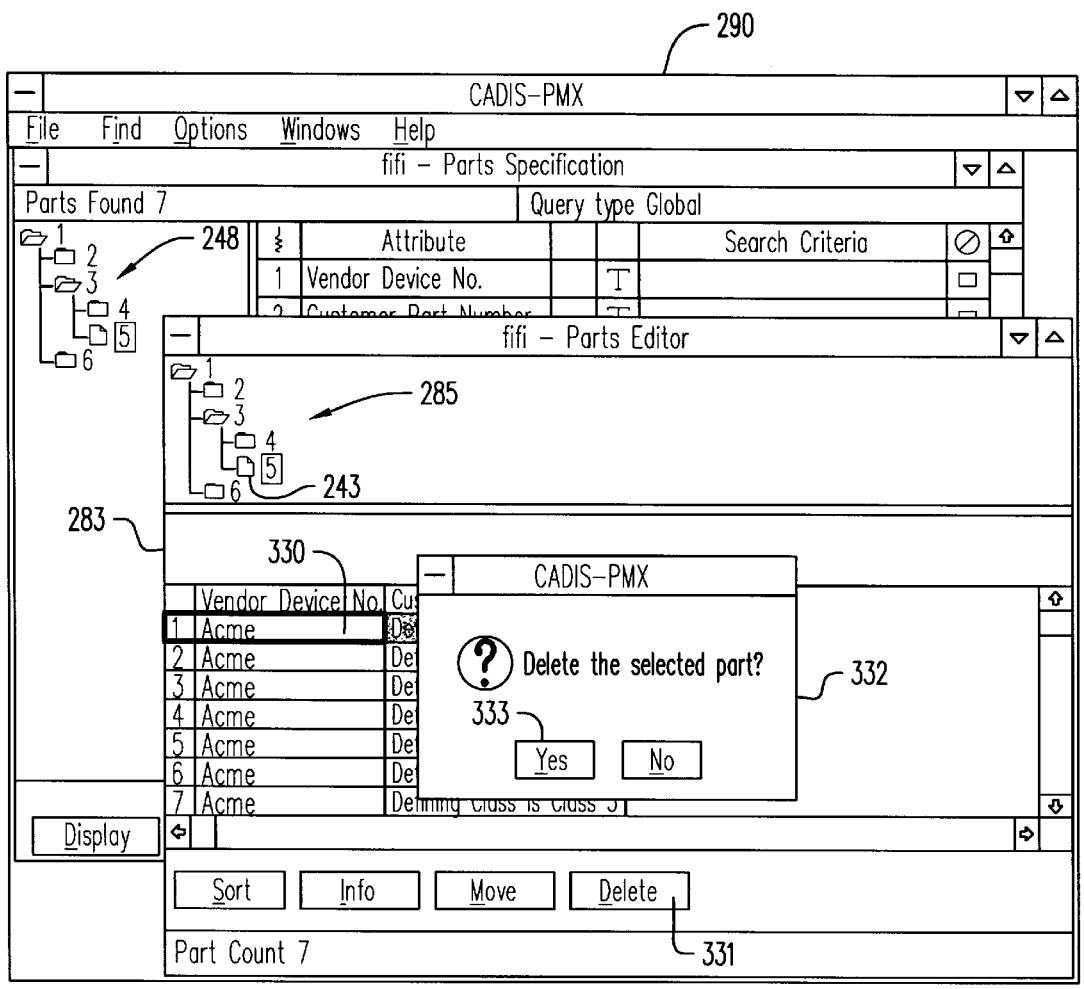

FIG. 36 shows the preferred display associated with the delete parts operation. A part 330 is selected by clicking on the display 330 of the part. The selected part 330 corresponds to the part 328 to be deleted shown schematically in FIG. 35. In the illustrated example, the selected part is defined by, or a member of, the selected class 243. The deletion of the selected part 330 is initiated by clicking on the delete command button 331 shown in FIG. 36. In a preferred embodiment, if the requested locks are granted, the system opens a dialog box or window 332 as shown in FIG. 37 to ask the user to confirm that he or she wants to delete the selected part 330. The deletion operation is confirmed by clicking on the "yes" button 333, at which time the dialog box 332 is closed and the selected part 330 is deleted.

Figure 38:
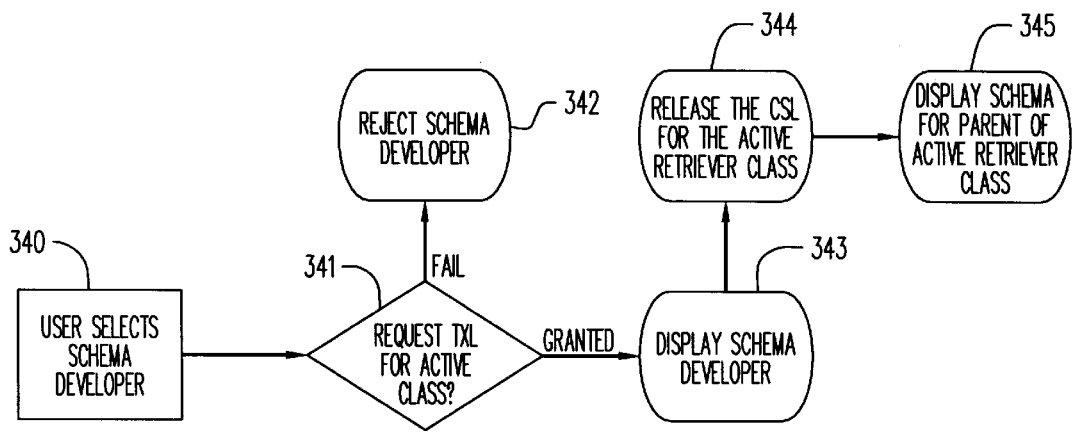
FIG. 38 is a flow chart that describes steps that are involved in concurrency control when using the schema editor to change the structure of the schema.

FIG. 38 describes the steps that are involved in concurrency control when using the schema editor to change the structure of the schema. In step 340 when the user selects the schema developer or schema editor 144, the next operation is to obtain a TXL lock on the subtree that the user wishes to modify. The procedure for attempting to accomplished this begins with step 341, where a tree exclusive lock is requested for the active class 243. If the TXL cannot be obtained, then the process branches to step 342 and the schema developer 144 cannot be started. When the TXL lock is granted, the method proceeds to step 343 and the schema developer screen 350 is displayed. Following step 343, the CSL locks that were obtained for the retriever 290 on the class 243 that was selected for schema editing are released in step 344 (because a TXL lock has been obtained for that class 243). In step 345, a CSL lock is then obtained by the schema developer 144 for the parent class 241 of the class 243 in which the schema is to be edited. A CSL is preferably also obtained for the parent class 245 of the class 241.

Figure 39:
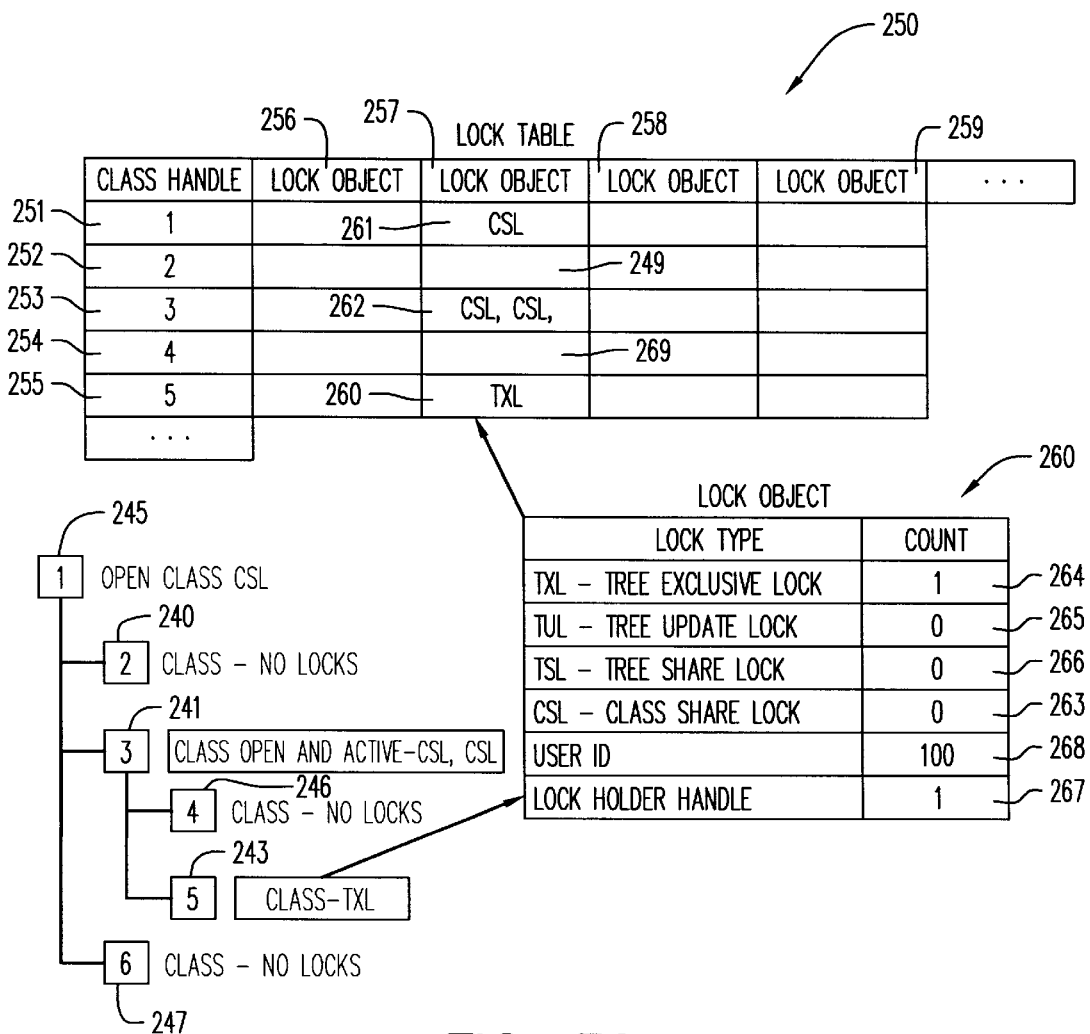
FIG. 39 shows a lock table that indicates the locks that are held during the operations described in FIG. 38.

FIG. 39 shows a lock table 250 that indicates the locks that are held during the operations described in FIG. 38. Note that the schema editor 144 holds a TXL (in element 260) for the class 243 represented by class handle 255. This prevents other users of the system from accessing any of the information in the subtree below the class 243 represented by class handle 255. Details of the lock object 260 are also shown in FIG. 39.

Figure 40:
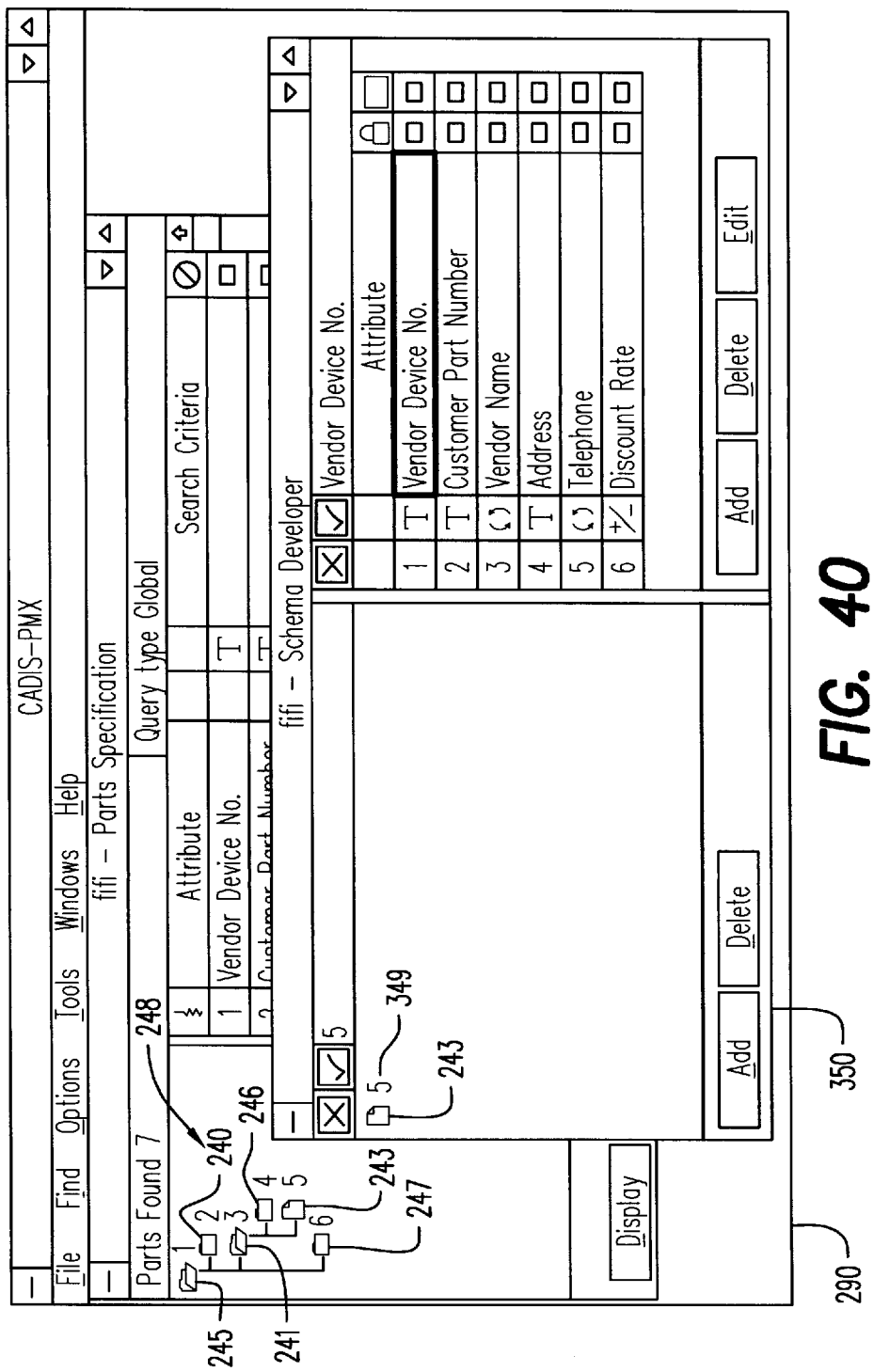
FIG. 40 illustrates a screen display for a preferred embodiment showing a schema developer window that is opened in one step of the process shown in FIG. 38.

FIG. 40 illustrates a screen display for a preferred embodiment showing a schema developer window 350 that is opened in step 343 of FIG. 38. The class 243 in which the schema is to be edited is preferably displayed in a highlighted manner 349.

Figure 41:
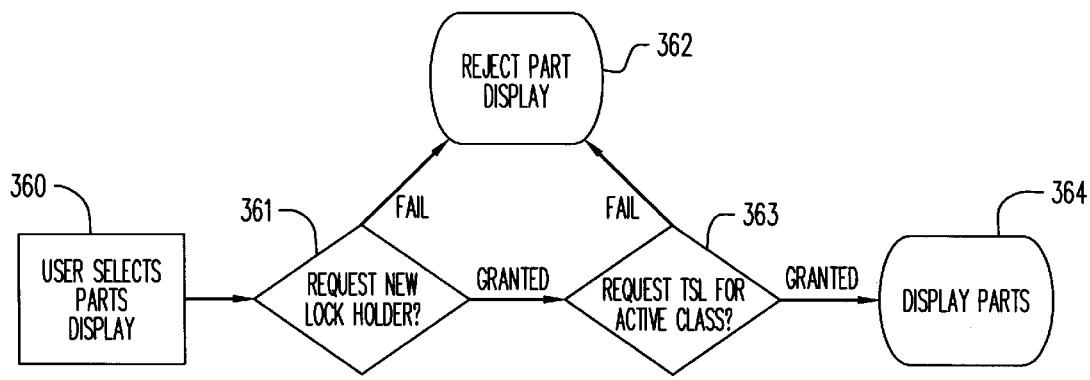
FIG. 41 shows a flow chart illustrating the mechanisms that are used by the concurrency control means when displaying a instance.
Figure 43:
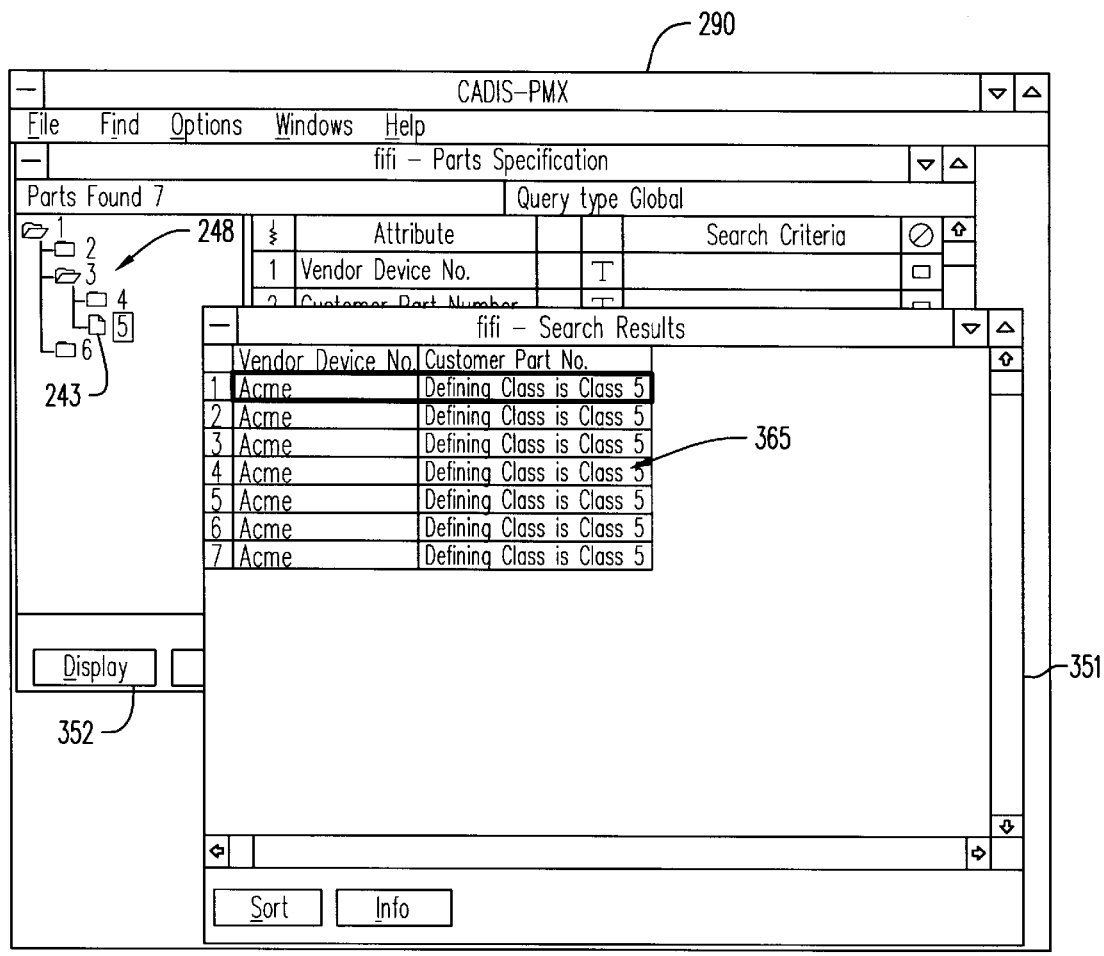
FIG. 43 illustrates a screen display for a preferred embodiment showing a search results window that is opened in one step of the process shown in FIG. 41.

FIG. 41 shows a flow chart illustrating the mechanisms that are used by the concurrency control means when displaying a instance. The operation begins at step 360 by the user selecting the parts display mechanism. Referring to FIG. 43, this is initiated when the user clicks on the display command button 352. In order for the system to display the desired information, there will need to be locks present. In order to obtain locks, the software 131 must become a lock holder. A request for a new lock holder is performed in step 361 shown in FIG. 41. If the request to become a lock holder is denied, then the flow proceeds to step 362 and the user is not allowed to display the parts. However, if the lock holder request is granted, then the flow proceeds to step 363 and the software 131 requests a TSL (tree share lock) on behalf of the user. If the TSL is denied, then the method proceeds to step 362 and the operation cannot proceed. When the TSL is granted for the active class, the method proceeds to step 364 and parts can be displayed with a confidence that the information contained within that subtree 243 is coherent.

Figure 42:
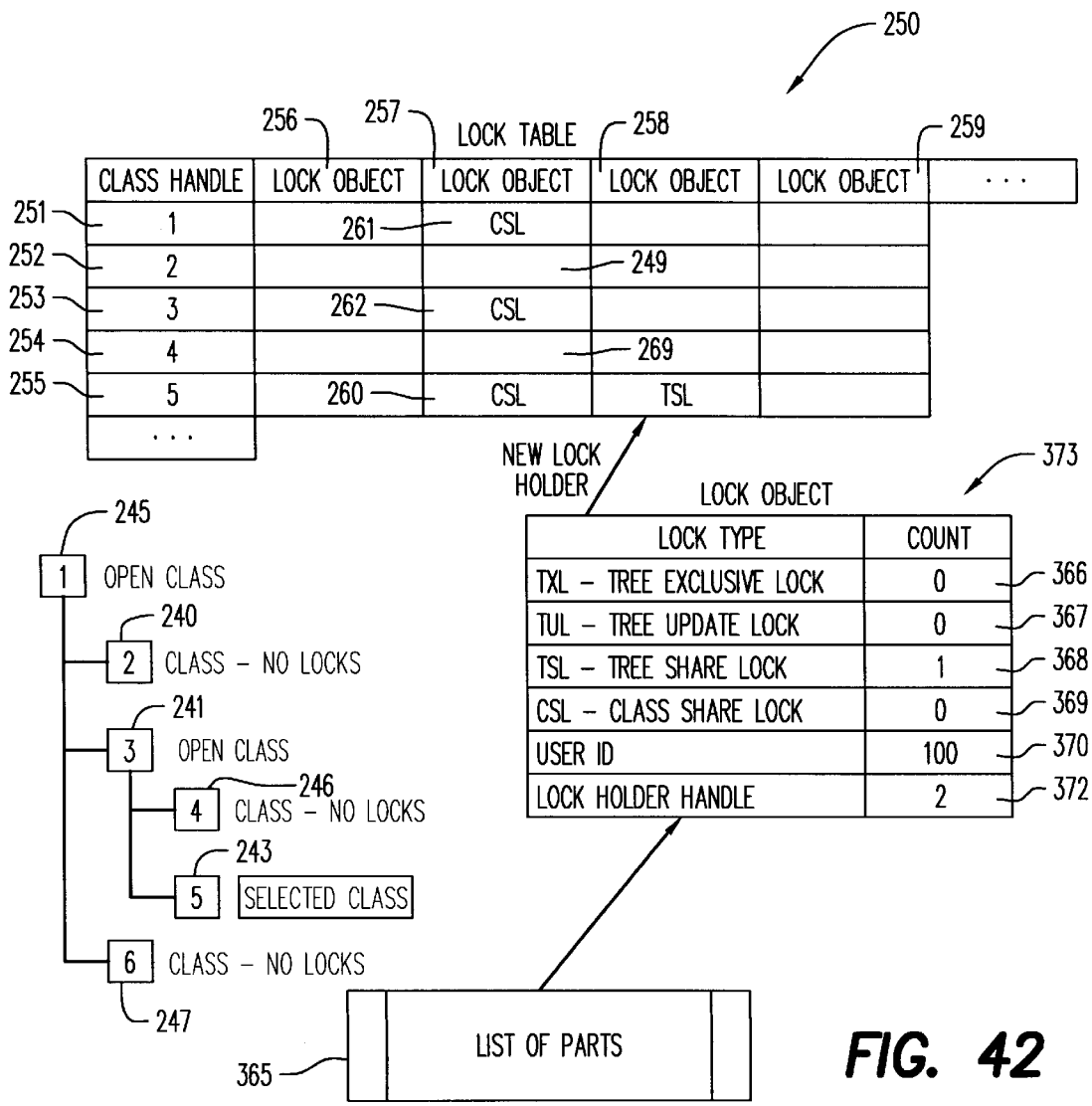
FIG. 42 depicts the lock table, a diagram of the schema, and details concerning one of the lock objects, showing the condition of the lock holder table for the situation depicted in FIG. 41.

FIG. 42 depicts the lock table 250, a diagram of the schema 248, and details concerning one of the lock objects 373. FIG. 42 shows the condition of the lock holder table 250 for the situation described in FIG. 41. The retriever 290 is holding the CSL locks 261, 262 and 260 for all of the classes 245, 241 and 243, respectively, that have been navigated through to get to the class 243 that is represented by class handle 255. In order for the system to display the parts defined by class 243, a new lock holder 258 is formed, and a TSL lock 373 is requested for the class 243 identified by class handle 255. The TSL 373 insures that other locks cannot be granted, and hence there will be no ability to modify the schema 248, or the instances contained within the this subtree 243. Hence the list of parts 365 displayed in the search results window 351 shown in FIG. 43 will be consistent, and coherent for the duration that the lock 373 is held.

In FIG. 42, the tree share lock is indicated in the lock table 250 at the intersection 373 of the row corresponding to the class handle 255 and the column corresponding to the lock holder 258. The lock object 373 is shown in more detail in FIG. 42. The TSL count for the lock object 373 is shown as one, because the lock holder 258 holds a TSL lock for the class 243 corresponding to the class handle 255. The lock holder handle 372 is two, indicating that this is a different lock holder from the lock holder described above with reference to FIGS. 35 and 39. However, the user ID 370 is shown as 100. This is because the same user (whose user ID is 100) is two lock holders.

Figure 50:
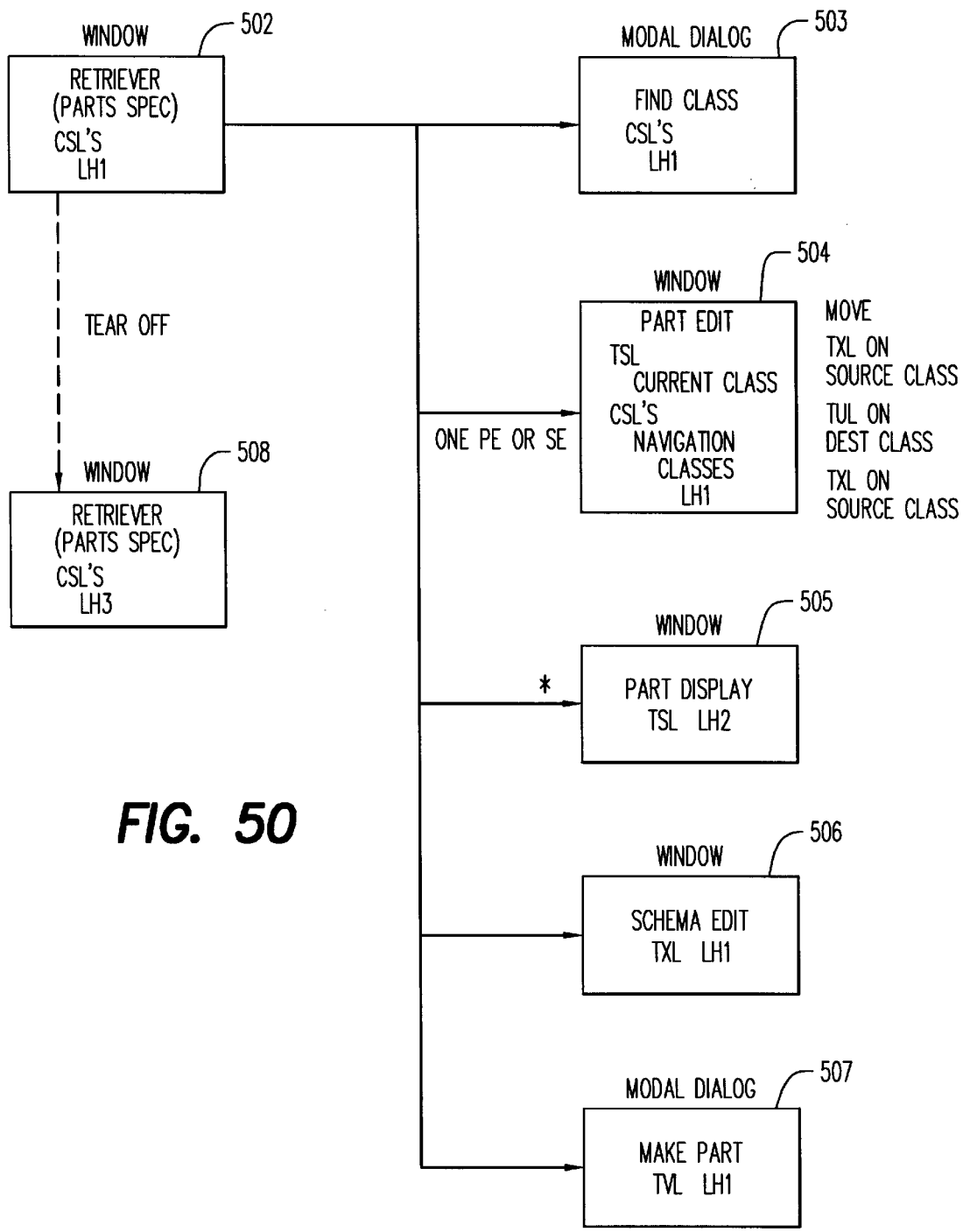
FIG. 50 is a chart representing the application of a lock manager by a knowledge base client.

FIG. 50 is a chart representing the application of the lock manager 125 by the knowledge base client 131. When a retriever window 502 is opened, the concurrency system assigns the user the lock holder 1 (LH1) position, and grants CSL's to that lock holder. To perform a "find class" function 503, lock holder 1 will require CSL's as shown in FIG. 50. When a part edit window 504 is opened, lock holder 1 must obtain a TSL on the current class, and CSL's to navigate the hierarchy. Tree locks (TUL and TXL) are required to edit the schema.

In order to open a part display window 505, the user will have to be assigned a new lock holder (LH2), and will require a TSL. In order to open a schema edit window 506, FIG. 50 shows that LH1 will require a TXL. In order to open an add part, or make part, window 507, LH1 will require a TUL. In a preferred system, a user can tear off a window 508 in the retriever. In order to do so, the user must be assigned LH3, and will require CSL's to navigate the schema.

The present invention may include a knowledge base client means and a knowledge base server means. The knowledge base server means preferably comprises an object oriented lock manager means. The knowledge base server means preferably includes a dynamic class manager means, a connection manager means, a query manager means, a handle manager means, a units manager means, a database manager means, and a file manager means.

Figure 55:
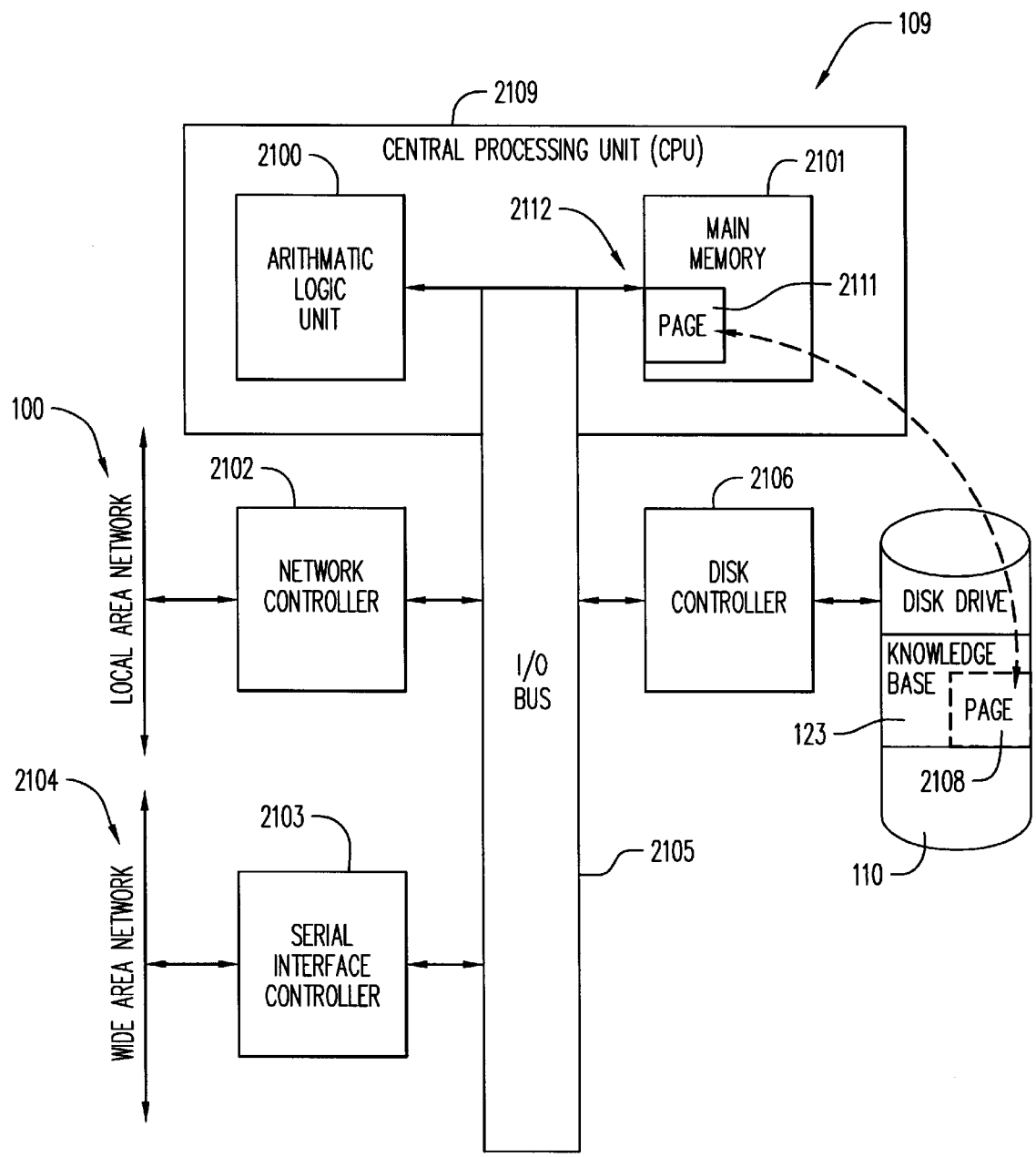
FIG. 55 shows the major components of a computer hardware configuration for a knowledge base server.

FIG. 55 shows the major components of a computer hardware configuration 109 providing the computational and communications environment for a knowledge base server 132. This configuration consists of a central processing unit or CPU 2109 which includes an arithmetic logical unit 2100 which fetches and executes program instructions from main memory 2101. The programs are stored on a disk drive 110, access to which is provided through a disk controller 2106. The knowledge base files 123 are also stored on disk drive 110 and accessed through virtual memory addresses 2112 in main memory 2101, through which, when required, a page 2111 of contiguous data in a disk file 2108 is copied into main memory 2101. The preferred embodiment of the present invention uses virtual memory 2112 for this knowledge base management system. The knowledge base server 132 interacts with the client API 143 through a local area network 100, access to which is controlled by network controller 2102, or through a wide area network 2104, access to which is controlled by a serial interface controller 2103. An I/O bus 2105 mediates data transfers between the CPU 2109 and the peripheral data storage, interface and communication components.

Figure 56:
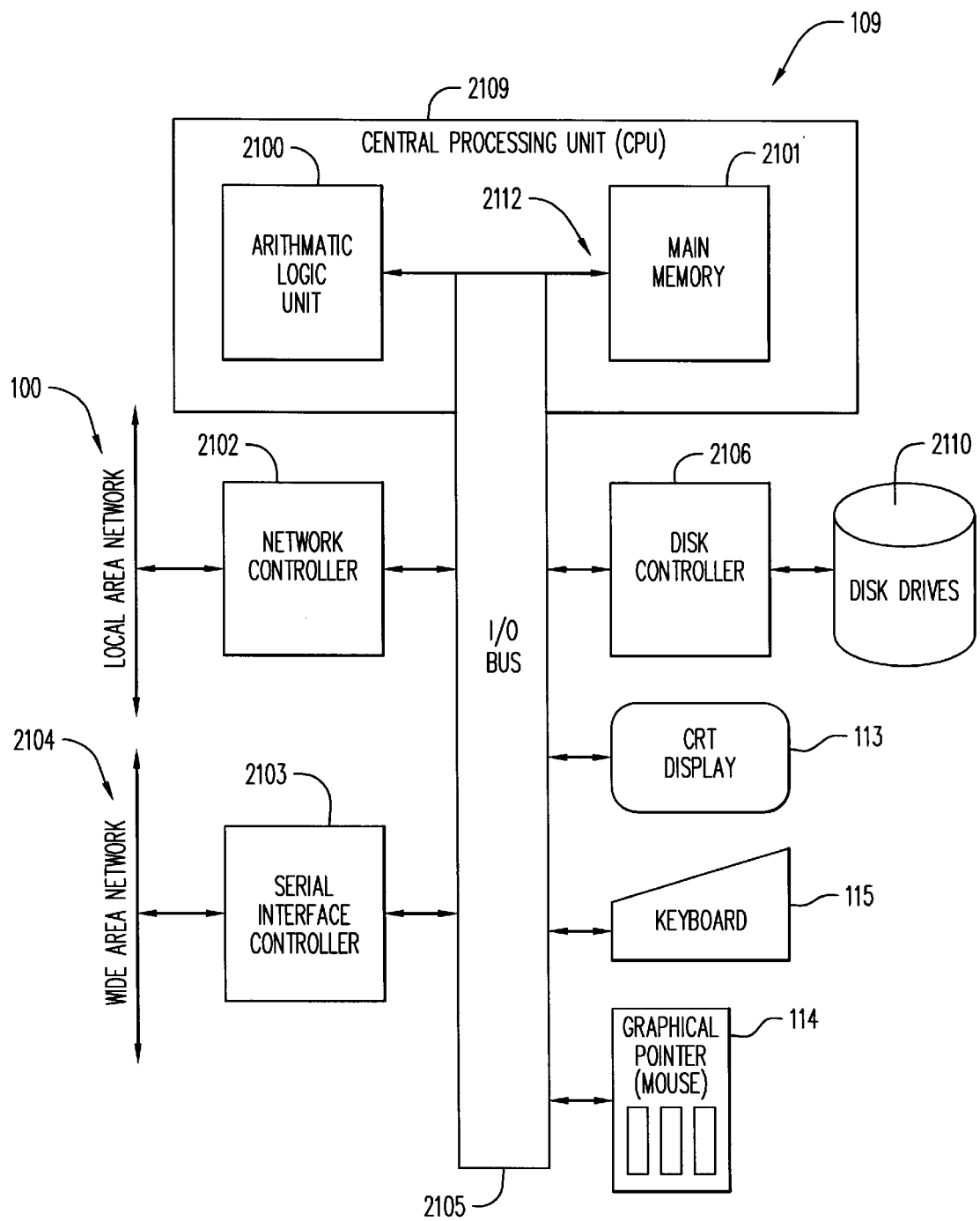
FIG. 56 shows the major components of a computer hardware configuration for a retriever, a schema editor, a graphical user interface component, and an API.

FIG. 56 shows the major components of a computer hardware configuration 112 providing the computational and communications environment for a retriever 130, schema editor 144, a graphical user interface component of legacy 133, and an API 143. This configuration consists of a central processing unit or CPU 2109 which includes an arithmetic logical unit 2100 which fetches and executes program instructions from main memory 2101. The programs are stored on one or more disk drives 2110, access to which is provided through a disk controller 2106. The user interacts with the system through the keyboard 115 and mouse or similar graphical pointer 114 with the graphical user interface displayed on the CRT display 113. The API 143 communicates with the knowledge base server 132 through a local area network 100, access to which is controlled by network controller 2102, or through a wide area network 2104, access to which is controlled by a serial interface controller 2103. An I/O bus 2105 mediates data transfers between the CPU 2109 and the peripheral data storage, interface and communication components.

The present invention may be advantageously used in a client/server architecture comprising a knowledge base client and a knowledge base server, as shown in FIG. 1. However, the invention is not necessarily limited to a client/server architecture. The invention may also be used in a distributed database system.

IV. Object Oriented Database Structure

Figure 63:
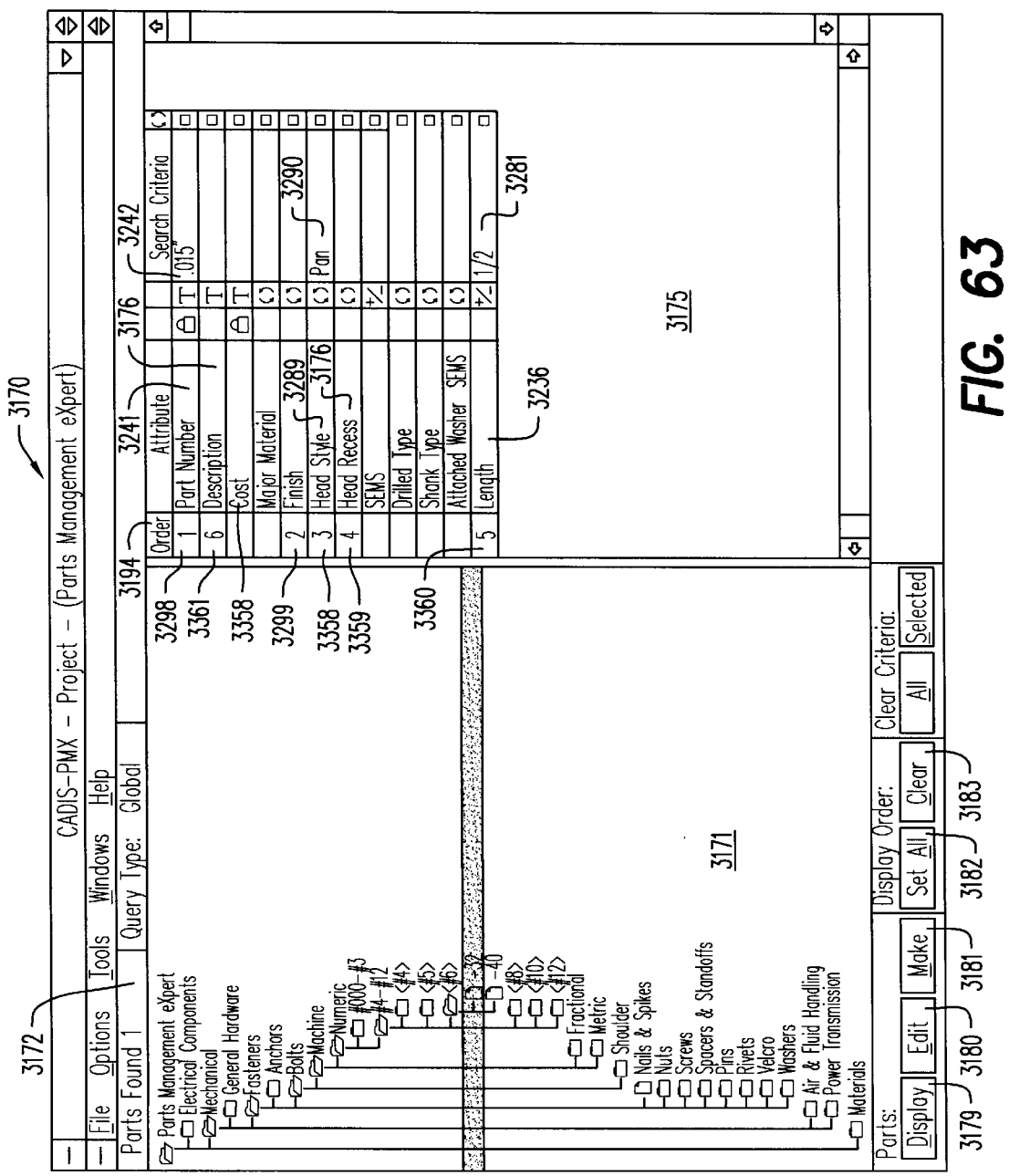
FIG. 63 depicts a display screen showing information displayed in the part specification window.
Figure 64:
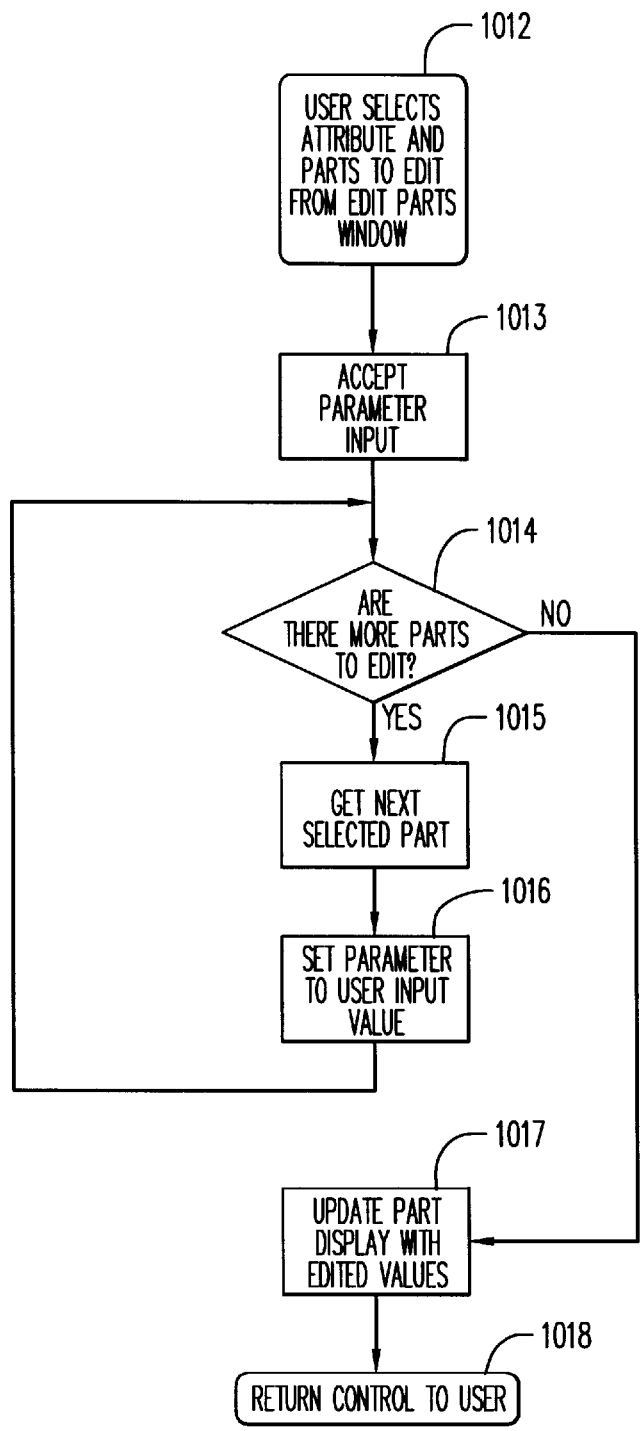
FIG. 64 is a flow chart depicting procedures followed when a user edits parts.
Figure 65:
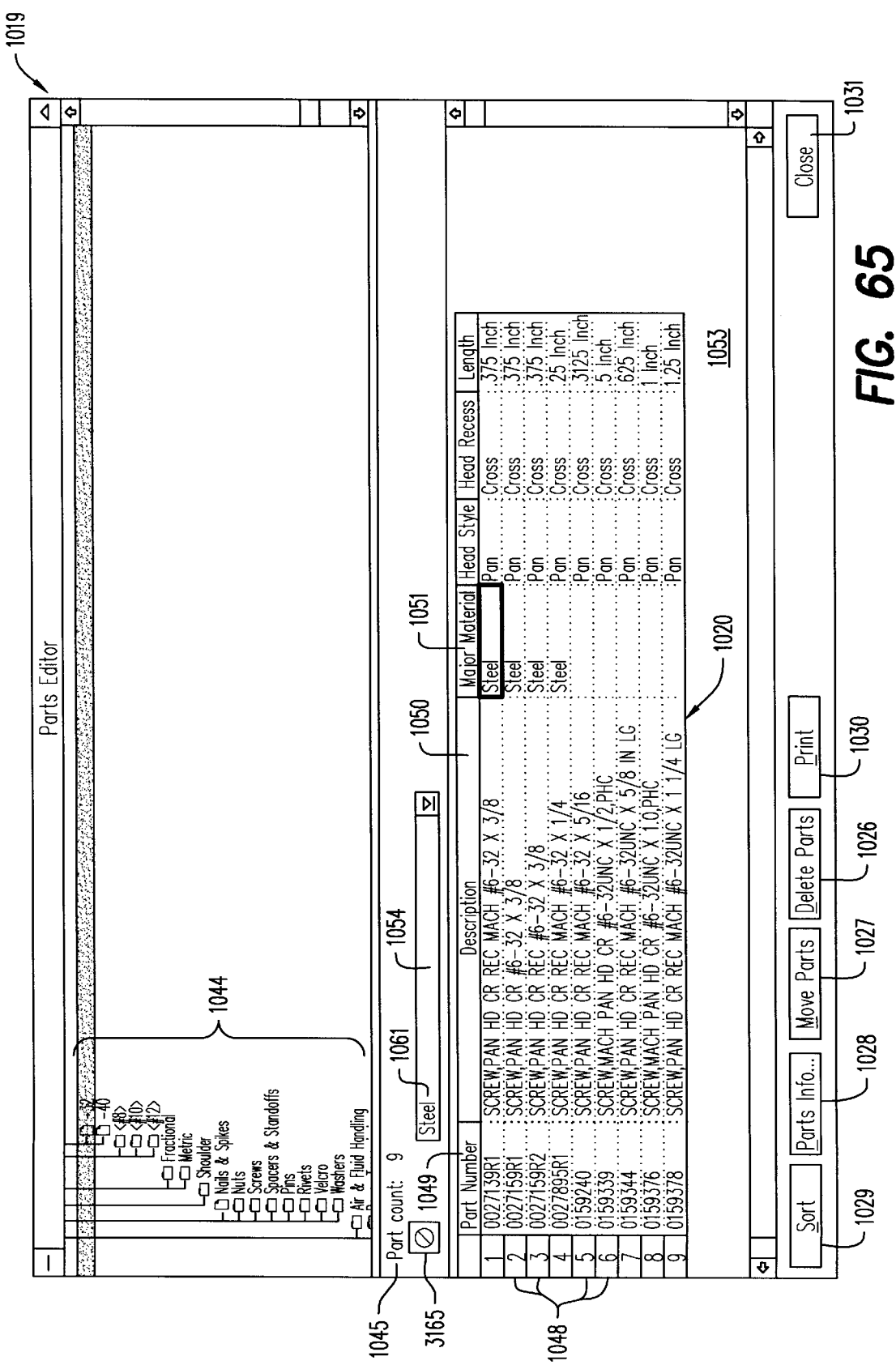
FIG. 65 depicts a display screen showing information displayed in the parts editor window.
Figure 66:
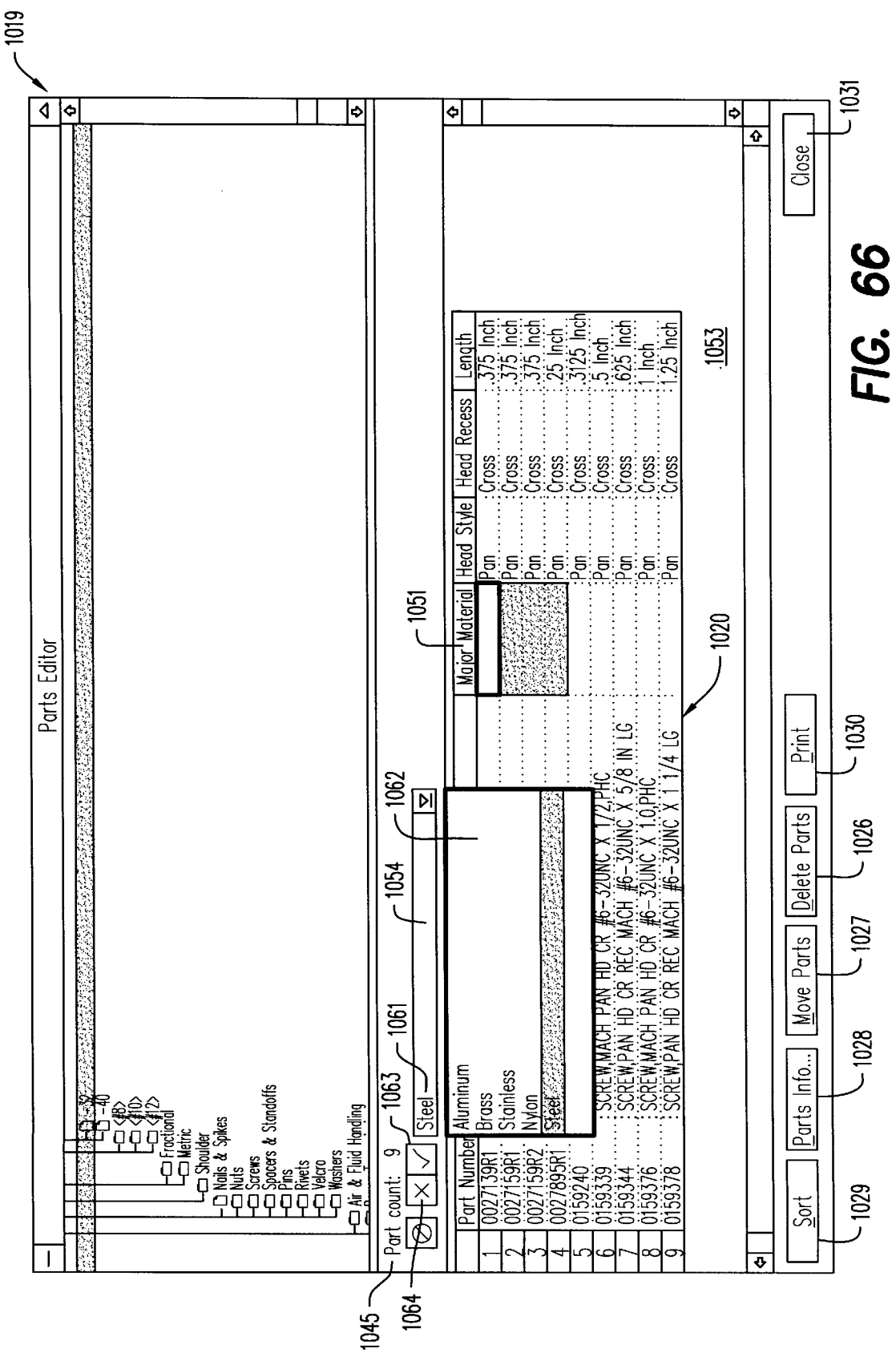
FIG. 66 depicts a display screen showing information displayed in the parts editor window.
Figure 67:
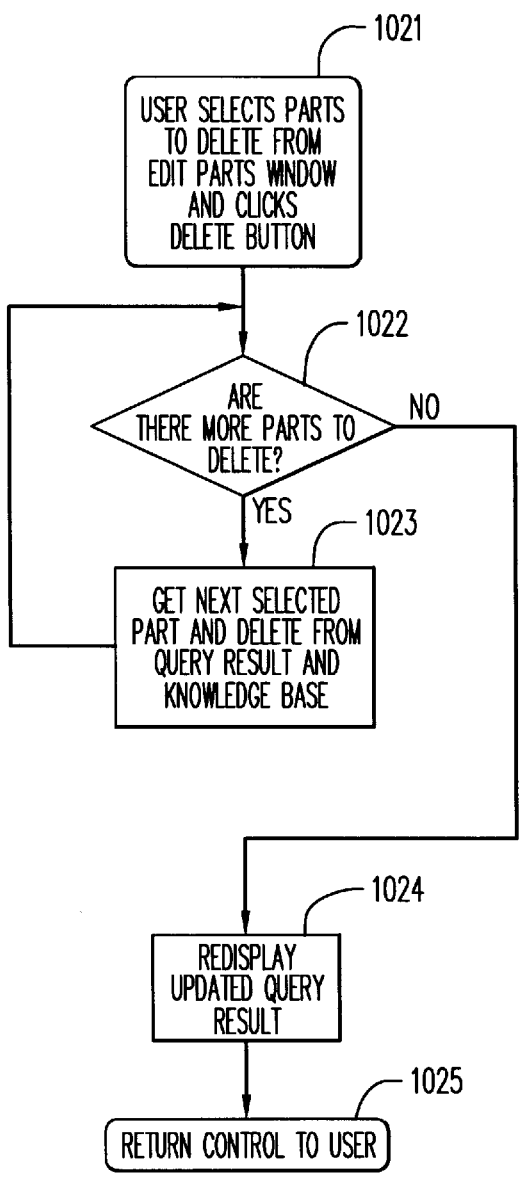
FIG. 67 is a flow chart depicting procedures followed when a user deletes parts.
Figure 68:
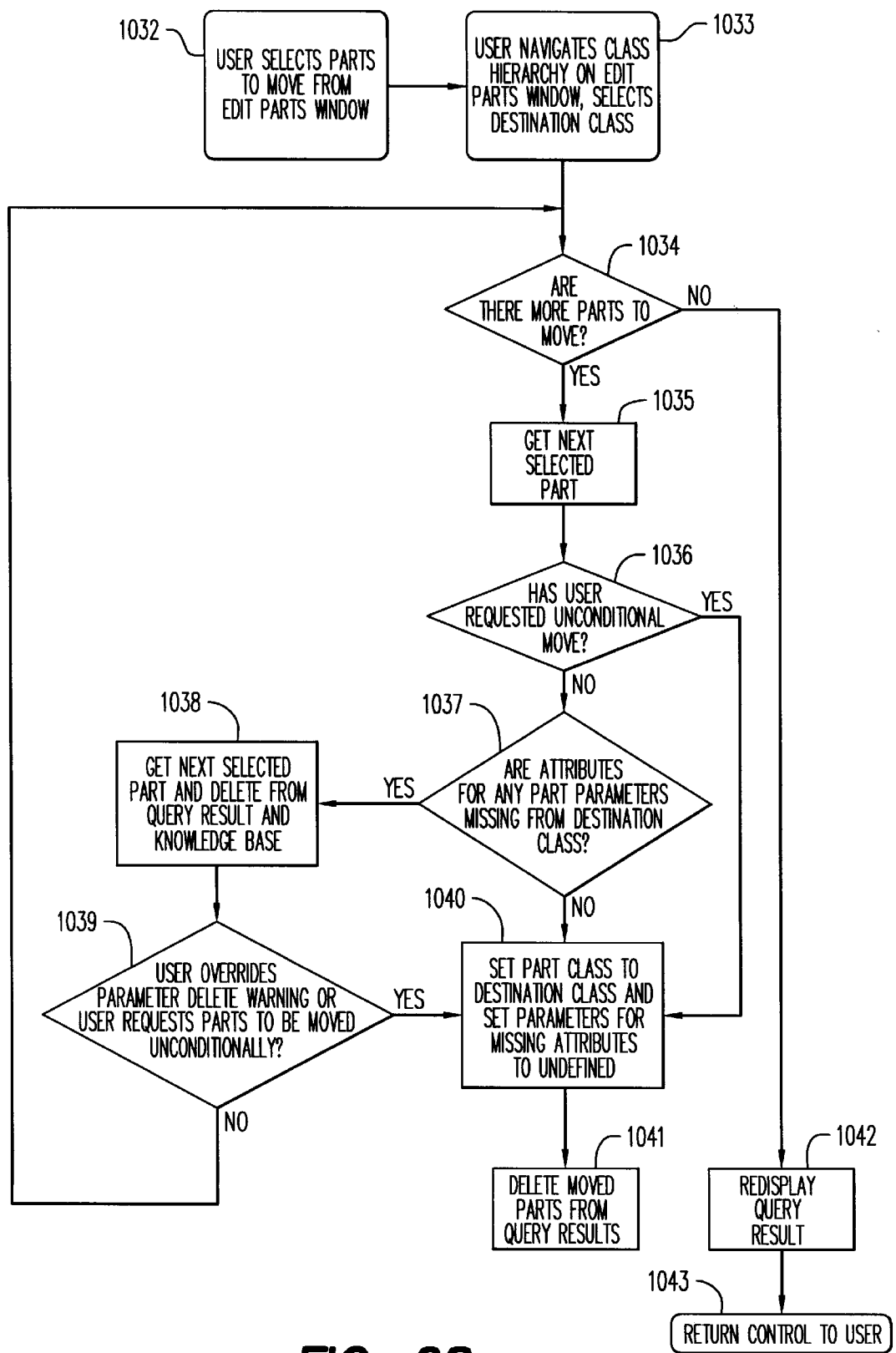
FIG. 68 is a flow chart depicting procedures followed when a user moves parts.
Figure 69:
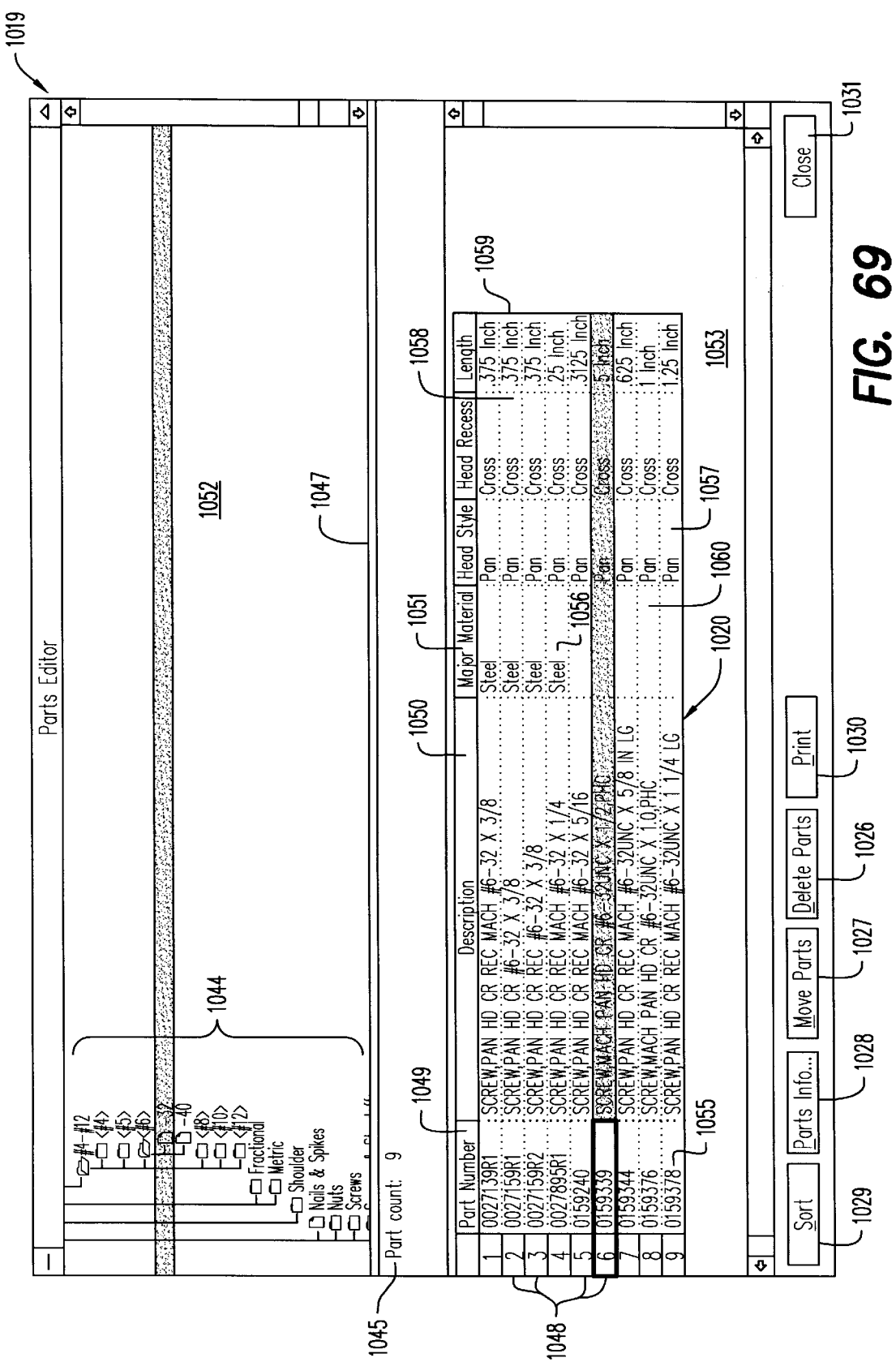
FIG. 69 depicts a display screen showing information displayed in the parts editor window.
Figure 70:
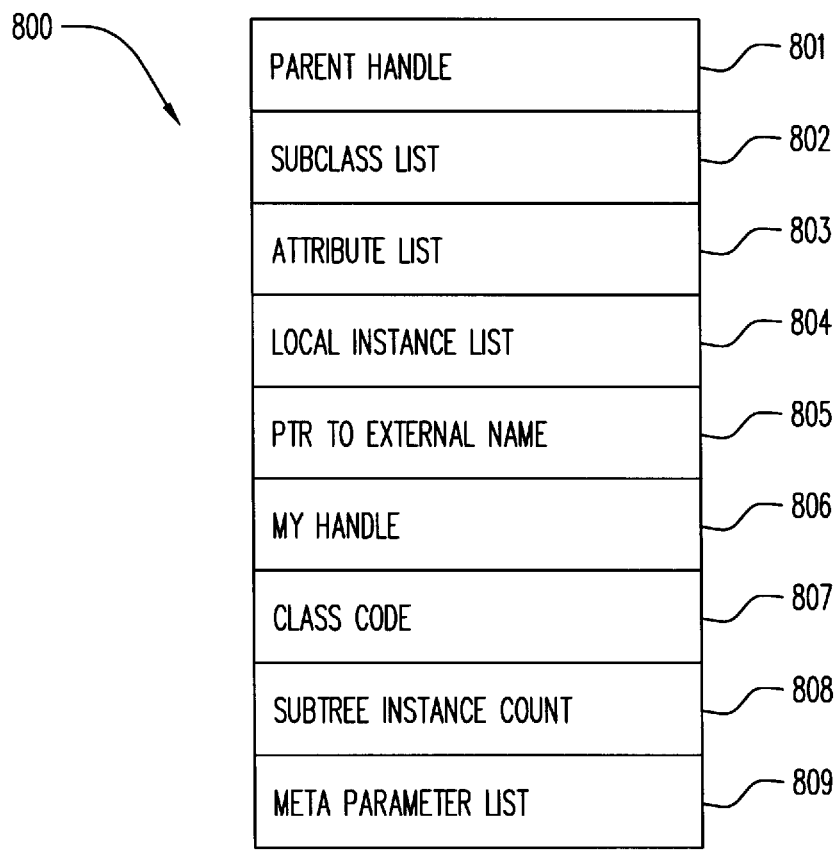
FIG. 70 shows the internal object representation for a class.
Figure 71:
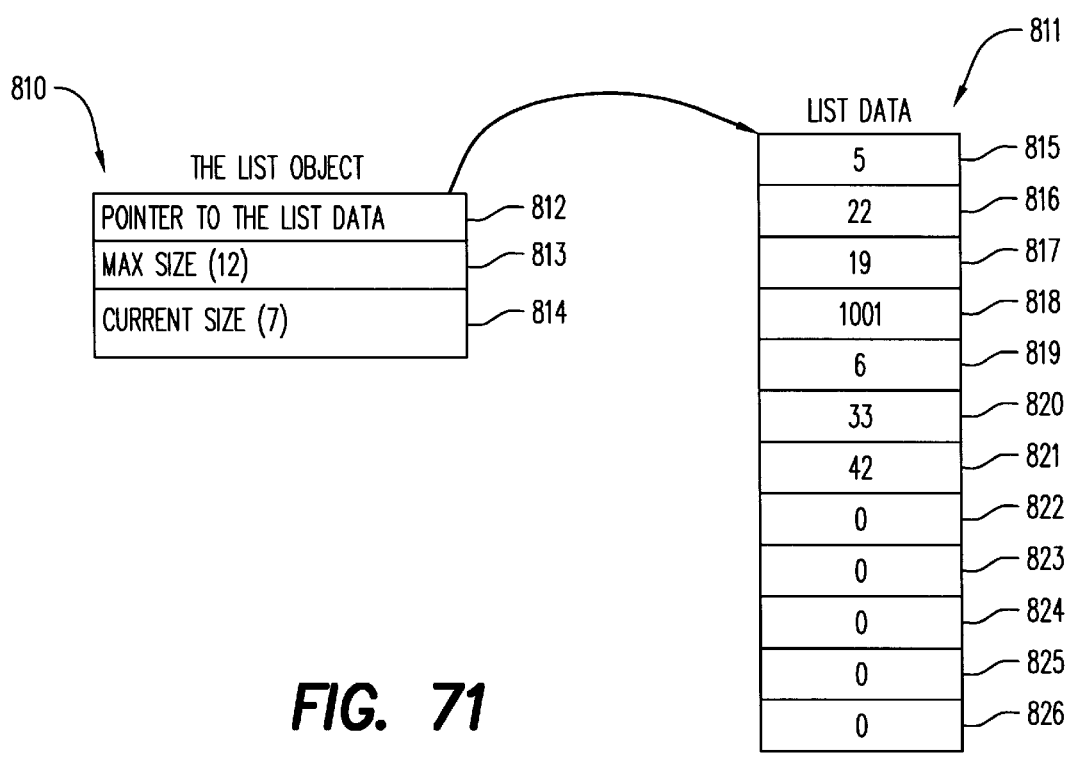
FIG. 71 depicts a generic list.
Figure 72:
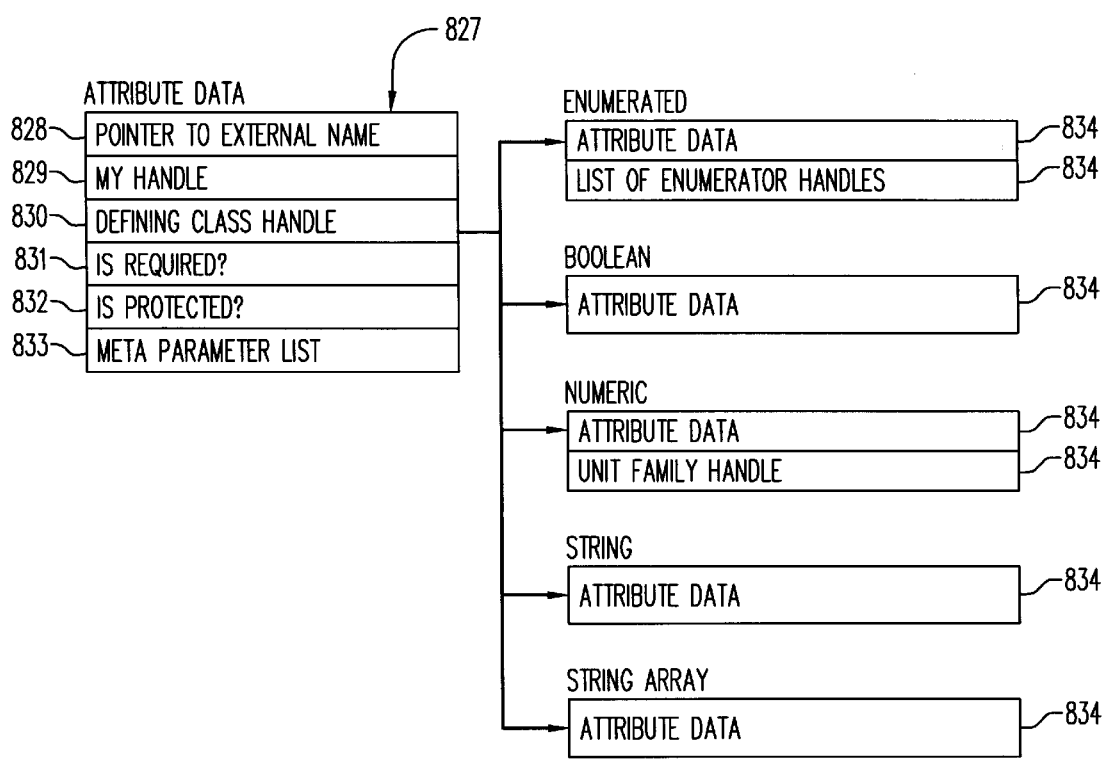
FIG. 72 illustrates the data structure for attribute data.
Figure 73:
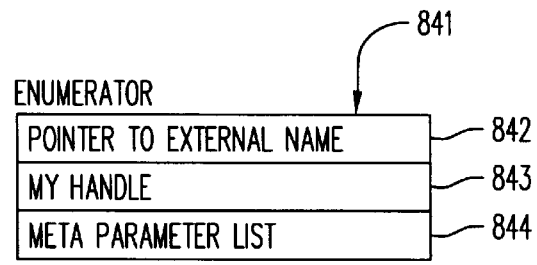
FIG. 73 illustrates the data structure for an enumerator object.
Figure 74:
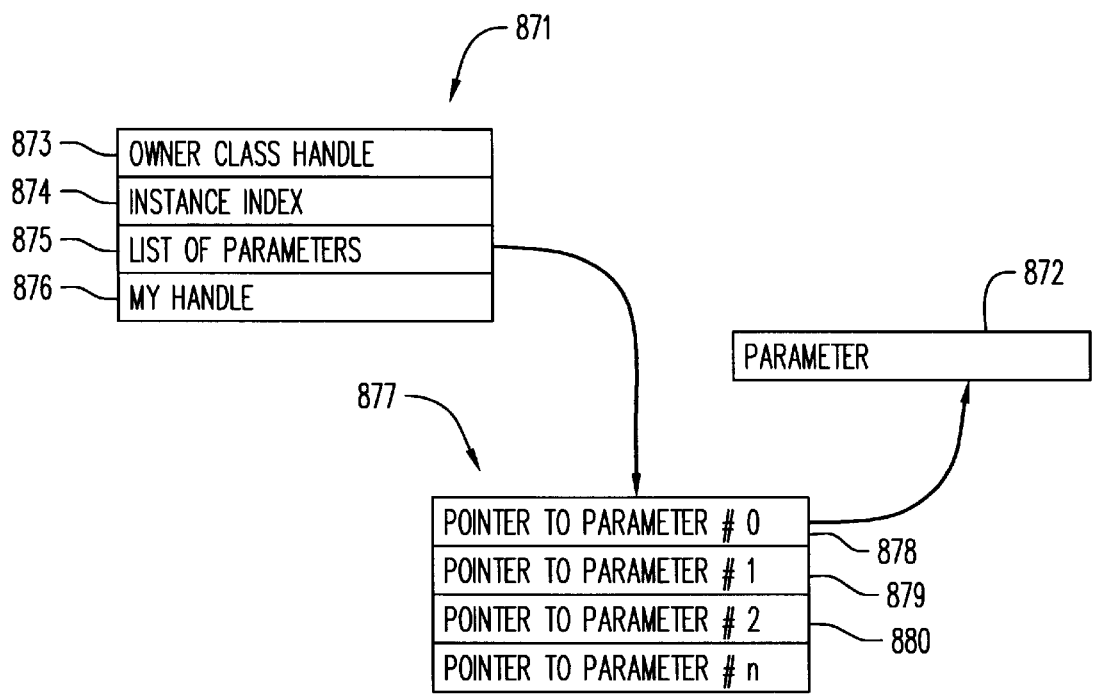
FIG. 74 depicts the data structure for an instance and associated parameters.
Figure 75:
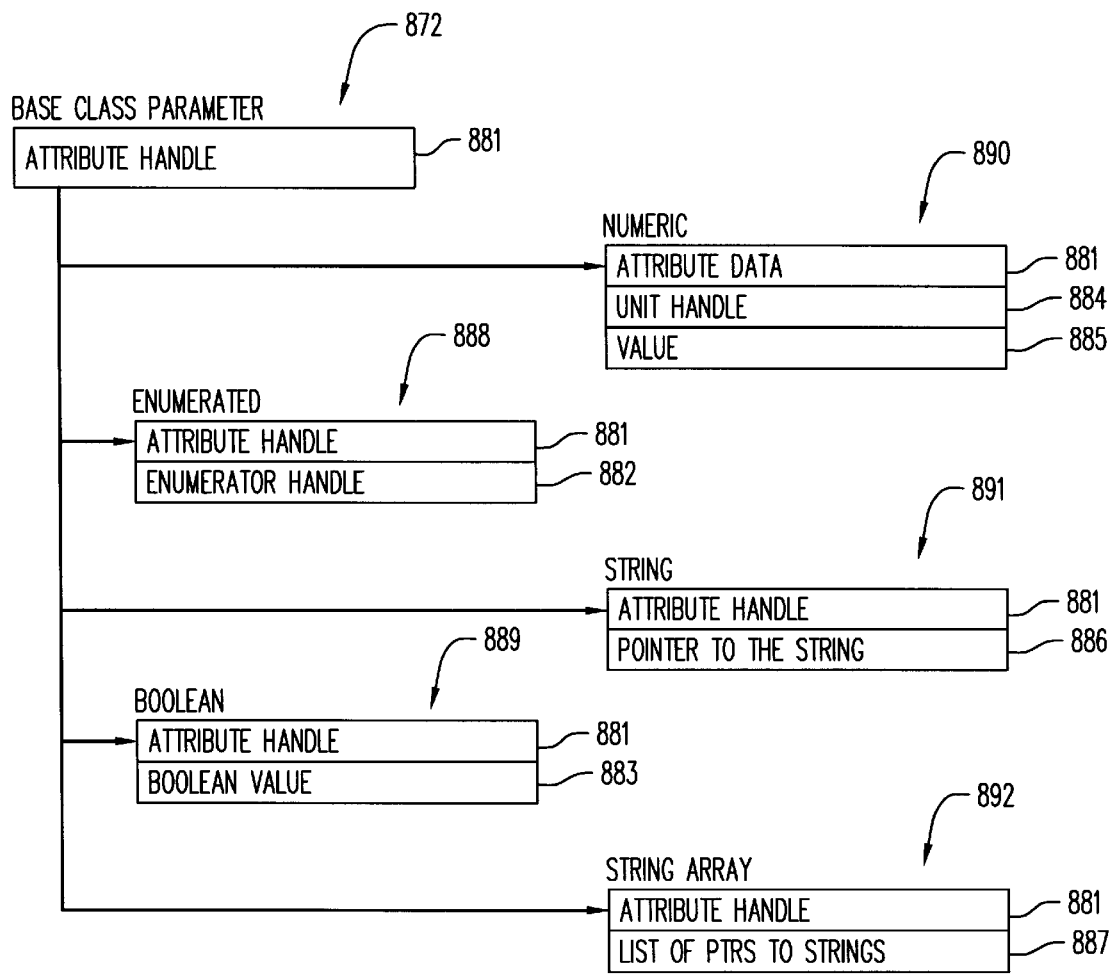
FIG. 75 depicts the data structure for a parameter.
Figure 76:
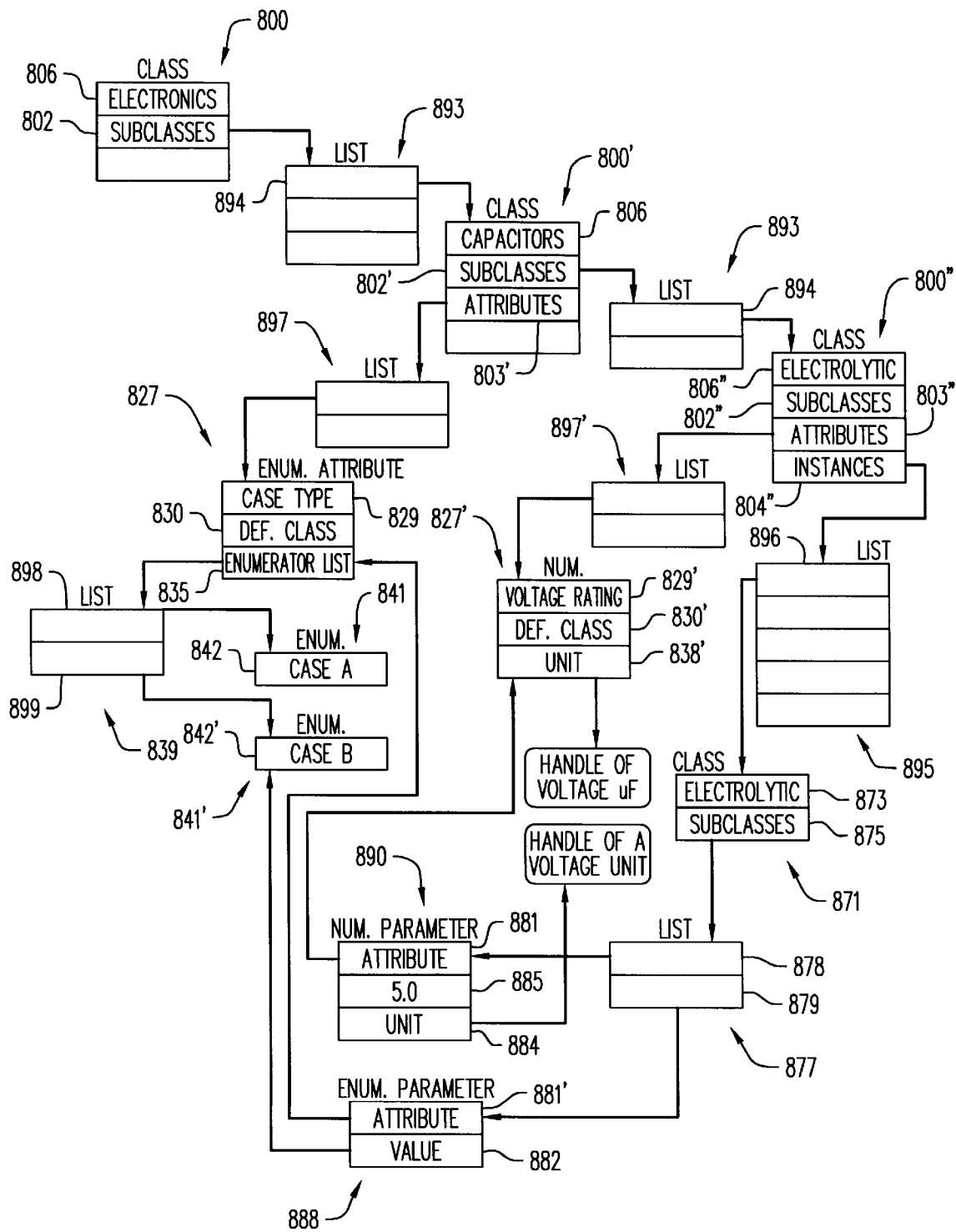
FIG. 76 is an example of a schema with instances.
Figure 77:
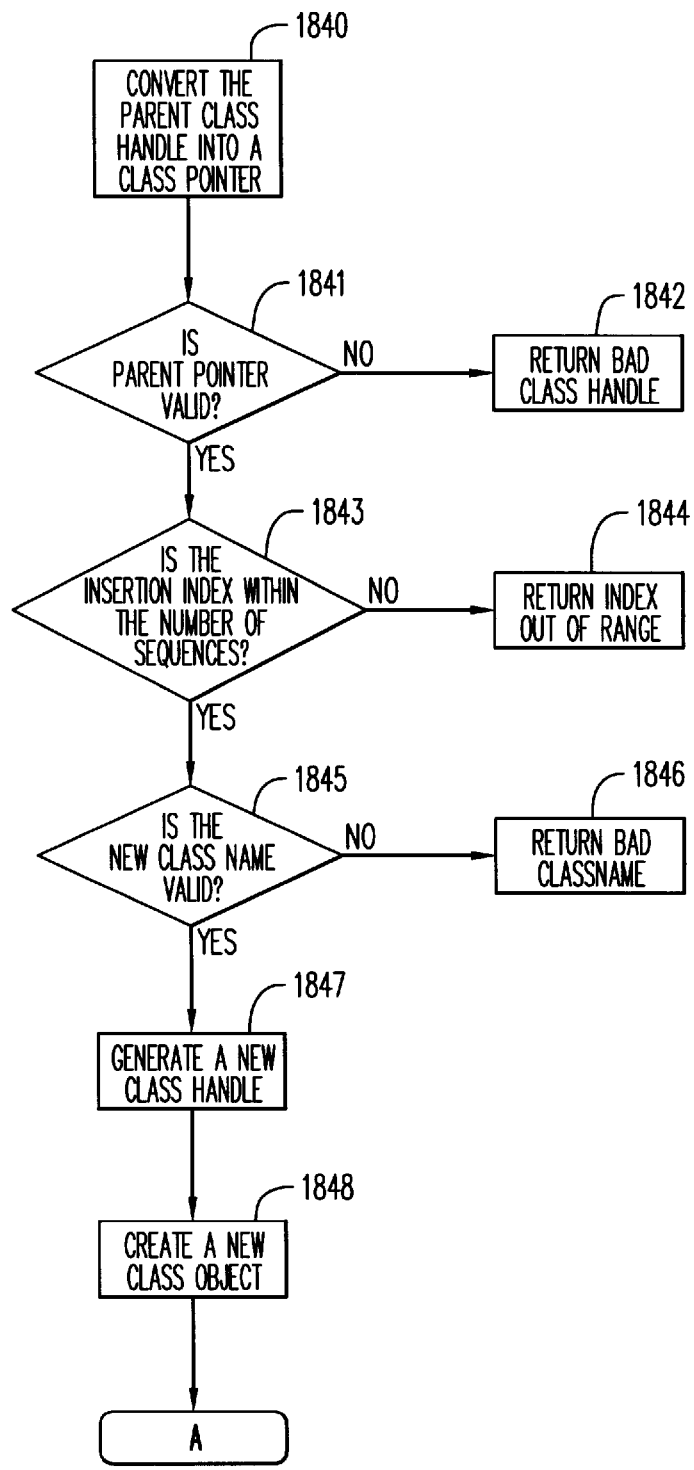
FIG. 77 is a flow chart depicting how to add a class to the schema.
Figure 78:
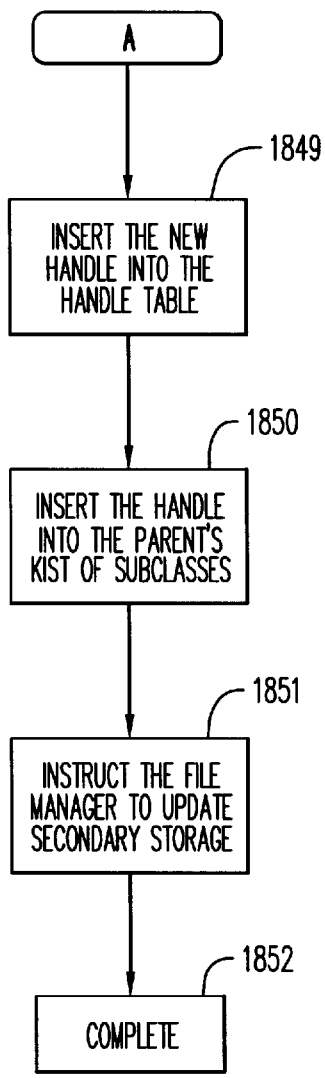
FIG. 78 is a continuation of the flow chart in FIG. 77.
Figure 79:
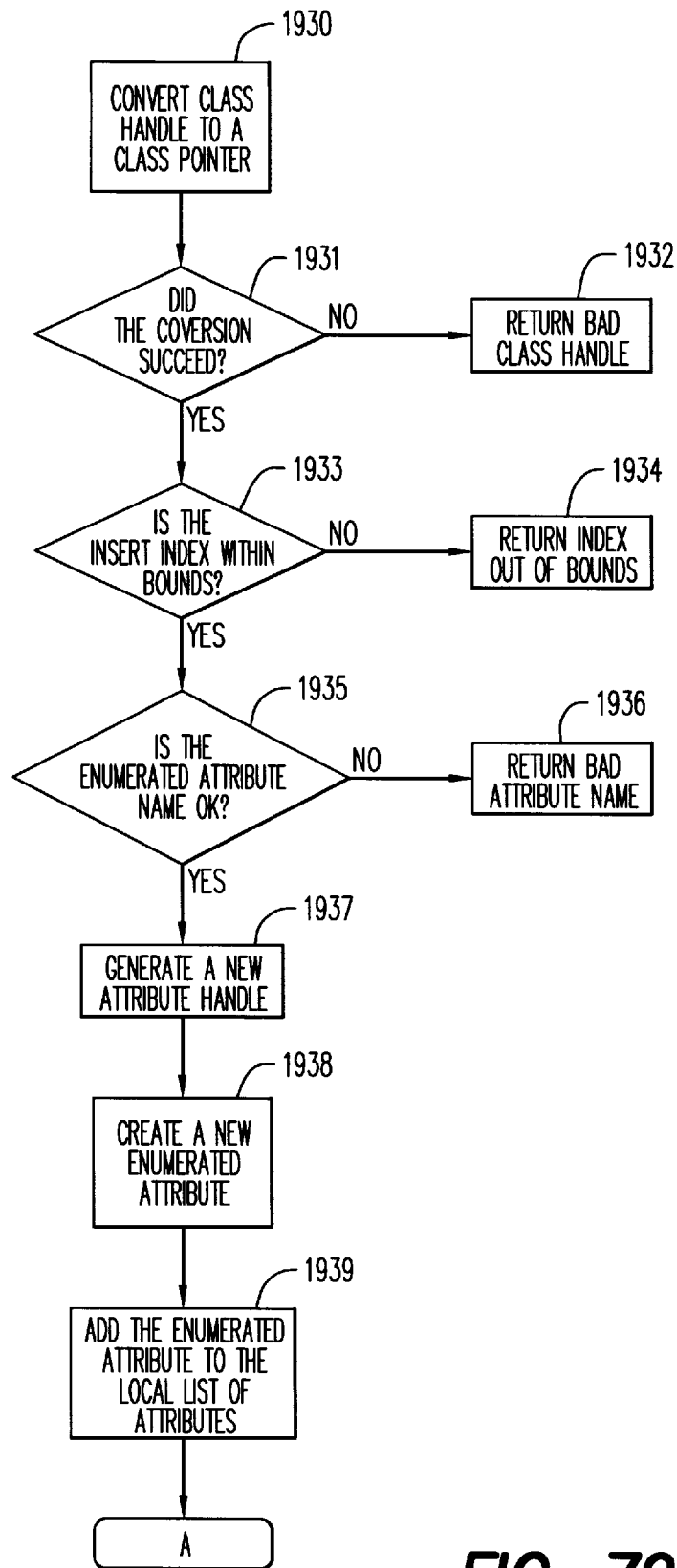
FIG. 79 is a flow chart depicting the addition of enumerated attributes.
Figure 80:
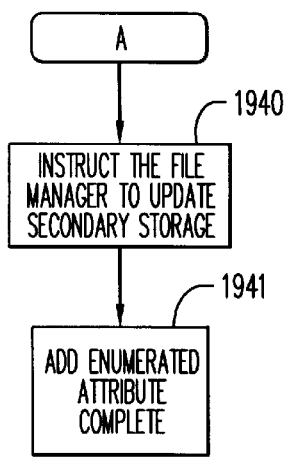
FIG. 80 is a continuation of the flow chart in FIG. 79.
Figure 89:
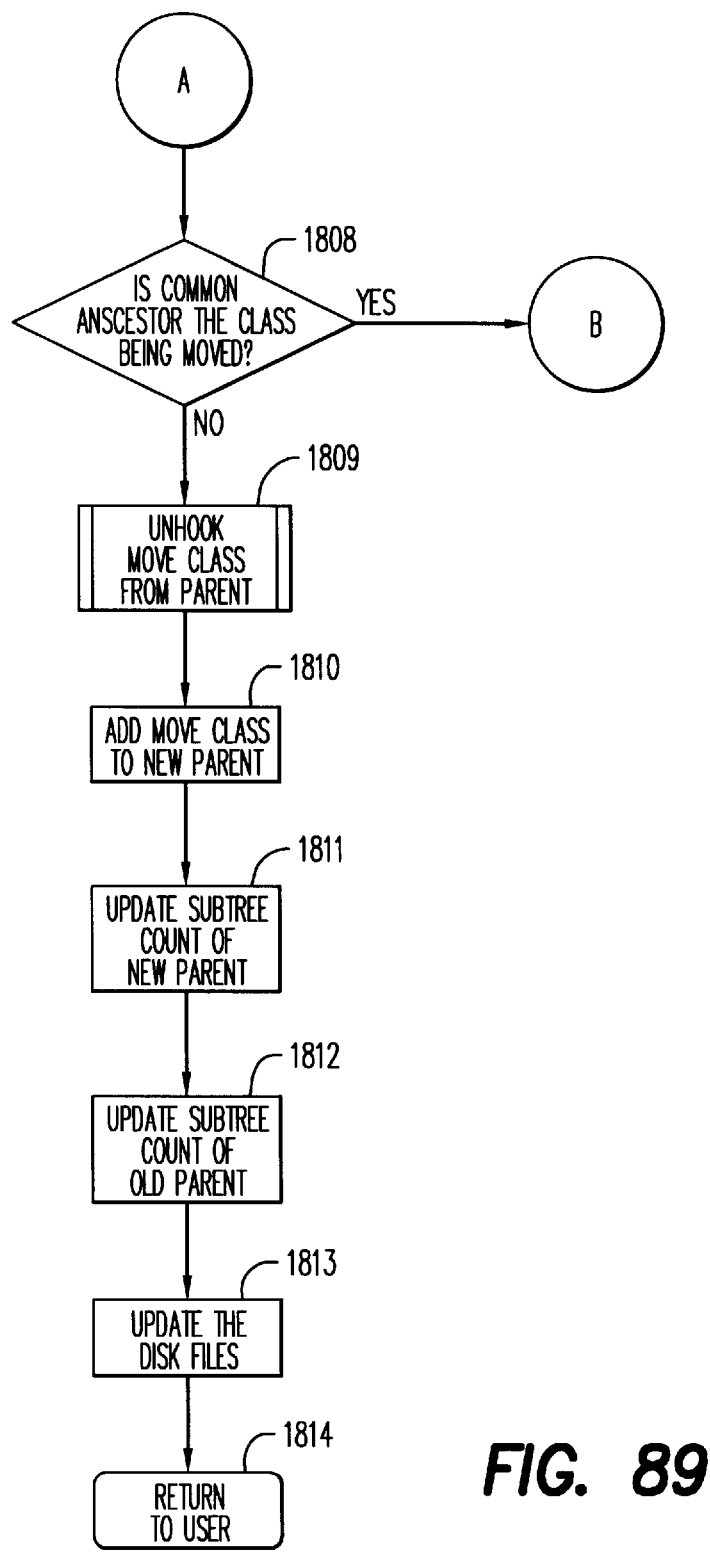
FIG. 89 is a continuation of the flow chart in FIG. 88.
Figure 90:
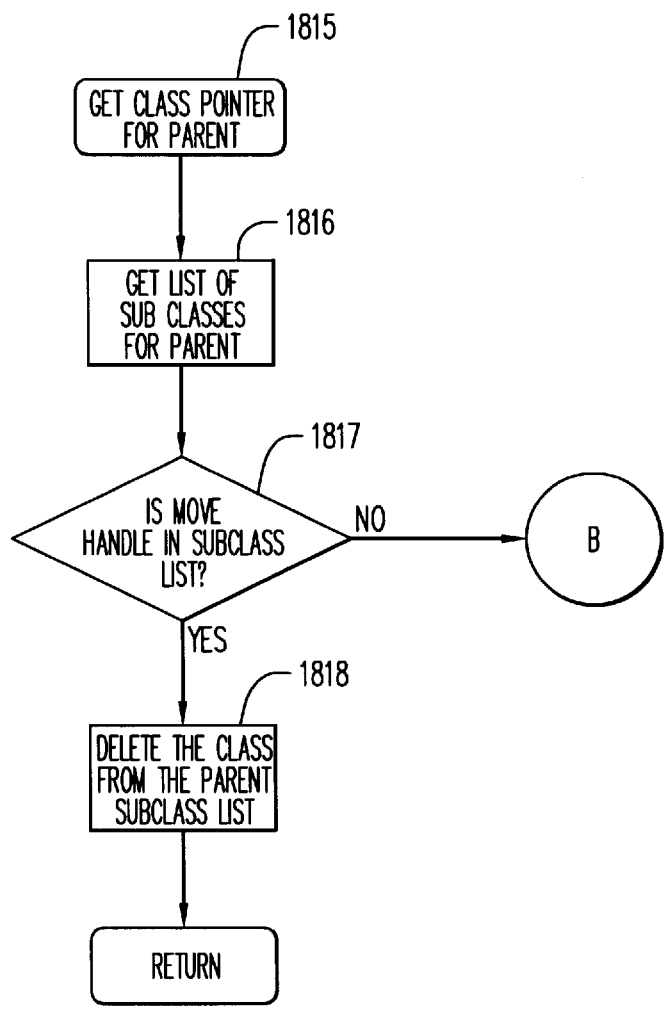
FIG. 90 is a flow chart depicting unhooking a moved class from the original parent.

FIG. 64 depicts a flow chart showing the procedure followed when a user edits parts. Referring, for example, to FIG. 63, a user who has access rights to edit parts may actuate the edit button 3180 and bring up the parts editor window 1019 shown in FIG. 89. The first step 1012 shown in FIG. 64 involves the user selection of attributes and parts to edit from the parts editor window 1019. A user may enter new or revised values 1061 for attributes 1101, and the system will accept parameter input in step 1013. If the attribute is an enumerated attribute 1101, a pull down list 1062 will be presented to the user with available choices, as shown in FIG. 90. In step 1014 of FIG. 64, a determination is made as to whether there are more parts to edit. If there are no more parts to edit, flow proceeds to step 1017. The system updates the part display 1020 and the parts editor window 1019 with edited values 1061. The system then proceeds to step 1018 and returns control to the user.

In step 1014, if more parts remain to be edited, flow proceeds to step 1015, and the system gets the next selected part. In step 1016, the system sets the next selected parts parameter to the user input value 1061. Control then loops back to step 1014.

Figure 91:
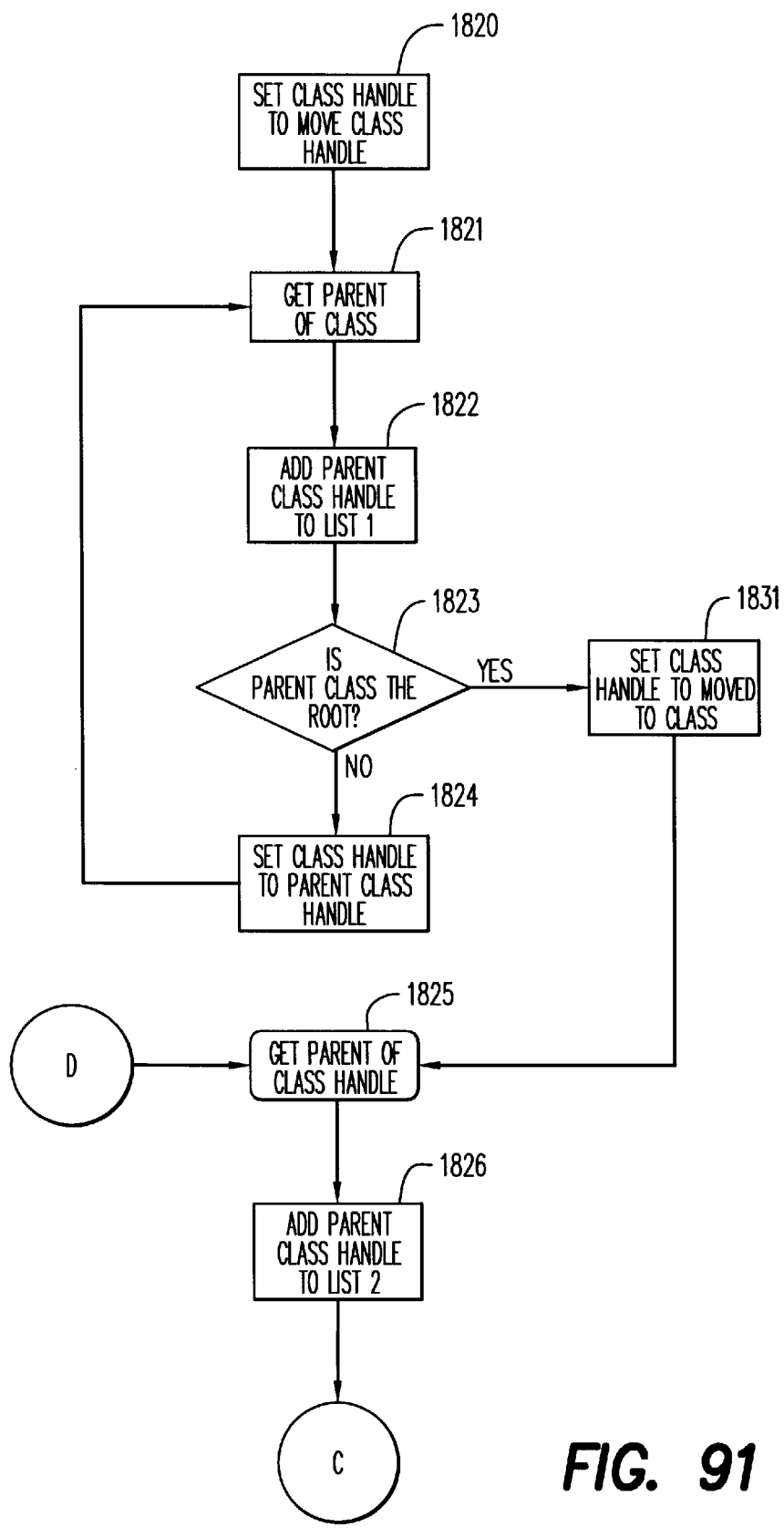
FIG. 91 is a flow chart describing the process for finding the common ancestor of the class to be moved.

FIG. 91 depicts a procedure for deleting parts. In step 1021, the user selects parts to delete from the edit parts window 1019. The user then clicks a delete parts command button 1026. In step 1022, a determination is made as to whether any more parts remain to be deleted. If the answer is yes, flow proceeds to step 1023 in which the system gets the next selected part and deletes it from the query result and the knowledge base. Flow then loops back to step 1022. When there are no more parts to delete, flow proceeds to step 1024, and the system redisplays the updated query result in the part editor window 1019. Flow then proceeds to step 1025, and control is returned to the user.

Figure 92:
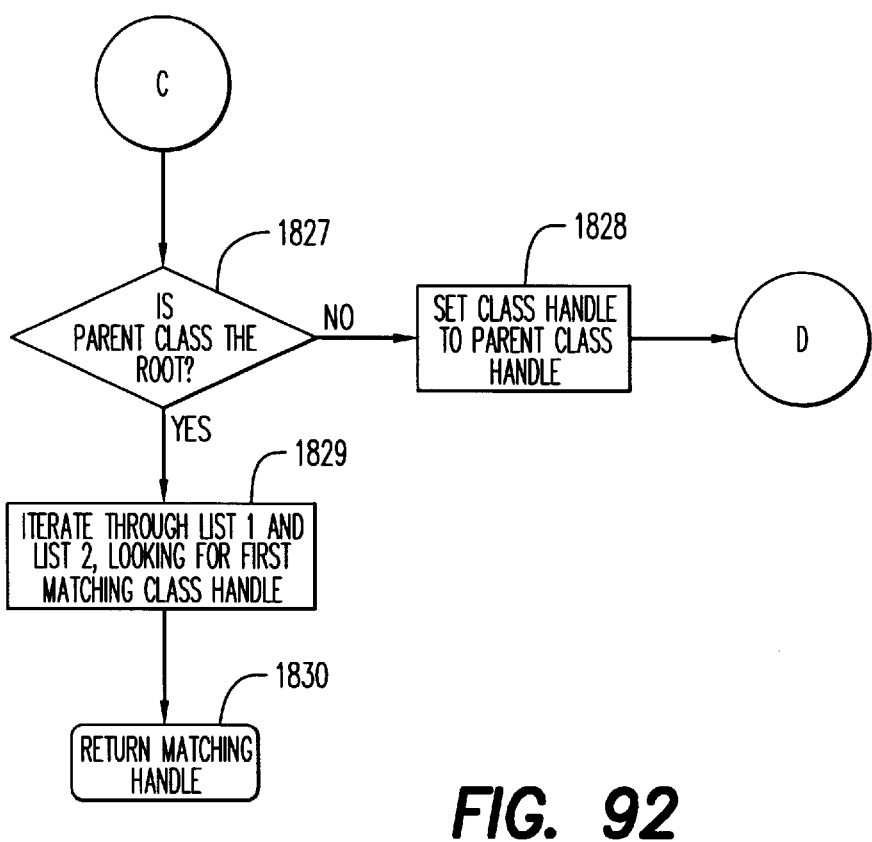
FIG. 92 is a continuation of the flow chart in FIG. 91.

FIG. 92 depicts a flow chart for a procedure for moving parts. The procedure may be initiated by the user selecting parts to move from the parts editor window 1019 as shown in step 1102. Alternatively, the user may initiate the procedure as in step 1103 by navigating the class hierarchy on the parts editor window 1019 and selecting a destination class. The user may actuate a move parts command button 1027, which is illustrated for example in FIG. 81.

Referring to FIG. 92, the procedure proceeds to step 1104 and a determination is made as to whether there are more parts to move. If there are no more parts to move, flow transfers to step 1042 and the system redisplays the query result in the parts editor window 1019. The flow then proceeds to step 1043, and control is returned to the user.

Returning to step 1104 in FIG. 92, if a determination is made that there are more parts to move, flow proceeds to step 1105 and the system gets the next selected part. In step 1106 a determination is made as to whether the user has requested an unconditional move. If the answer is yes, flow jumps to step 1040. The system then sets the part class to the destination class selected by the user. Any parameters or missing attributes are set to undefined. Flow proceeds to step 1041, and the system deletes the moved part from the query results. Flow proceeds to step 1042 where the system redisplays the query result in the parts editor window 1019.

In step 1106, if the user has not requested an unconditional move, flow proceeds to step 1107 where a determination is made as to whether attributes for any part parameters are missing from the destination class. If the answer is no, flow proceeds to step 1040 and continues as described above.

If a determination is made in step 1107 that there are attributes for part parameters which are missing from the destination class, flow transfers to step 1108. The system gets a list of parameters that will be deleted by the move and presents them to the user by displaying them on the display 116. Flow then proceeds to step 1109. If the user then overrides the warning that parameters will be deleted, or requests that the parts be moved unconditionally, flow transfers to step 1040 and proceeds as described above. If the user does not wish to override the parameter deletion warning or does not request that the parts be moved unconditionally, flow loops back to step 1104.

Figure 81:
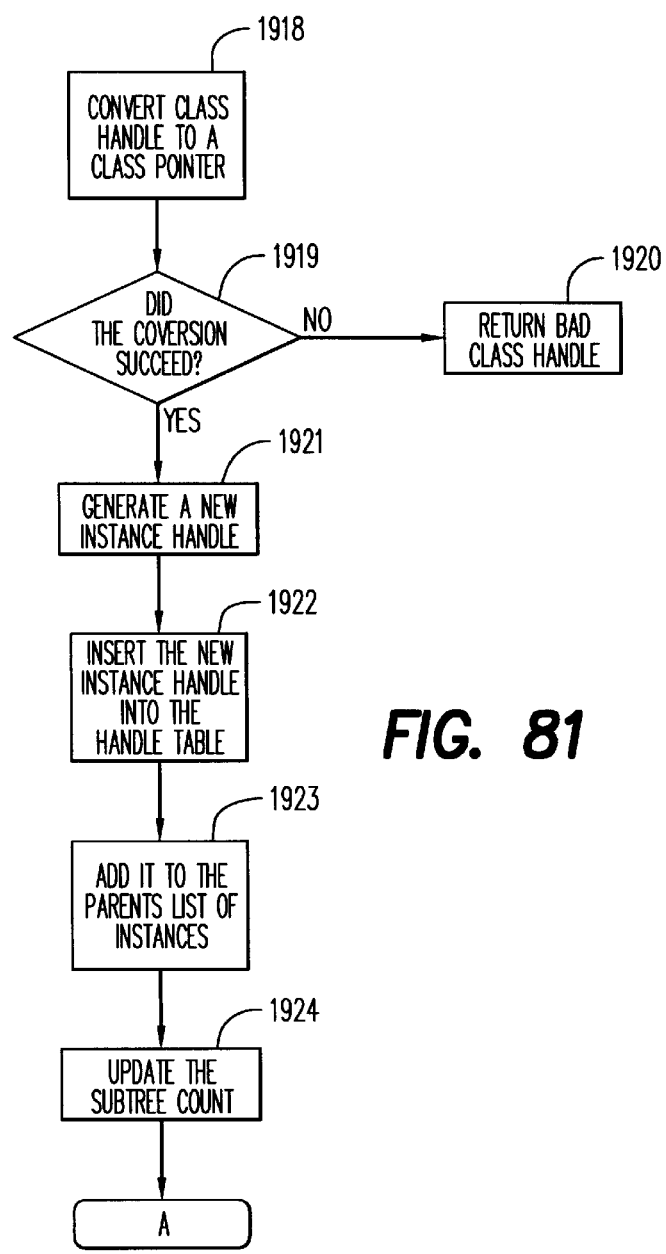
FIG. 81 is a flow chart depicting the addition of an instance.

The process of editing parts may be further understood in connection with a description of the parts editor window 1019 (shown in FIG. 81). Once the user has specified a part by selecting a class 3174 and subclasses 3196, 3197, 3198 and 3199, entered the attribute search criteria 3177, and set the display order 194, the user can edit the parts by choosing the edit command button 3180. Choosing this command 3180 causes the parts editor window 1019 to appear. The top area 1102 of the parts editor window 1019 contains the class tree 1044, showing highlighting the navigation path and class definition of the parts the user is editing. The bottom area 1103 of the window 1019 contains the parts 1020 the user has selected to edit. The parts appear in a table 1020 that is similar to tables that are used in spreadsheet applications. The part attributes 1049, 1100, 1101, etc., and attribute values 1105, 1106, 1107, etc., appear in the display order, from left to right, that the user previously established in the part specification window 3170. To use a value, the user clicks an enter box 1063. To cancel a new value, the user clicks a cancel box 1064.

The top area 1102 of the parts editor window 1019 contains the class definition 1044, which comprises the class tree showing the navigation path and class definition of the parts selected for editing. The window 1019 has a horizontal split bar 1047 that splits the window into two sections 1102 and 1103. The user can move the split bar 1047 up or down so the user can see more of one section 1102 or the other 1103. The parts editor window 1019 includes an area referred to as the editing area 1046. After selecting an attribute value 1101, a text box or list box 1104 appears in this editing area 1046 so the user can make changes (see FIG. 89). Each part appears as a row 1048 in the table 1020, and each row 1048 of the table 1020 is numbered. The user may use the row number to select a part that the user needs information on or that the user wants to move or delete. The attributes 1049, 1100, 1101, etc., are the column headings, and the attribute values are the rows.

After determining that the user is going to enter a new part in the knowledge base, the user must fully specify the part. In a preferred embodiment, a complete part specification is defined as selecting the class up to the leaf class 3201 and entering values for all the required attributes 3203. In a preferred embodiment, if the user does not select a leaf class 3201 or enter the required attributes 3203, the user cannot add the part. When making parts, a preferred procedure is for the user to enter as many attribute values 3203 as the user can in order to give the part as complete a specification as possible.

Some attributes are required before a part can be added. Before choosing the make command 3181, the user must enter an attribute value for each required attribute. In addition, a user cannot enter any attribute values for protected attributes. Protected attributes have a protected icon 3191 immediately to the left of the attribute icon. Once the user has selected the leaf class 3201 and entered all required attributes, the user can choose the make command button 3181. Choosing the make command 3181 causes the part to be added to the user's knowledge base and the parts found 3172 to be updated to show a part count of 1.

The knowledge base client 131 is a set of C++ libraries that provide knowledge base services to a client application 130, 133, and 144 through the API 143. The services may be either local or result in remote procedure calls to the knowledge base server 132. For client applications which run under Windows, the knowledge base client consists of one or more Windows Dynamic Link Libraries (DLL) which use the WinSock DLL to provide network access to the knowledge base server 132 and the registry server 141.

The knowledge base server 132 is a UNIX server process that manages knowledge base 110 access, retrieval and updates. A knowledge base server 132 may manage one or more knowledge bases 110 and 110.

The dynamic class manager 134 is a software subsystem in the knowledge base server 132 that manages schema and data. The dynamic class manager 134 provides the ability to store class, attribute, unit and instance information that can be modified dynamically. The dynamic class manager 134 consists of C++ libraries and classes and provides operations for "legacizing" and for accessing, creating, deleting, and modifying classes, attributes, instances, parameters, unit families, units and meta-attributes at run-time.

The capabilities of the dynamic class manager 134 are accessed by a user programmer through a set of functions provided by the API 143.

The dynamic class manager 134 knowledge base, hereafter sometimes referred to as "the knowledge base," is a collection of classes, attributes, units, instances with parameter values, and relationships among these objects. In the dynamic class manager 134, a class defines a separate type of object. Classes have defined attributes. The attributes have some type, and serve to define the characteristics of an object. A class can be derived from another class. In this case, the class inherits attributes from its ancestors. A knowledge base contains instances of classes. The attribute values defined by an instance are parameters.

Another way to describe the concept of classes, attributes, instances, and parameters is to use a dog as an example. The word "dog" is the analog of a class. Dog describes a group of similar things that have a set of characteristics, or attributes. The attributes of a dog are things like color, breed, and name. The class and attributes do not describe any particular dog, but provide the facility to describe one. An instance of a dog has parameters that give values to the attributes: for example, a dog whose color is beige, of the breed golden retriever, and whose name is Sandy.

Classes can have relationships. The class "dog" is part of the larger class, "mammal". The class "mammal" is less specific than "dog". It conveys less information about the object "dog", but everything about "mammal" also applies to "dog". "Dog" is clearly a subset of "mammal", and this relationship is a subclass. "Dog" is a subclass of the class "mammal". The subclass "dog" could be further subclassed into classes like big "dogs", little "dogs", etc. The concept subclass implies a parent relationship between the two classes. "Mammal" is a parent and "dog" is a subclass. The terminology "'dog' is derived from 'mammal'" is also used to describe the relationship.

The subclass "dog" inherits attributes from its parent class. The attribute color could be part of the "mammal" class, since all "mammals" have a color. The "dog" class inherits the attribute color from its parent.

The root class is special, it has no parent. It is the class from which all classes begin their derivation. In illustrations set forth herein, graphs have been drawn to illustrate a class hierarchy, and the root class is placed at the top of those drawings. Subclasses branch out from the root class into ever widening paths that make the graph look like an upside down tree. The entire group of classes is a tree, and the special class that has no parent, though it is at the top, is the root.

One of the available attribute types supported by the dynamic class manager 134 is a numeric type. Numeric attributes are used to describe measurable quantities in the real world. Such measurements do not consist of just a numeric value; they also have some associated units. The dynamic class manager 134, in conjunction with the units manager 138, maintains information about different types of units that can be used with numeric attributes. The dynamic class manager 134 (using the units manager 138) can also perform conversions among units where such conversion makes sense. The units that the system understands are grouped into various unit families. These unit families and the units they define, can be changed at run time. The dynamic class manager 134 also comprises a dynamic units manager 138.

The word "schema" refers to the layout of classes, attributes, units, and unit families. A knowledge base with no instances is a schema. This may be better understood in connection with the following more detailed description of the various objects managed by the dynamic class manager 134.

A class is the most fundamental object in the schema in accordance with the present invention. A class is a collection of related objects. In the present example, a class may have eight or nine components. A class is a schema object. As explained above, the schema is the collection of classes, attributes, units, and unit families and their relationships. Every class has exactly one parent from which it is derived, except for the root class 3173. The root class 3173 is the one class that has no parent. The root class 3173 has another special characteristic in that it can never be deleted. The consequence of a class being derived from its parent means that the class has all of the properties of its parent. These properties are referred to as attributes. Attributes are inherited from the parent class.

A class may have zero or more subclasses. A class is a parent of each of its subclasses. A subclass is a class that has a parent, so the root class 3173 is not a subclass. The subclasses of a parent class have some defined order. The order is persistent, meaning that the dynamic class manager 134 preserves the order even across closes and reopens of the knowledge base.

A class has a set of descendants that is comprised of all of its subclasses, all of the subclasses' subclasses, and so on. A class that has zero subclasses or an empty set of descendants is called a leaf class 3201. A subtree is the set composed of a class and all of its descendants. The subtree is said to be rooted at the class. A subclass also has a set of ancestors, which is the set composed of the parent, its parent's parent, and so on including the root class 3173. Classes that have the same parent are sometimes referred to as siblings.

Following a subclass to its parent is sometimes referred to as going up the tree. Moving from a parent to one of its subclasses is sometimes referred to as going down the tree. Therefore, the root class 3173 of the schema is the furthest up at the top of the tree, and the objects furthest down at the bottom of the tree are typically leaf classes 3201.

Figure 61:
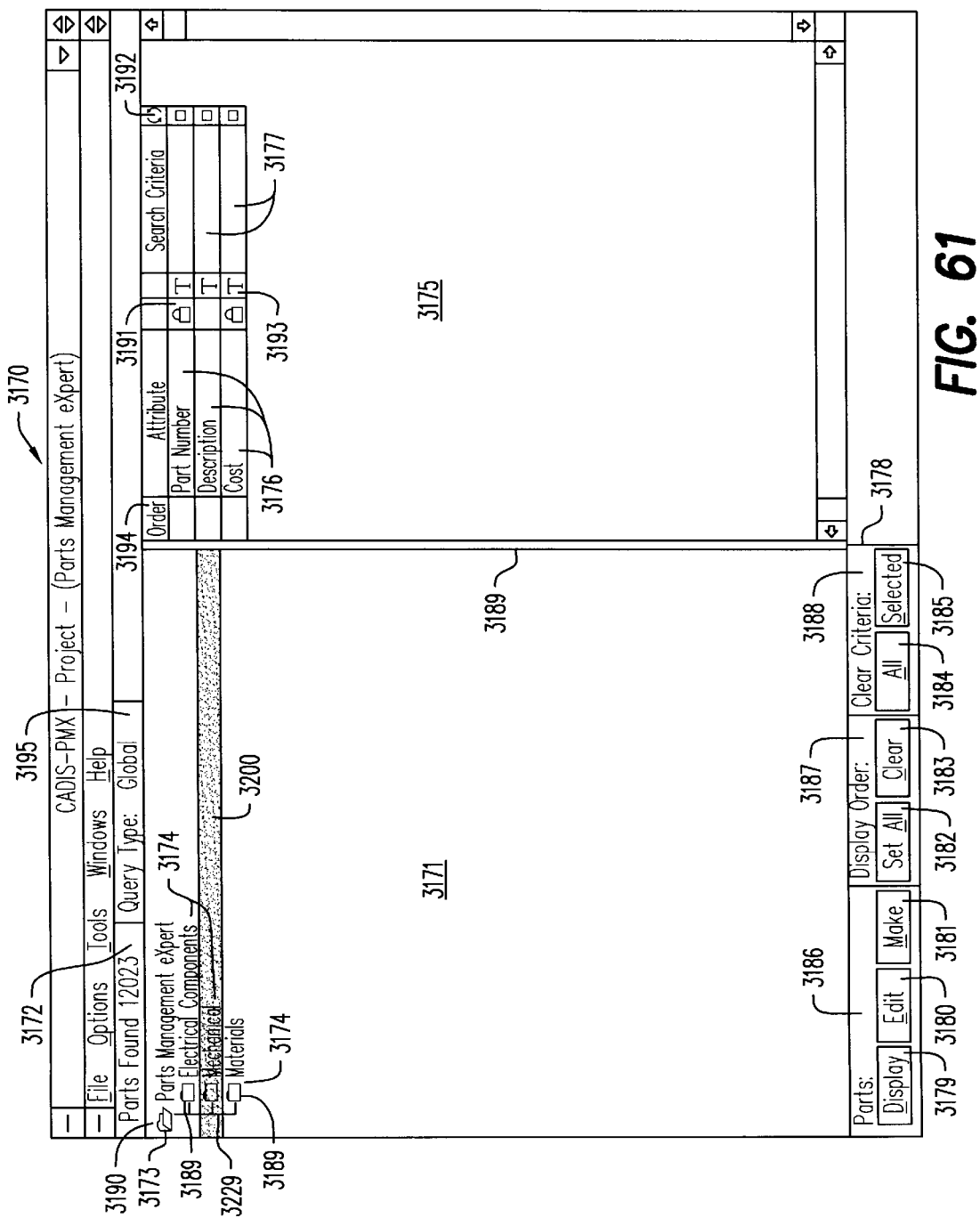
FIG. 61 depicts an initial display screen showing the part specification window.
Figure 62:
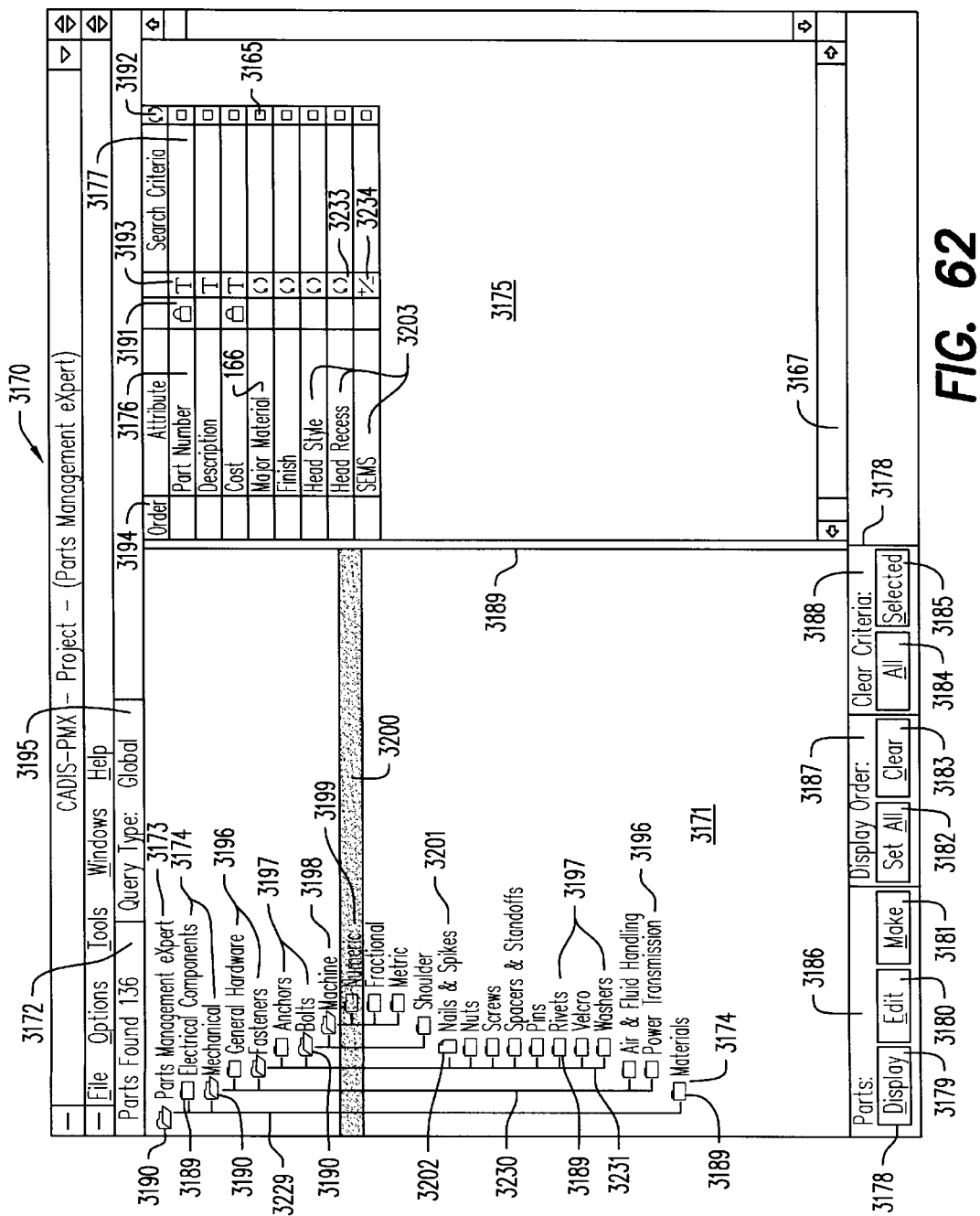
FIG. 62 depicts an example of the part specification window during a search.

A class has a name which is the text identifying a class, subclass, or leaf class, and is an ASCII character string. The present invention uses class handles for references to a class, which are further described in connection with the operation of the handle manager 3137. In the example shown in FIG. 61, there are three subclasses.

Figure 82:
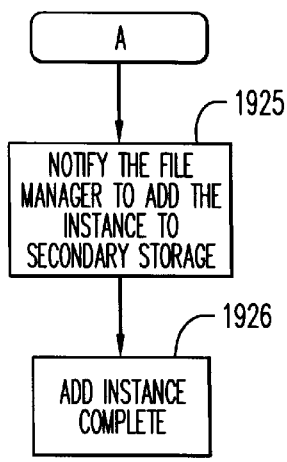
FIG. 82 is a continuation of the flow chart in FIG. 81.

FIG. 82 shows the internal object representation for a class 800. In the present schema, a class has a parent handle 801. Every class object 800 includes stored information representing the handle of its parent class, except in the special case of the root class 3173, which has no parent. A null is stored in this location in that case. A handle is a reference to an object. The parent handle information 801 is used by the handle manager 3137 to identify the stored class object which is the parent class for the class 800.

The class object 800 includes a subclass list 802. The subclass list 802 is an array of handles which may be used by the handle manager 3137 to identify those class objects which are subclasses of the class 800. In the internal representation provided in the present invention, lists can grow without bounds and are dynamic. The storage space available is not fixed.

This provides flexibility and power to the database structure, because the class object 800 may have an extremely large number of subclasses in a large database without substantial degradation in performance.

The class object 800 includes an attribute list 803. The attribute list 803 is a list of handles. The handle manager 3137 may use the information stored in the attribute list 110 to identify the attributes possessed by class object 800.

The class object 800 also includes a local instance list 804, which is a handle list. Field 805 shown in FIG. 82 is a pointer to storage location of the class name, i.e., the text identifying the class.

Field 806 is used to store the handle for the class 800. The field 807 stores an indication of the class code, i.e., whether it is primary, secondary, or a collection.

The class object 800 also includes a subtree instance count 808. The subtree instance count 808 is a numeric indication of the total number of items or instances present in all of the descendants of the class 800 i.e., the total number of instances in class 800, all of the class 800's subclasses, all of the subclasses' subclasses, and so on. Thus, when a user is navigating through the tree structure of a knowledge base, as a user selects and opens subclasses, the user can be immediately informed of the number of parts found at any location on the tree by retrieving the subtree instance count 808 for the current class and passing that information to the retriever 130. The subtree instance count 808 is kept up to date whenever the knowledge base is modified, so it is not necessary while a user is navigating through the tree structure of the database to perform a real time computation of parts found 3172.

Referring again to FIG. 82, the class object 800 also preferably includes a metaparameter list 809. The metaparameter list 809 is a string list, and may be used as a pointer to strings containing linking information, for example, the name of a file that contains a graphical display of the type of parts represented by the class 800, thesaurus information used for legacizing data, or other legacizing information.

Figure 83:
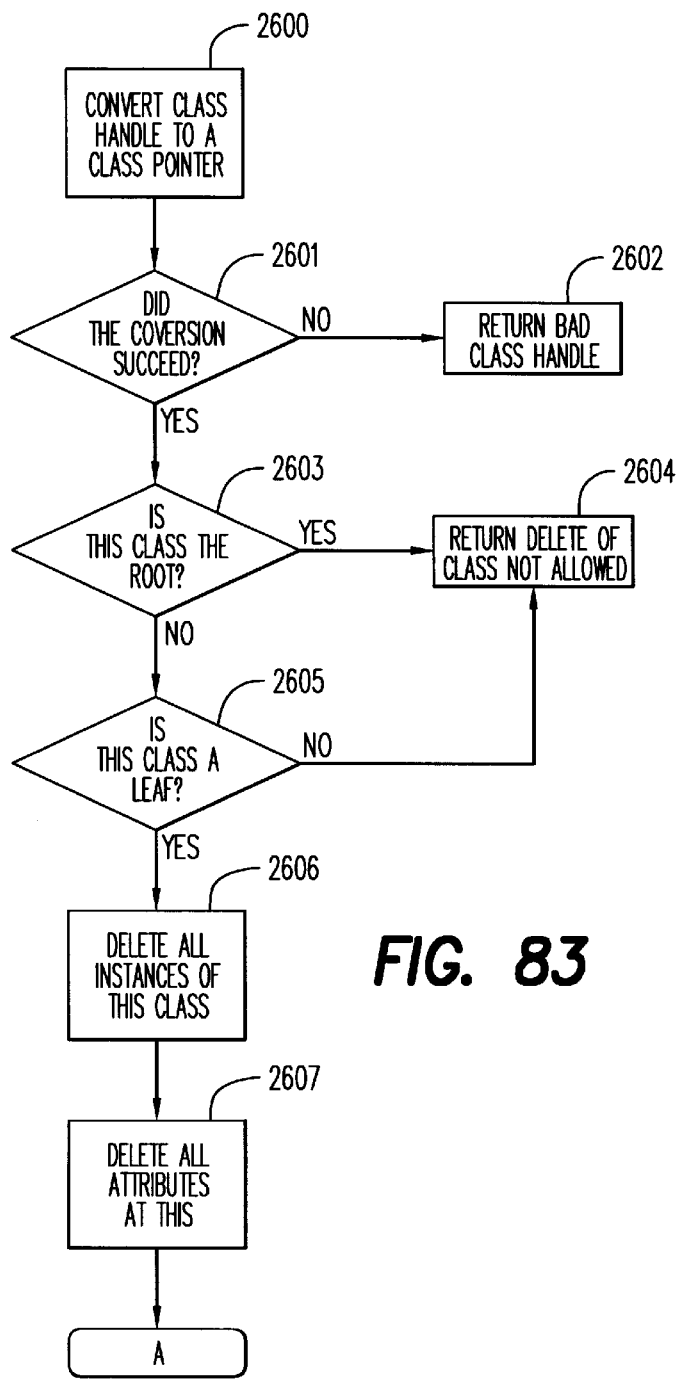
FIG. 83 is a flow chart depicting the deletion of a class.

FIG. 83 depicts an example of a generic list 810. The class manager 134 uses lists of handles, lists of floating point values, lists of pointers to character strings, etc. whenever a variable amount of data can be associated with an object. Examples of lists would be items 802, 803, 804 and 809. The list 810 depicts a list of simple integers.

A list object 810 includes a pointer 812 which points to the beginning 815 of the list data 811. A list object 810 also includes a field 813 indicating the currently allocated size for the list data 811. The list object 810 also includes a field 814 containing information indicating the amount of list data 811 currently in use.

The list data 811 contains the actual list of values. The first item 815 in the list in this example contains the value "5". Similarly, in this example list items 816, 817, 819, 820 and 821 contain additional values. List items 822, 823, 824, 825 and 826 in this example are not currently in use and are set to zero. In this illustrated example, the currently allocated size 813 of the list is twelve. The amount in use 814 of the list is seven, meaning that the first seven items in the list are valid.

Figure 84:
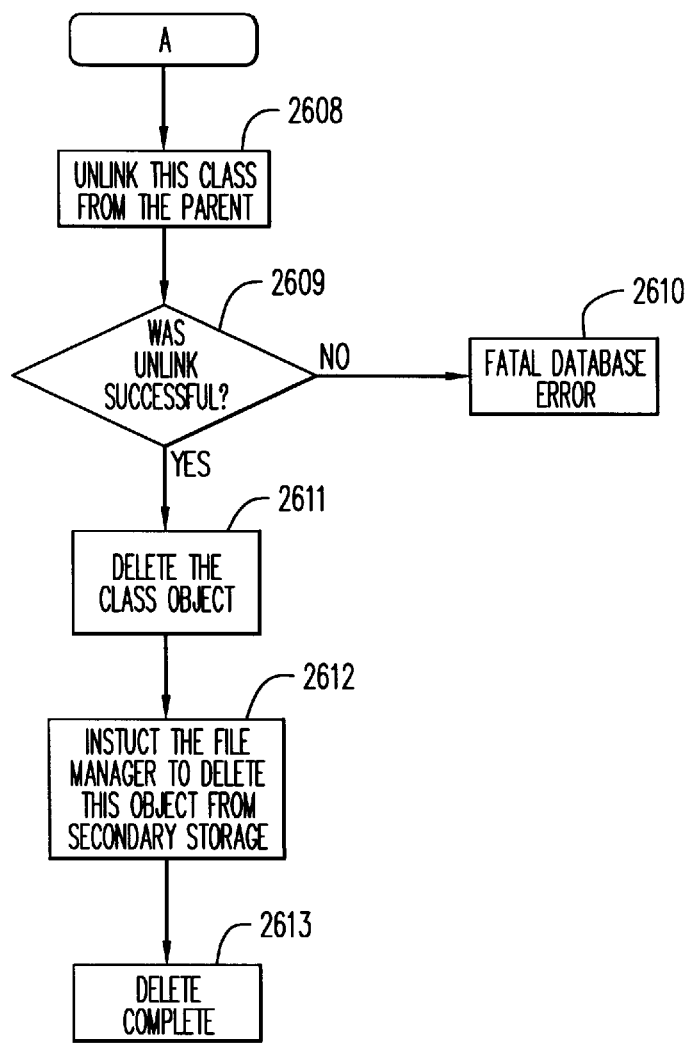
FIG. 84 is a continuation of the flow chart in FIG. 83.

FIG. 84 illustrates the data structure for attribute data 827. An attribute object 827 contains at least six fields in the illustrated embodiment. A first field 828 contains a pointer to an external name comprising an ASCII character string that is the name for the attribute. The attribute object 827 also contains a field 829 containing the handle for this attribute object 827. The attribute object 827 also contains a field 830 which contains the handle of the class that defines this attribute 827. The fourth field 831 is a Boolean indication of whether this attribute is a required attribute for the defining class. A fifth field 832 contains a Boolean field indicating whether this attribute is protected. This is indicated by the protected icon 3191. In the data structure of the attribute object 827 shown in FIG. 84, this information is stored in field 832. The attribute object 827 also contains a field 833 which is a metaparameter list.

Enumerated attributes include fields 828–833, indicated collectively as attribute data 834, plus a field 835 which is a list of enumerator handles.

In the case of a Boolean attribute, only fields 828–833 are used, which are again indicated collectively in FIG. 84 as attribute data 834.

Numeric attributes include fields 828–833, indicated collectively as attribute data 834, plus a field 838 which contains the handle of the unit family for this numeric attribute.

In the case of a string attribute, and in the case of a string array attribute, only the attribute data 834 comprising fields 828–833 is included.

One example of the use of these data structures by the dynamic class manager 134 is the procedure of a user selecting a class by clicking on the closed folder icon 3189 associated with the class. When a class is opened, the dynamic class manager 134 will check the class object 800 and retrieve the attribute list 803. The handles stored in the attribute list 803 will be passed to the handle manager 3137. The handle manager 3137 will return the virtual memory address for each attribute 827 of the class. The dynamic class manager 134 may then use the pointer 828 to the external name of an attribute object 827 to retrieve the character string text for the external name for the attribute. That ASCII text information can then be passed through the API 143 so that it may eventually be provided to the retriever 130 for display to a user on the display 116.

Figure 85:
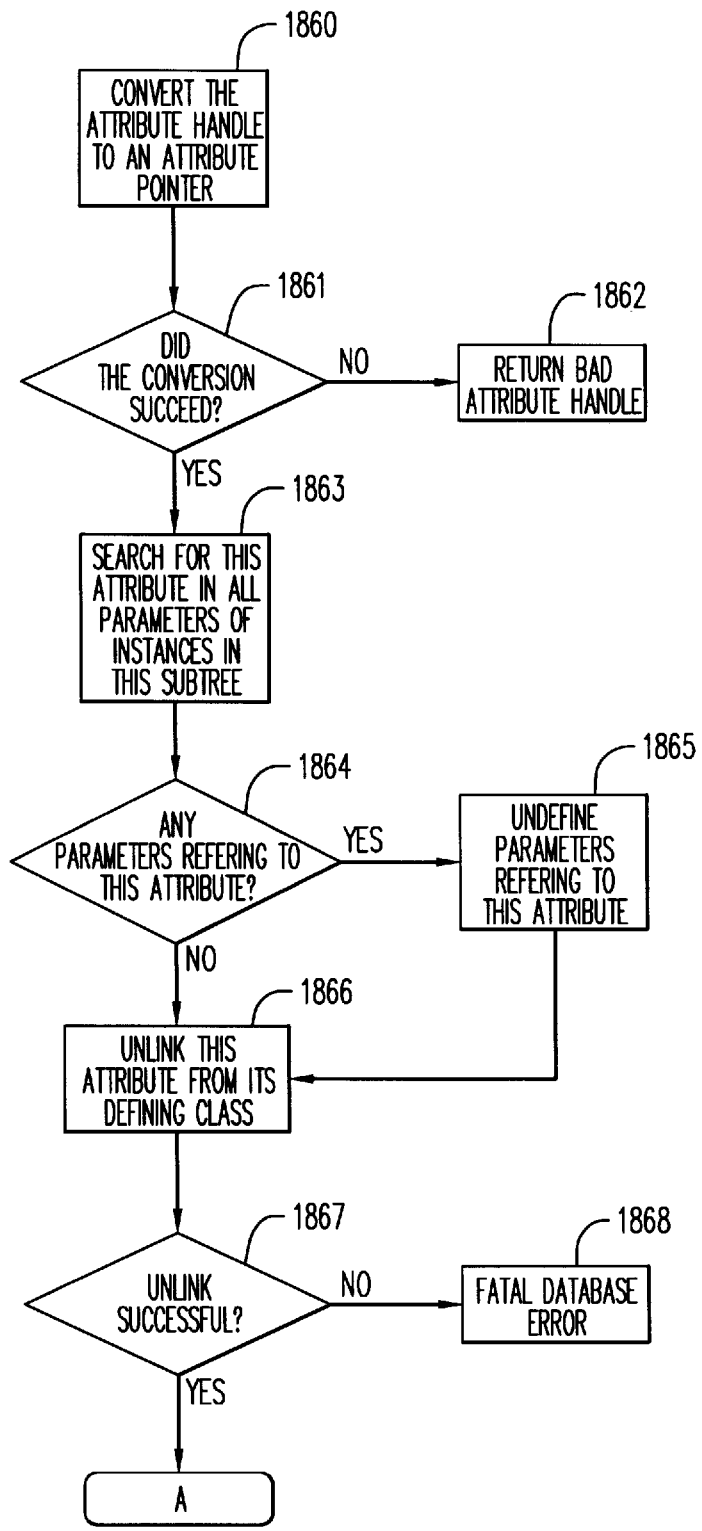
FIG. 85 is a flow chart depicting the deletion of an attribute.

FIG. 85 illustrates the data structure for an enumerator object 841. An enumerator object 841 may comprise three fields. A first field 842 contains a pointer to the external name for the enumerator object 841. A second field 843 contains the handle for the enumerator object 841. A third field 844 may contain a metaparameter list. Handles are used to link from other objects to the enumerator object 841. An advantage of this structure is the ability to easily modify a knowledge base if it becomes desirable to change the external name of an object. Such a change need only be performed once to the ASCII character string that is used to represent the external name. All other objects merely contain a handle which can be used by the handle manager 3137 to provide the dynamic class manager 134 with the actual external name.

Figure 86:
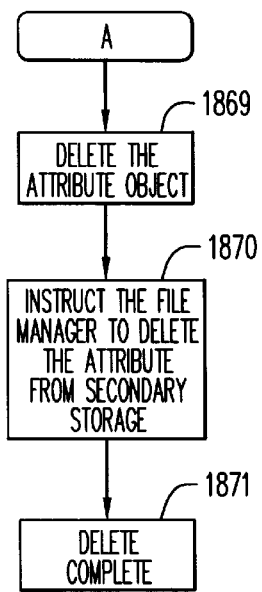
FIG. 86 is a continuation of the flow chart in FIG. 85.

FIG. 86 depicts the data structure for an instance 871 and associated parameters 872. An instance object 871 may contain four fields 873–876. The first field 873 is the handle for the owner class of this instance. The second field 874 may give the ordinal location of this instance's handle in the instance list 804 of its owning class. The third field 875 is a list of parameters, which points to the values contained in 877. The fourth field 876 is the handle for the instance object 871. The list of parameters 877 contains a plurality of pointers to parameters for the various attributes associated with this instance object 871. In the example illustrated in FIG. 86, the list 877 contains three entries 878, 879 and 880. Additional elements of the list 877 have been omitted for clarity. The pointer 878 in list 877 points to information concerning the associated parameter 872. The data structure for the parameter 872 is illustrated in more detail in FIG. 87.

Figure 87:
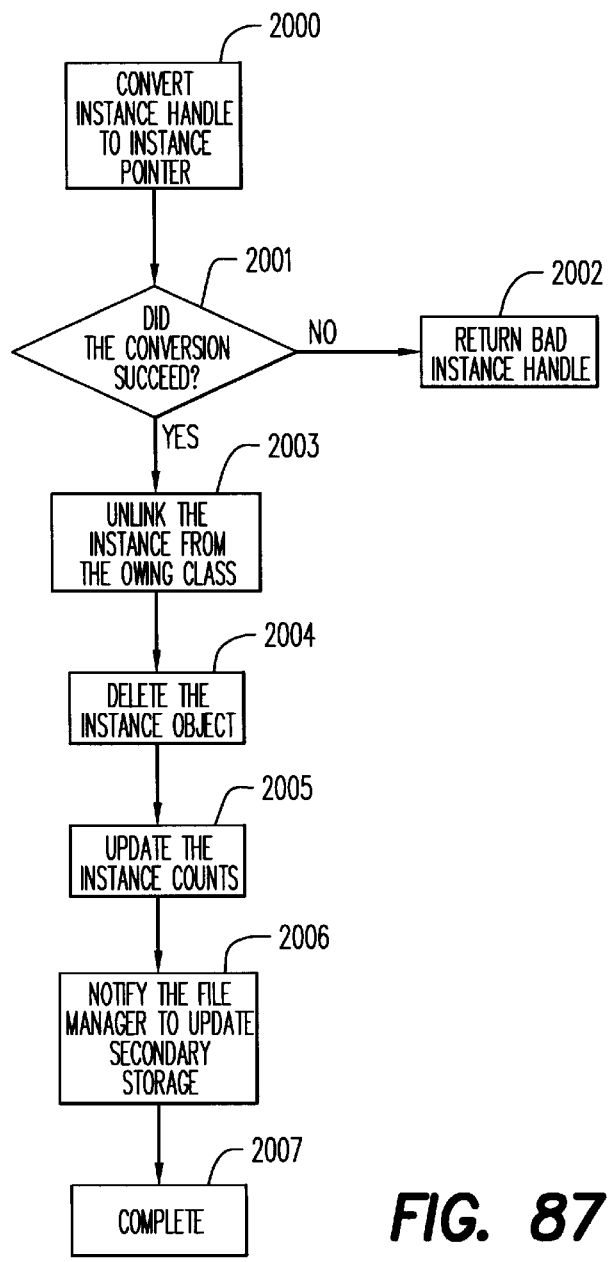
FIG. 87 is a flow chart depicting the deletion of an instance.

FIG. 87 shows the data structure for five different types of parameters: enumerated, Boolean, numeric, string and string array. Each of the parameter objects 872 has an attribute handle 881. An enumerated object 888 has an attribute handle 881 and an enumerator handle 882. A Boolean object 889 has an attribute handle 881 and a Boolean value 883. A numeric parameter object 890 has an attribute handle 881, a unit handle 884 and a value 885. For example, if the numeric parameter is 10 ohms, the unit handle 884 would be the handle for the ohms unit, and the value 885 would be 10. A string parameter 891 contains a field for the attribute handle 881 and a pointer 886 to an ASCII character string. A string array parameter 892 contains an attribute handle 881 and a field 887 that points to a list of pointers to string arrays.

Figure 88:
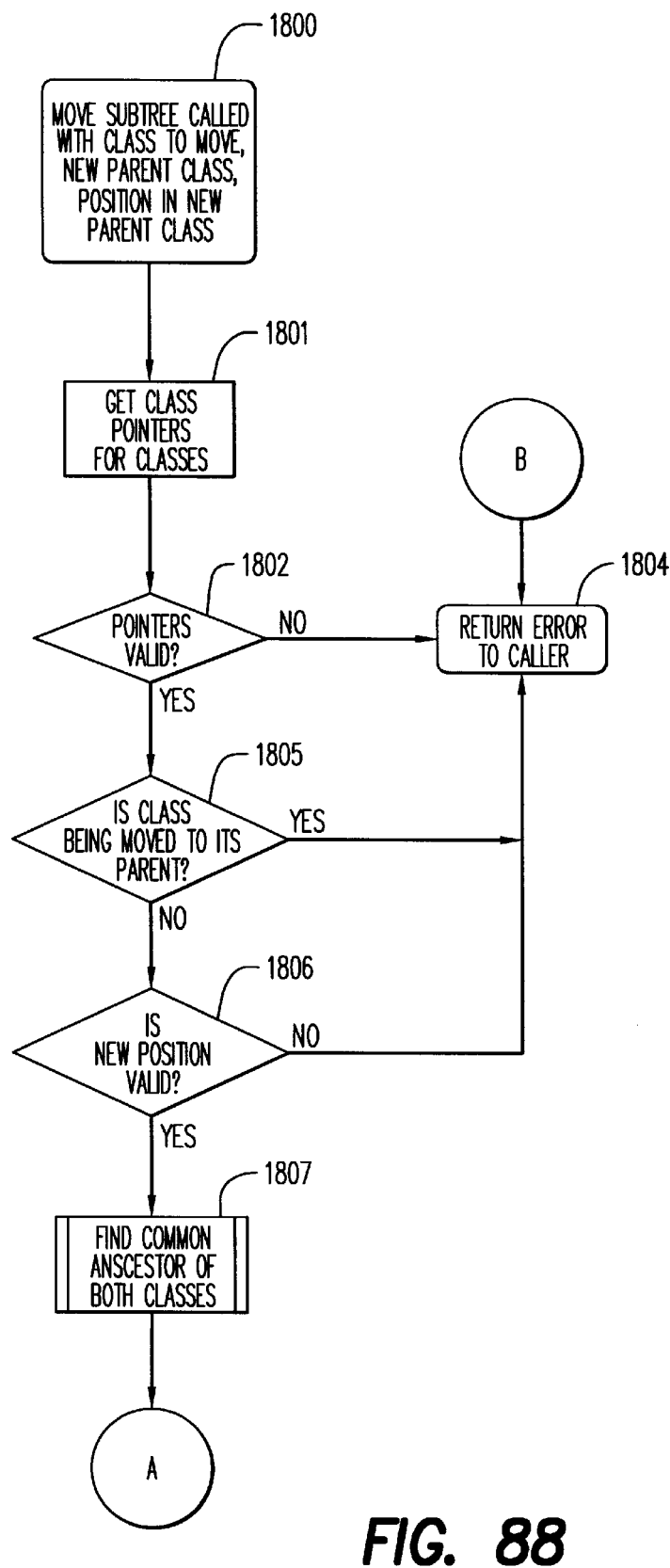
FIG. 88 is a flow chart depicting the steps involved in moving a subtree.

FIG. 88 is an example of a schema with instances. The example has a class named "electronics", which has a subclass 800' named "capacitors". The capacitors subclass 800' has an attribute 827 called "case type". There are two possible types of cases in this example, which are referred to as "case A" and "case B". The subclass capacitors 800' has a subclass 800' named "electrolytic". The electrolytic subclass 800' has an attribute 827' called "voltage rating", and one instance 871' is provided that has parameters 890 and 888 of 5 volts and a type B case, respectively. Most objects and lists are shown incomplete in order to simplify the illustration, it being understood that like reference numerals refer to the same objects described in connection with FIGS. 70–75.

In FIG. 88, the class object 800 has a name 806, which in this case is "electronics". The class object 800 has a field 802 which points to a list of subclasses 893. The list 893 has a first entry 894 which is the handle for the subclass 800'. In this case, the name 806' of the subclass 800' is capacitors. Of course, all references to schema objects actually use handles (not shown in FIG. 88) and actually go through the handle manager 3137 and handle table. This is not shown in FIG. 88 in order to simplify the diagram.

The subclass 800' capacitor has a field 802' which points to a list of subclasses 893'. The list 893' has an entry 894' which is the handle for subclass 800". The name 806" for subclass 800" is electrolytic. The subclass 800" has a null entry in the field 802" which would normally contain a pointer to a list of subclasses, if any. In this example, the subclass 800" does not have any subclasses.

Returning to the capacitors subclass 800', field 803 contains a pointer to a list of attributes 897. The list 897 contains the handle for the enumerated attribute 827 called "case type". Field 830 of the enumerated attribute object 827 contains the handle of the defining class 800' called capacitors. The enumerated attribute object 827 contains a pointer 835 which points to a list 839 of handles for enumerators. In this example, the list 839 contains a handle 898 for the enumerator 841. The enumerator 841 contains a pointer 842 to the external name for this enumerator, which may be an ASCII string for "case A". Similarly, item 899 in the list 839 points to enumerator 841' associated with case B.

Returning now to subclass 800" named electrolytic, the pointer 803" points to a list 897' of attributes, and one of the fields in the list 897' contains the handle for numeric attribute 827' which is "voltage rating". The numeric attribute 827' contains a field 830' which contains the handle of the defining class which in this example is the class 800" named electrolytic. The numeric attribute object 827' also contains a field 838' which contains the handle of the voltage unit family (not shown).

Returning to the electrolytic class 800", a field 804" contains a pointer to a list 895 of handles of instances. Item 896 in the list 895 contains the handle associated with instance 871. Instance 871 contains a field 873 which contains the handle of the owning class, which in this case is the electrolytic class 800". The instance data object 871 also contains a field 875 which points to a list of parameters 877. The list 877 contains a pointer 878 which points to the numeric parameter 890. The numeric parameter 890 contains a field 881 which contains the handle of the attribute 827' (voltage rating). The numeric parameter object 890 also contains a field 884 which has the handle of the units, which in this case is "volts". For simplicity, the unit object is not shown. The numeric parameter object 890 contains a field 885 which contains the value 5.0. In this instance, the electrolytic capacitor is rated at 5.0 volts.

The parameter list 877 contains a pointer 879 which points to the enumerated parameter 888. The enumerated parameter object 888 contains a field 881' which contains the handle of the attribute, which in this instance is case type. The enumerated parameter object 888 also contains a field 882 which is the handle for the enumerator 841'. In this example, the electrolytic capacitor rated at 5.0 volts has a type case B.

The data structure described herein has significant advantages. Referring to FIG. 88, it is easy to change a name or description in this data structure. Consider an example where the database may contain 1,000 instances of capacitors with a type B case. If the type B case is discontinued, or the name changed to "re-enforced", the only change that would need to be made would be to replace a single ASCII string representing the name for that case type. All 1,000 instances in the database simply contain a handle that the handle manager 3137 associates with that ASCII text string. No other changes is need to be made in the database.

Another advantage of the data structure in accordance with the present invention is that if a primary value is undefined, nothing is stored. Thus there is no wasted space.

Another advantage of the database structure is that algorithms do not have to be changed based upon location in the tree structure. All algorithms work the same regardless of location in the tree structure. The only special case is the root class. For example, the algorithm for adding an instance to the database is the same no matter where in the tree structure you are located. This makes dynamic changes to the schema very easy. A class or an entire branch of the tree structure can be moved from one location to another simply by changing lists of handles. It is not necessary to run a convert program. Everything is self contained. A class object 800 contains the handle of its parent 801 and thus knows who it's parent is. The class object 800 also contains a pointer 802 to a list of its subclasses, so it knows who its children are.

In the present database structure, it is possible to delete instances quickly. An instance can be deleted by taking the last item in the list of instances 804 and moving it to the position of the instance being deleted. In other words, the handle of the last instance would be written over the handle of the instance being deleted, and the number of items in the list would be decremented by one. The instance index field 874 for an instance object 871 may be used to facilitate fast deletions.

In a preferred embodiment, the value of parameters are always stored in base units. The objects in fields described do not necessarily occupy a word of memory. In a preferred embodiment, all parameters of a particular type are stored contiguously. This improves the speed of searches. For example, the case type 841' described with reference to FIG. 88 would be stored contiguously with all the other parameters for case type. The numeric parameter of 5.0 volts would be stored in a different physical location in memory contiguous with other numeric volt parameters.

As described above, providing a class object structure 800 with a field 808 providing the subtree instance count for that class allows the system to virtually instantly display a parts count 3172 to provide the user instantaneous feedback during the tree traversal steps of the users search. The process of finding a part essentially amounts to discarding the thousands of parts that do not have the attributes desired and narrowing the search down to a small number that do.

This is accomplished by navigating to the correct class from the root of the classification hierarchy. During this phase, the parts found indication 3172 can be updated using the data structure field 808 indicating the subtree instance count. This provides significant response time advantages compared to actually counting the available instances at each step. The user has immediate feedback indicating the number of parts available in the selected tree. The combination of providing an object oriented hierarchical tree structure together with search criteria based upon any desired combination of attributes, while providing instantaneous feedback on the number of instances corresponding to the current search criteria and class provides significant advantages over data base management schemes that have been attempted in the past.

An important function of the dynamic class manager 134 is the ability to modify the database structure during operation. The database structure is known as the schema. The schema of the object oriented database is structured using classes. The classes contain attributes. The attributes may contain enumerators, and unit families. The ability to add, move and delete these items is important to the dynamic operation of the database.

To add a class to the schema, three items must be known: the class name, the parent of the new class, and the location within the list of subclasses to insert the new class. FIG. 89 illustrates this operation. The first step 1840 converts the handle of the parent class into an actual class pointer. The parent pointer must be immediately tested in step 1841 prior to its use. If the pointer proves to be invalid, then the operation terminates at step 1842. If the pointer is valid, the insertion index is tested in step 1843. If it proves to be invalid, the operation is terminated in step 1844. Finally, the name of the class must be tested in step 1845 to determine if it fits the guidelines of valid class names. If the class name fails, then the operation terminates in step 1846. When step 1845 accepts the class name, the new class can be created. A new handle is created in step 1847 first, and then the new class is created in internal memory in step 1848. The new handle is inserted into the table of class handles in step 1849 of FIG. 90, followed by the handle being added to the parents list of subclass handles in step 1850. The last operation is to cause the file manager 140 to add the new class to the indicated parent on the secondary storage device 110.

To add an attribute to a class, three items must be known: the class handle of the owning class, the location in which to insert the new attribute, and the name of the attribute. FIG. 91 illustrates the adding of attributes. The first step 1930 is to convert the class handle into a class pointer, followed by the testing of that class pointer in 1931 to determine if it is a valid class pointer. If not, the procedure terminates in 1932. If the class pointer is determined to be valid, then the insertion index is validated in 1933. If the index fails the validation test, then the procedure terminates in 1934. If the validation of the index succeeds, then the operation continues in 1935 where the name of the attribute is tested. If the attribute name fails, then the operation terminates in 1936. If the name of an enumerated attribute is accepted in 1935, then the attribute can be created. Step 1937 creates a new handle for the attribute. Then the new attribute is created in step 1938. The new attribute handle is then added to the list of attributes local to the owning class in 1939. The last step is 1940 of FIG. 92 to cause the file manager 140 to update secondary storage 110 with the new attribute. The operation is complete in step 1941.

The addition of an instance is shown in FIG. 81. Adding an instance requires a class handle. The class handle must be converted into a class pointer in 1918. The class pointer is tested in 1919 to determine if it is a valid class pointer. If it is not valid, then the procedure terminates in 1920. If the class pointer is determined to be valid, then the procedure continues in 1921 with the generation of a new instance handle and a new instance object. The handle for the new instance is inserted into the handle table in 1922. The instance is added to the parents list of instances in 1923. The subtree instance count is incremented to reflect the presence of the new instance in 1924. The instance has now been created in memory, and needs to be added to secondary storage 110, which is done in step 1925 of FIG. 82. The procedure is complete in step 1926.

The deletion of a class is shown in FIG. 83. To remove a class from the database structure, the current class handle must be identified. The class handle is first decoded into a class pointer in step 2600. The class pointer is then checked to determine if it is a valid class pointer in 2601. If the class pointer is invalid, the procedure is terminated in 2602. If the class pointer is valid, then it is checked to determine if it is the root class in 2603. If the class pointer represents the root class, then the procedure terminates in 2604, because the root class cannot be deleted. If the class pointer does not represent the root class, it is checked to determine if the class represents a leaf class in 2605. If the class pointer does not represent a leaf class, the procedure terminates in 2604. If the class pointer is found to point to a leaf class, then operation continues in 2906 where all of the instances of this class are deleted. The process of deleting instances is described below with reference to FIG. 87. In step 2607 all of the attributes which are local to the class being deleted are deleted. In FIG. 84 The class is then unlinked from its parent class in step 2608. The system checks to determine if the unlink was successful, and that the data structures which contain the class list are intact in 2609. If the unlink failed, then operation stops in 2610. If the unlink succeeded, then operation continues in 2611 where the class object is actually deleted. In step 2612, the file manager 140 is instructed to remove the class object from secondary storage 110, and the operation completes in step 2613.

The deletion of an attribute is shown in FIG. 85. To remove an attribute, the attribute handle must be decoded into an attribute pointer in step 1860. Step 1861 checks to see if the attribute pointer obtained from step 1860 is valid. If the attribute pointer is invalid, the procedure stops in 1862. If the attribute pointer is valid, the procedure continues in step 1863 by searching the entire subtree for all of the parameters in all of the subtree instances that are derived from this attribute. After searching, in step 1864 the system determines how many parameters were derived from this attribute. If there were parameters derived from this attribute, the operation proceeds to 1865, where the parameters are undefined. If there were no parameters derived from this attribute, then the procedure continues to step 1866. Likewise, after the parameters have been undefined in 1865, the operation continues to 1866. In step 1866, the attribute is unlinked from the defining class. In 1867 the procedure checks to determine if the unlink operation succeeded. If the unlink failed, then the procedure stops at 1868. If the unlink was successful, then the attribute object is deleted in 1869 in FIG. 86. The file manager 140 is then instructed to remove the attribute from secondary storage 110 in step 1870. The operation is complete in step 1871.

The deletion of an instance is shown in FIG. 87. An instance is deleted from the database by first converting the instance handle in step 2000 to an instance pointer. The instance pointer is checked to determine that it is indeed a valid instance pointer in 2001. If the instance pointer is invalid then the operation terminates in 2002. If the instance pointer is valid, then the instance is unlinked from its owning class in 2003. The instance object is itself deleted in 2004. The subtree instance counts is then decremented to indicate that one instance has been deleted from the subtree in 2005. The file manager 140 is then instructed to update the secondary storage 110 to reflect the deletion of the instance in 2006. The operation is complete in step 2007.

In FIG. 88, moving a subtree to a new position in the class hierarchy is described. In step 1800, the move subtree procedure is called with a class to move, the destination parent class, and the position among its sibling classes at the destination specified. In step 1801, the class pointers for the class to be moved and the destination parent class are obtained. If the test for all valid pointers in step 1802 fails, step 1804 returns an error, else test 1805 is made to prevent the class from being trivially moved to its own parent. Step 1806 insures that the position among the subclasses of the destination parent class is within a valid range, with an error returned by step 1804 upon error. In step 1807, the class hierarchy above both the class to be moved and the destination class is analyzed to identify the nearest common ancestor class.

In step 1808 of FIG. 89, the common ancestor is tested to see if it is identical to the class being moved. If it is, given that a test has already been performed to insure that the class is not being moved to its parent, then this is determined to be an attempt to move a class to a subclass of itself, and an error is returned. All other moves are legal, so the class is unhooked from its parent class in step 1809 and added to the list of subclasses for the destination class in step 1810. The destination class subtree instance count is incremented by the number of instances in the moved class in step 1811, and the subtree count of the original parent class of the moved class is decremented by the moved class instance count in step 1812. In step 1813 the permanent image of the knowledge base is updated through the file manager 140, with step 1814 returning successfully to the caller.

FIG. 90 describes unhooking the moved class from its original parent class. In step 1815 the class pointer for the parent is obtained and used in step 1816 to get a list of subclasses for the parent class. If the class handle of the class to be moved is not in the resulting subclass list as tested in step 1817, the knowledge base is internally inconsistent and an error is returned to the caller, else the class is deleted from the parent class subclass list in step 1818 before a successful return in step 1819.

FIG. 91 describes the process of finding the nearest common ancestor of the class to be moved and the destination class. In step 1820, a temporary class handle is set to the handle of the class to be moved. Step 1821 gets the parent of the temporary class, initiating a loop that creates a list of classes in order from the class to move to the root. Each class encountered is added to a list in step 1822, with iteration being terminated if step 1823 shows that the root has been encountered. If the test in step 1823 fails, the temporary class handle is set to the handle of its parent class in step 1824 and iteration continues.

A similar list is created for the destination class in steps 1831 through 1828, moving to FIG. 92. In step 1831, a temporary class handle is set to the handle of the destination class. Step 1832 gets the parent of the temporary class, initiating a loop that creates a list of classes in order from the class to move to the root. Each class encountered is added to a list in step 1826, with iteration being terminated if step 1827 shows that the root has been encountered. If the test in step 1827 fails, the temporary class handle is set to the handle of its parent class in step 1828 and iteration continues.

The final step 1829 iterates through the two resulting lists until a matching class handle is found. This is the handle of the nearest common ancestor, which is returned in step 1830.

SUMMARY OF THE INVENTION

The present invention allows a user of an object oriented database management system to quickly and easily compare attribute values for selected instances (in the illustrated example the instances are parts). The results of the comparison is displayed in a quickly and easily perceivable manner by initially indicating which attribute values are the same for all of the corresponding instances or parts, and which are not the same for every instance or part.

At the part attribute comparison dialog box, a user can:

Select a column for a single part and use its attribute values as a baseline for a comparison.

Choose the compare to selected part command button. When a user choose this button, the object oriented database management system compares all attribute values with the baseline values. As soon as the comparison is completed, a legend appears at the bottom of the dialog box. This legend shows a user how to interpret the values that match and those that do not match the baseline attribute values.

Graphically inspect how all other attribute values compare to the baseline values. The cells for values that match are not shaded; the cells for values that do not match are shaded.

Clear these comparisons using the clear comparisons command button.

What is claimed is:

1. A method for comparing attributes of parts in an object oriented parts management system, comprising the steps of:

selecting two or more parts to be compared;

displaying a part attribute comparison window;

comparing the attribute values for all parts, displaying a first symbol associated with attribute values that are the same for all selected parts to be compared, and displaying a second symbol associated with attribute values that are not the same for all selected parts to be compared;

designating a baseline part to be compared with all other selected parts;

comparing attribute values for the non-designated parts with corresponding attribute values for the baseline part; and, displaying attribute values that match in a first manner, and displaying attribute values that do not match in a second manner.

2. The method according to claim 1, wherein:

the step of displaying the first symbol associated with attribute values that are the same comprises the step of displaying a first icon representative of an equal state in a position associated with attribute titles corresponding to said attribute values that are the same.

3. The method according to claim 2, wherein:

the step of displaying the second symbol associated with attribute values that are not the same comprises the step of displaying a second icon representative of a not-equal state in a position associated with attribute titles corresponding to said attribute values that are not the same.

4. A method for comparing attributes of parts in an object oriented parts management system comprising the steps of selecting two or more parts to be compared;

displaying a part attribute comparison window;

comparing the attribute values for all parts, displaying a first symbol associated with attribute values that are the same for all selected parts to be compared, and displaying a second symbol associated with attribute values that are not the same for all selected parts to be compared;

designating a baseline part to be compared with all other selected parts;

comparing attribute values for the non-designated parts with corresponding attribute values for the baseline part; and displaying attribute values that match in a first manner, and displaying attribute values that do not match in a second manner;

the step of displaying the first symbol associated with attribute values that are the same comprises the step of displaying an equal sign icon in a position associated with attribute titles corresponding to said attribute values.

5. A method as in claim 4, wherein the step of displaying the second symbol associated with attribute values that are not the same comprises the step of displaying a second icon representative of a not-equal state in a position associated with attribute titles corresponding to said attribute values that are not the same.

6. A method as in claim 5, wherein the step of displaying a part attribute comparison window comprises the step of displaying a table, the table having a first column in which said first or second icons are displayed, the table having a second column in which attribute titles are displayed, the table having a third column in which attribute values for a first part are displayed where attribute values for said part are displayed in rows corresponding to the position of corresponding attribute titles in said second column, and the table having one or more additional columns in which attribute values for one or more parts are displayed where attribute values for one of said parts are displayed in a column associated with that part, and where attribute values for one or more of said parts are displayed in rows corresponding to the position of corresponding attribute titles in said second column.

7. A method as in claim 5, wherein the step of displaying attribute values that do not match comprises the step of displaying said attribute values in a second manner selected from the group consisting of (1) highlighting said attribute values, (2) shading said attribute values, and (3) displaying said attribute values in a different color from a color that attribute values that are the same are displayed.

8. A method for comparing attributes of parts in an object oriented parts management system, comprising the steps of selecting two or more parts to be compared;

displaying a part attribute comparison window;

comparing the attribute values for all parts, displaying a first symbol associated with attribute values that are the same for all selected parts to be compared, and displaying a second symbol associated with attribute values that are not the same for all selected parts to be compared;

designating a baseline part to be compared with all other selected parts;

comparing attribute values for the non-designated parts with corresponding attribute values for the baseline part; and displaying attribute values that match in a first manner, and displaying attribute values that do not match in a second manner;

wherein the step of displaying the first symbol associated with attribute values that are the same comprises the step of displaying a first icon representative of an equal state in a position associated with attribute titles corresponding to said attribute values that are the same;

and wherein the step of displaying the second symbol associated with attribute values that are not the same comprises the step of displaying a second icon representative of a not-equal state in a position associated with attribute titles corresponding to said attribute values that are not the same;

the step of displaying a part attribute comparison window comprises the step of displaying a table, the table having a first column in which said first or second icons are displayed, the table having a second column in which attribute titles are displayed, the table having a third column in which attribute values for a first part are displayed where attribute values for said part are displayed in rows corresponding to the position of corresponding attribute titles in said second column, and the table having one or more additional columns in which attribute values for one or more parts are displayed where attribute values for one of said parts are displayed in a column associated with that part, and where attribute values for one or more of said parts are displayed in rows corresponding to the position of corresponding attribute titles in said second column.

9. As method as in claim 8, wherein the step of displaying the first symbol associated with attribute values that are the same comprises the step of displaying an equal sign icon in a position associated with attribute titles corresponding to said attribute values.

10. A method for comparing attributes of parts in an object oriented parts management system, comprising the steps of selecting two or more parts to be compared;

displaying a part attribute comparison window;

comparing the attribute values for all parts, displaying a first symbol associated with attribute values that are the same for all selected parts to be compared, and displaying a second symbol associated with attribute values that are not the same for all selected parts to be compared;

designating a baseline part to be compared with all other selected parts;

comparing attribute values for the non-designated parts with corresponding attribute values for the baseline part; and displaying attribute values that match in a first manner, and displaying attribute values that do not match in a second manner;

wherein the step of displaying the first symbol associated with attribute value that are the same comprises the step of displaying a first icon representative of an equal state in a position associated with attribute titles corresponding to said attribute values that are the same;

and wherein the step of displaying the second symbol associated with attribute values that are not the same comprises the step of displaying a second icon representative of a not-equal state in a position associated with attribute titles corresponding to said attribute values that are not the same;

the step of displaying attribute values that do not match comprises the step of displaying said attribute values in a second manner selected from the group consisting of (1) highlighting said attribute values, (2) shading said attribute values, and (3) displaying said attribute values in a different color from a color that attribute values that are the same are displayed.

11. As method as in claim 10, wherein the step of displaying the first symbol associated with attribute values that are the same comprises the step of displaying an equal sign icon in a position associated with attribute titles corresponding to said attribute values.

12. A method for comparing attributes of instances in a database management system, comprising the steps of:

selecting a plurality of instances to be compared;

displaying an attribute comparison window;

designating one of the selected instances as a baseline instance to be compared with all other selected instances;

comparing attribute values for instances other than the baseline instance, with corresponding attribute values for the baseline instance; and, for instances other than the baseline instance, displaying attribute values that match corresponding attribute values for the baseline instance in a first manner, and displaying attribute values that do not match corresponding attribute values for the baseline instance in a second manner.

13. The method for comparing attributes of instances in a database management system according to claim 12, further comprising the steps of:

comparing the attribute values for all instances;

displaying a first symbol associated with attribute values that are the same for all selected instances; and, displaying a second symbol associated with attribute values that are not the same for all selected instances.

14. The method for comparing attributes of instances in a database management system according to claim 13, wherein:

the step of displaying the first symbol associated with attribute values that are the same comprises the step of displaying a first icon representative of an equal state in a position associated with attribute titles corresponding to said attribute values that are the same.

15. The method for comparing attributes of instances in a database management system according to claim 14, wherein:

the step of displaying the second symbol associated with attribute values that are not the same comprises the step of displaying a second icon representative of a not-equal state in a position associated with attribute titles corresponding to said attribute values that are not the same.

16. As method as in claim 12, wherein the step of displaying attribute values in a first manner includes the step of displaying an equal sign icon in a position associated with attribute titles corresponding to said attribute values.

17. A method as in claim 12, wherein the step of displaying attribute values in a second manner includes the step of displaying a second icon representative of a not-equal state in a position associated with attribute titles corresponding to said attribute values that are not the same.

18. A method as in claim 17, wherein the step of displaying an attribute comparison window comprises the step of displaying a table, the table having a first column in which attribute titles are displayed in said first manner when all said instances have the same attribute value and in said second manner when at least some of said instances have different attribute values, the table having a second column in which attribute values for a first instance are displayed where attribute values for said instance are displayed in rows corresponding to the position of corresponding attribute titles in said first column, and the table having one or more additional columns in which attribute values for one or more instances are displayed where attribute values for one of said parts are displayed in a column associated with that part, and where attribute values for one or more of said parts are displayed in rows corresponding to the position of corresponding attribute titles in said first column.

19. A method as in claim 17, wherein the step of displaying attribute values that do not match comprises the step of displaying said attribute values in a second manner selected from the group consisting of (1) highlighting said attribute values, (2) shading said attribute values, and (3) displaying said attribute values in a different color from a color that attribute values that are the same are displayed.

20. An object oriented database management system within a client/server architecture having a knowledge base client, a knowledge base server, the knowledge base server including a dynamic class manager, a connection manager, a query manager, a handle manager, a units manager, a database manager, and a file manager, comprising:

means for selecting a plurality of instances to be compared;

means for displaying an attribute comparison window;

means for designating one of the selected instances as a baseline instance to be compared with all other selected instances;

means for comparing attribute values for instances other than the baseline instance, with corresponding attribute values for the baseline instance;

means for displaying, for instances other than the baseline instance, attribute values that match corresponding attribute values for the baseline instance in a first manner; and, means for displaying attribute values that do not match corresponding attribute values for the baseline instance in a second manner.

21. The object oriented database management system according to claim 20, further comprising:

means for comparing the attribute values for all instances;

means for displaying a first symbol associated with attribute values that are the same for all selected instances; and, means for displaying a second symbol associated with attribute values that are not the same for all selected instances.

22. The object oriented database management system according to claim 21, wherein:

the means for displaying the first symbol associated with attribute values that are the same comprises means for displaying a first icon representative of an equal state in a position associated with attribute titles corresponding to said attribute values that are the same.

23. The object oriented database management system according to claim 22, wherein:

the means for displaying the second symbol associated with attribute values that are not the same comprises means for displaying a second icon representative of a not-equal state in a position associated with attribute titles corresponding to said attribute values that are not the same.

24. A system as in claim 21, wherein said means for displaying the second symbol includes means for displaying a second icon representative of a not-equal state in a position associated with attribute titles corresponding to said attribute values that are not the same.

25. A system as in claim 24, wherein said means for displaying an attribute comparison window comprises the step of displaying a table, the table having a first column in which said first or second icons are displayed, the table having a second column in which attribute titles are displayed, the table having a third column in which attribute values for a first part are displayed where attribute values for said part are displayed in rows corresponding to the position of corresponding attribute titles in said second column, and the table having one or more additional columns in which attribute values for one or more parts are displayed where attribute values for one of said parts are displayed in a column associated with that part, and where attribute values for one or more of said parts are displayed in rows corresponding to the position of corresponding attribute titles in said second column.

26. A system as in claim 24, wherein said means for displaying attribute values that do not match includes means for displaying said attribute values in a second manner selected from the group consisting of (1) highlighting said attribute values, (2) shading said attribute values, and (3) displaying said attribute values in a different color from a color that attribute values that are the same are displayed.

27. A system as in claim 20, wherein said means for displaying the attribute values in a first manner includes means for displaying an equal sign icon in a position associated with attribute titles corresponding to said attribute values.

\* \* \* \* \*